United States Patent
Xie et al.

(10) Patent No.: US 11,841,255 B2
(45) Date of Patent: Dec. 12, 2023

(54) SYSTEMS, METHODS, AND APPARATUS TO MEASURE MULTIPHASE FLOWS

(71) Applicant: Schlumberger Technology Corporation, Sugar Land, TX (US)

(72) Inventors: Cheng-Gang Xie, Singapore (SG); Guillaume Jolivet, Singapore (SG)

(73) Assignee: Schlumberger Technology Corporation, Sugar Land, TX (US)

( * ) Notice: Subject to any disclaimer, the term of this patent is extended or adjusted under 35 U.S.C. 154(b) by 501 days.

(21) Appl. No.: 17/261,626

(22) PCT Filed: Jul. 18, 2019

(86) PCT No.: PCT/US2019/042449
§ 371 (c)(1),
(2) Date: Jan. 20, 2021

(87) PCT Pub. No.: WO2020/018822
PCT Pub. Date: Jan. 23, 2020

(65) Prior Publication Data
US 2021/0293592 A1    Sep. 23, 2021

Related U.S. Application Data

(60) Provisional application No. 62/701,046, filed on Jul. 20, 2018.

(51) Int. Cl.
*G01F 1/663* (2022.01)
*G01F 1/36* (2006.01)
*G01F 1/74* (2006.01)

(52) U.S. Cl.
CPC .............. *G01F 1/663* (2013.01); *G01F 1/36* (2013.01); *G01F 1/74* (2013.01)

(58) Field of Classification Search
CPC .............. G01F 1/66; G01F 1/663; G01F 1/36; G01F 1/74
See application file for complete search history.

(56) References Cited

U.S. PATENT DOCUMENTS 5,893,642 A    4/1999  Hewitt et al.
6,831,470 B2  12/2004  Xie et al.
(Continued)

FOREIGN PATENT DOCUMENTS

WO    2005031311 A1    4/2005
WO    2009037434 A1    3/2009
(Continued)

OTHER PUBLICATIONS

University of Oxford, Three-phase flow metering—Invensys UTC, at http://www.eng.ox.ac.uk/InvensysUTC/coriolis-research/three-phase-flow, downloaded on Jan. 4, 2021 (7 pages).
(Continued)

*Primary Examiner* — Suman K Nath
(74) *Attorney, Agent, or Firm* — Jeffrey D. Frantz

(57) ABSTRACT

Systems, methods, apparatus, and articles of manufacture are disclosed to measure a multiphase flow. An example system includes a flowmeter including a mixer to homogenize a fluid received at an inlet of the flowmeter, a differential pressure sensor to measure a differential pressure of the fluid across an inlet and an outlet of the mixer, a Doppler probe to transmit a microwave or an ultrasonic wave into the fluid to generate Doppler frequency shift data, and a flowmeter manager to calculate a velocity of the fluid based on the Doppler frequency shift data, and calculate a density of the fluid based on the differential pressure and the velocity.

19 Claims, 13 Drawing Sheets

(56) References Cited

U.S. PATENT DOCUMENTS

| | | | |
|---|---|---|---|
| 7,770,469 B2 | 8/2010 | Nyfors et al. | |
| 7,987,733 B2 | 8/2011 | Atkinson et al. | |
| 8,536,883 B2 | 9/2013 | Xie et al. | |
| 8,754,657 B2 | 6/2014 | Capone | |
| 9,031,797 B2 | 5/2015 | Huang et al. | |
| 9,234,420 B2 | 1/2016 | Xie | |
| 9,778,091 B2 | 10/2017 | Fraser et al. | |
| 2008/0319685 A1 | 12/2008 | Xie et al. | |
| 2011/0112773 A1* | 5/2011 | Atkinson | G01F 1/002 73/861.04 |
| 2013/0047709 A1* | 2/2013 | Xie | G01F 1/663 73/61.45 |
| 2016/0298992 A1* | 10/2016 | Pathier | G01F 15/08 |
| 2018/0100751 A1 | 4/2018 | Toner | |

FOREIGN PATENT DOCUMENTS

| | | | |
|---|---|---|---|
| WO | 2009101392 A1 | 8/2009 | |
| WO | 2011070409 A2 | 6/2011 | |
| WO | 2011135413 A2 | 11/2011 | |
| WO | 2017091522 A1 | 6/2017 | |

OTHER PUBLICATIONS

Harrison PS and Hewitt GF: "Development and testing of the Mixmeter multiphase flow meter", North Sea Flow Measurement Workshop, 1995, (35 pages).

International Search Report and Written Opinion issued in the PCT Application PCT/US2019/042449, dated Oct. 24, 2019 (9 pages).

\* cited by examiner

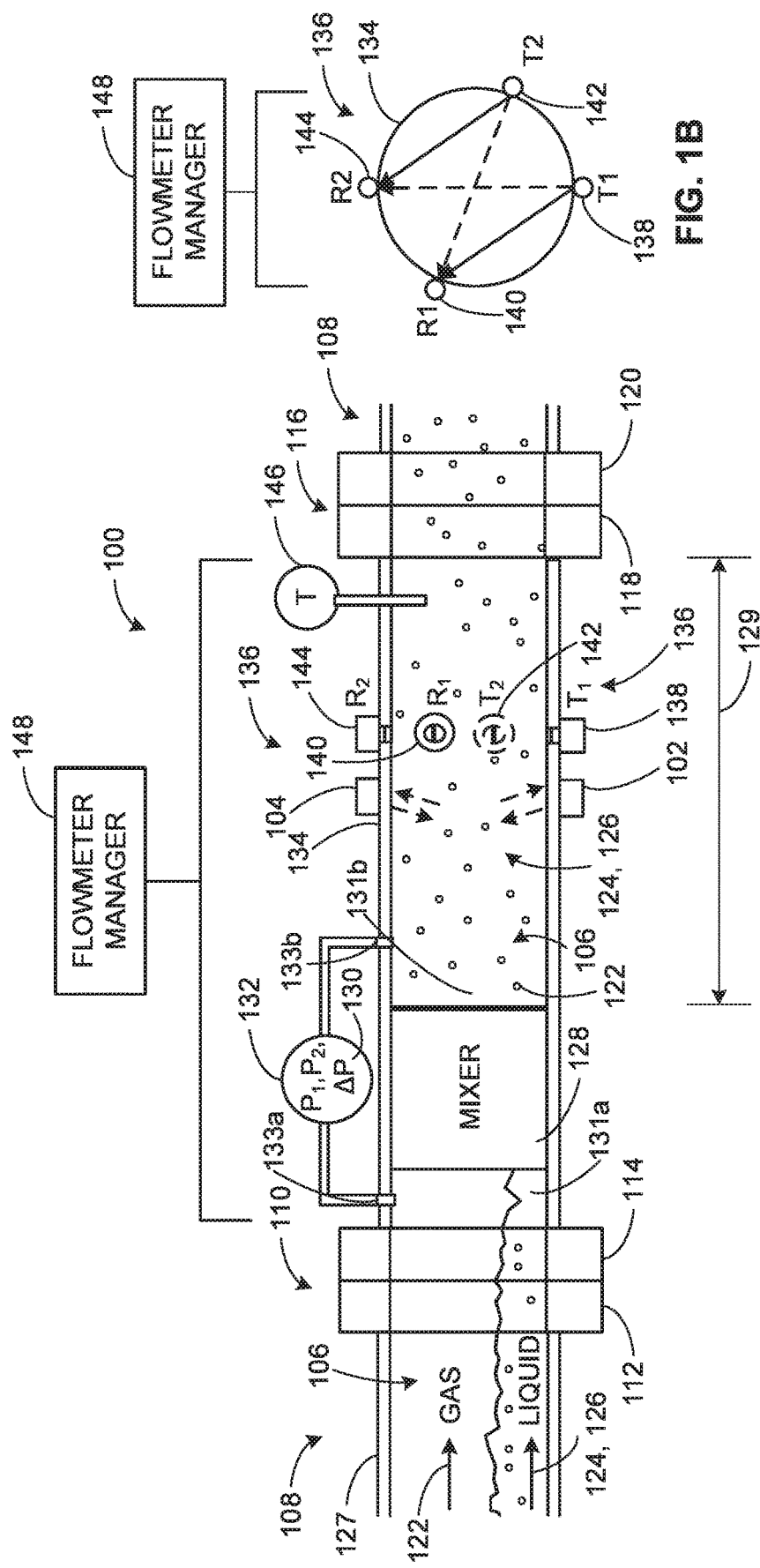

SYSTEMS, METHODS, AND APPARATUS TO MEASURE MULTIPHASE FLOWS

CROSS-REFERENCE TO RELATED APPLICATION

This application claims the benefit of U.S. Provisional Application No. 62/701,046, filed on Jul. 20, 2018, the entirety of which is incorporated herein by reference.

This disclosure relates generally to multiphase flow measurement and, more particularly, to systems, methods, and apparatus to measure multiphase flows.

BACKGROUND

This disclosure relates generally to multiphase flow measurement and, more particularly, to systems, methods, and apparatus to measure multiphase flows.

DESCRIPTION OF THE RELATED ART

Most oil-gas wells produce a mixture of oil, water, and gas. A homogenization of these components is desirable for accurate flow rate measurement of each component. Typically, the components are mixed prior to conducting analysis. Without adequate mixing, the phases may not be homogeneously distributed across a pipe section. A measurement of a non-homogenous distribution may give an erroneous indication of phase contents due to non-uniformity and varying flow rates of the phase contents.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Systems, methods, apparatus, and articles of manufacture to measure multiphase flows are disclosed.

An example system includes a flowmeter including a mixer to homogenize a fluid received at an inlet of the flowmeter, a differential pressure sensor to measure a differential pressure of the fluid across an inlet and an outlet of the mixer, a Doppler probe to transmit a microwave or an ultrasonic wave into the fluid to generate Doppler frequency shift data, and a flowmeter manager to calculate a velocity of the fluid based on the Doppler frequency shift data, and calculate a density of the fluid based on the differential pressure and the velocity.

Another example system includes a flowmeter including a mixer to homogenize a fluid received at an inlet of the flowmeter, a differential pressure sensor to measure a differential pressure of the fluid across an inlet and an outlet of the mixer, a first microwave probe to transmit a first microwave into the fluid at a first axial position and receive a first reflected microwave, a second microwave probe to transmit a second microwave into the fluid at a second axial position and receive a second reflected microwave, and a flowmeter manager to calculate a velocity of the fluid based on determining a cross-correlation transit-time based on the first reflected microwave and the second reflected microwave, and calculate a density of the fluid based on the differential pressure and the velocity.

Yet another example system includes a flowmeter including a mixer to homogenize a fluid received at an inlet of the flowmeter, a differential pressure sensor to measure a differential pressure across a vertical diameter of the flowmeter, and a pitot tube to measure a first pressure and a second pressure of the fluid, the first pressure different from the second pressure, and a flowmeter manager to calculate a density of the fluid based on the differential pressure measured across the vertical diameter, and calculate a velocity of the fluid based on the first pressure, the second pressure, and the density.

Another example system includes a flowmeter including a mixer to homogenize a fluid received at an inlet of the flowmeter, a first differential pressure sensor to measure a first differential pressure across an inlet and an outlet of the mixer, a second differential pressure sensor to measure a second differential pressure associated with a measurement area, a coaxial sensor disposed in the measurement area to transmit a microwave into the fluid and to receive a reflected microwave, and a flowmeter manager to calculate a velocity and a density of the fluid based on the first differential pressure and the second differential pressure, determine a reflection coefficient based on a ratio of a first signal associated with the transmitted microwave and a second signal associated with the reflected microwave, determine a mixture permittivity and a mixture conductivity based on the reflection coefficient, and determine a flow rate of the fluid based on the velocity, a water-to-liquid ratio, and a liquid holdup, the water-to-liquid ratio and the liquid holdup based on the density and at least one of the mixture permittivity or the mixture conductivity.

Various refinements of the features noted above may exist in relation to various aspects of the present embodiments. Further features may also be incorporated in these various aspects as well. These refinements and additional features may exist individually or in any combination. For instance, various features discussed below in relation to the illustrated embodiments may be incorporated into any of the above-described aspects of the present disclosure alone or in any combination. Again, the brief summary presented above is intended just to familiarize the reader with certain aspects and contexts of some embodiments without limitation to the claimed subject matter.

BRIEF DESCRIPTION OF THE DRAWINGS

FIG. 1A depicts a first example multiphase flowmeter including example Doppler sensors and example microwave cross-pipe transmission antennas for measuring horizontal gas-liquid three-phase flows.

FIG. 1B depicts a cross-sectional view of the first example multiphase flowmeter of FIG. 1A

Figures 2A, 2B:
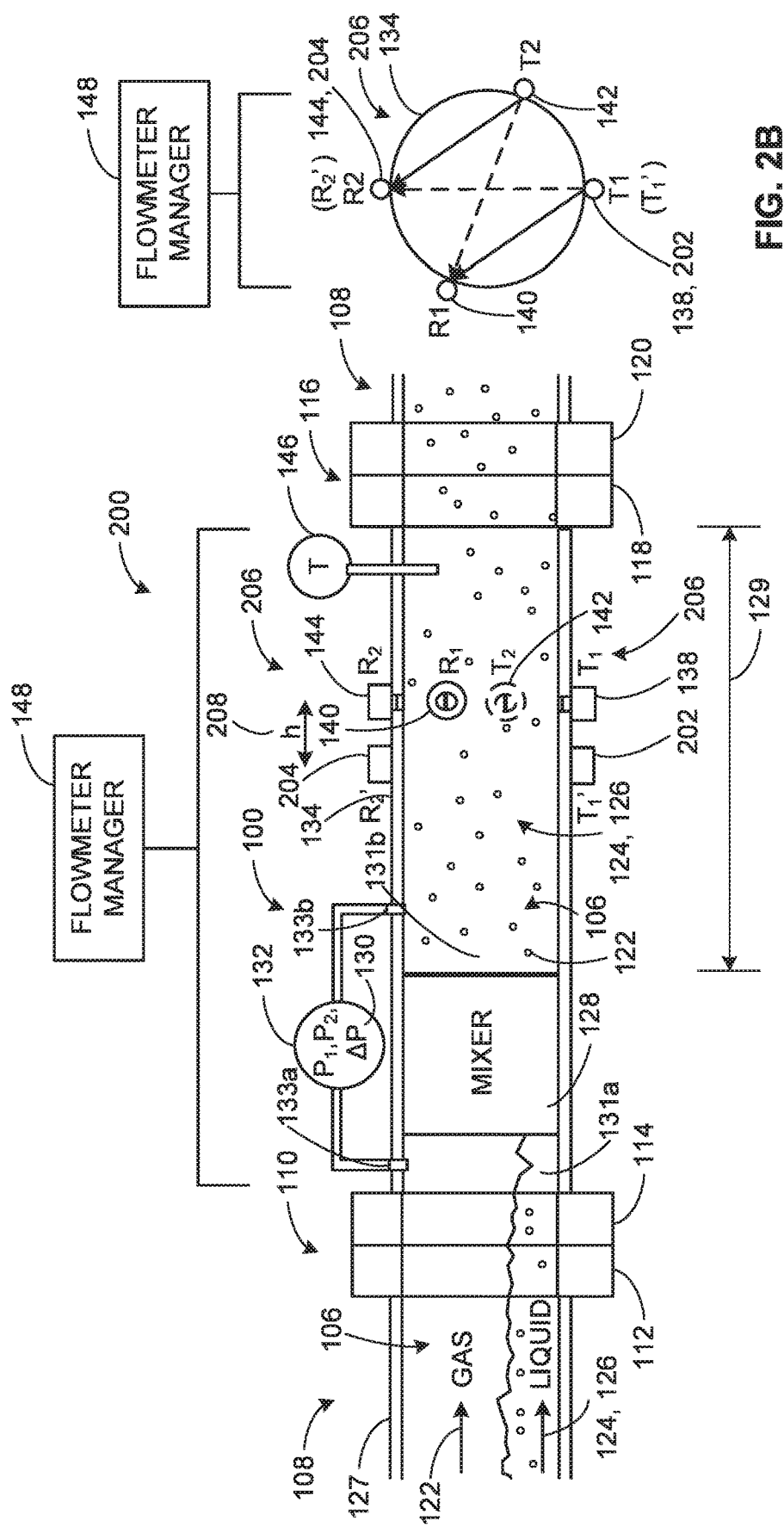
FIG. 2A depicts a second example multiphase flowmeter including the microwave cross-pipe transmission antennas of FIG. 1A and cross-correlation microwave cross-pipe transmission antennas for measuring horizontal gas-liquid three-phase flows.
FIG. 2B depicts a cross-sectional view of the second example multiphase flowmeter of FIG. 2A

The figures are not to scale. In general, the same reference numbers will be used throughout the drawing(s) and accompanying written description to refer to the same or like parts. As used herein, the terms "coupled" and "operatively coupled" are defined as connected directly or indirectly (e.g., through one or more intervening structures and/or layers).

The figures are not to scale. Wherever possible, the same reference numbers will be used throughout the drawing(s) and accompanying written description to refer to the same or like parts.

DETAILED DESCRIPTION

It is to be understood that the present disclosure provides many different embodiments, or examples, for implementing different features of various embodiments. Specific examples of components and arrangements are described below for purposes of explanation and to simplify the present disclosure. These are, of course, merely examples and are not intended to be limiting.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not mandate any particular orientation of the components.

Most oil-gas wells produce oil, gas, and water from an earth formation. For example, a flow of fluid including oil, gas, and water is considered a three-phase flow. In such an example, the three-phase flow includes one gas phase corresponding to the gas component of the flow and two liquid phases corresponding to the oil and water components of the flow. In a horizontal pipe, because of gravity, the water will tend to settle to the bottom of the pipe creating a non-homogenous distribution of the flow. A measurement of the non-homogenous distribution may give an erroneous indication of phase contents due to non-uniformity and varying flow rates of the phase contents.

In prior examples, a nuclear-source fluid densitometer measured the density of fluids in an oil-gas production well using a radioactive source of gamma rays and a detector. In some applications, a nuclear-source fluid densitometer is desired because the nuclear-source fluid densitometer is not affected by for example, oil-water emulsions and gas-liquid foaming. However, the density measurement from the nuclear-source fluid densitometer along a single beam path is phase distribution dependent and may not yield an accurate measurement of pipe-averaged fluid mixture density. A nuclear-source fluid densitometer also has a statistical uncertainty and much less time resolution compared to other measurement devices. In addition, health, safety, and environmental concerns exist for handling, operating, and storing the nuclear source used in the nuclear-source fluid densitometer.

Examples disclosed herein include nuclear-source free multiphase flowmeters for measuring horizontal and vertical gas-liquid three-phase flows. As used herein, the term "multiphase flow" refers to fluid including more than one phase (e.g., a two-phase flow, a three-phase flow, etc.). In some disclosed examples, a mixer (e.g., a static mixer) is used for homogenizing incoming gas-liquid flow. For example, a static mixer may be a plate-type mixer, a helical static mixer, or a mixer including one or more baffles. The mixer of the disclosed examples provides adequate mixing over a wide range of flow conditions to improve an accuracy of measurements corresponding to phase fraction and phase velocity at points downstream of the mixer using measurement devices and techniques disclosed herein.

In some disclosed examples, differential pressure is measured across an inlet and an outlet of the mixer, or across the mixer, to relate the differential pressure to mixture density, or mixed-flow density, and mixture velocity, or mixed-flow velocity. In some disclosed examples, sufficiently downstream of the mixer section (e.g., one or more pipe-diameter lengths downstream of the mixer section), one or more measurement devices are used to measure and/or otherwise monitor one or more characteristics or properties of the gas-liquid flow. In some disclosed examples, measurement devices including ultrasonic or microwave Doppler sensors and/or microwave transmission/reflection cross-correlation sensors are used to measure the mixture velocity of the flow, which can be used to determine the mixture density.

In some disclosed examples, an insertion averaging pitot tube downstream of the mixer section is used to measure a dynamic impact pressure of the mixed gas-liquid flow, which can be used to determine mixture velocity or total volumetric flow rate of the flow. In some disclosed examples, a water-cut sensor such as an optical probe, a near-infrared sensor, or other optical sensor is used to measure a water/liquid ratio. In some disclosed examples, gas, liquid, oil, and water volumetric flow rates can be determined from the total volumetric flow rate, gas/liquid holdup, and/or the water/liquid ratio.

In some disclosed examples, an inline radio-frequency coaxial sensor or an inline microwave coaxial sensor downstream of the mixer section is used to measure the mixture permittivity, or the mixed-flow permittivity, and the mixture conductivity, or the mixed-flow conductivity, of the mixed gas-liquid flow. In some disclosed examples, a first differential pressure is measured across the mixer and a second differential pressure is measured across the inline coaxial sensor to relate the second differential pressure to a mixture density and mixture velocity of the mixed gas-liquid flow. A liquid holdup and water/liquid ratio can be determined using the determined mixture permittivity, mixture conductivity, mixture density, and mixture velocity. Accordingly, volumetric flow rates of gas, liquid, oil, and water can be determined from the mixture velocity, liquid holdup, and the water/liquid ratio. In some disclosed examples, the multiphase flowmeters described herein can be used for wellhead installation to measure and/or otherwise monitor vertical multiphase flows.

FIG. 1A depicts a first example multiphase flowmeter 100 including example Doppler sensors 102, 104 for measuring horizontal gas-liquid three-phase flows 106 in a fluid process system 108. For example, the Doppler sensors 102, 104 may be microwave Doppler sensors or ultrasonic Doppler sensors. The first multiphase flowmeter 100 of FIG. 1A is a nuclear-source free flowmeter. In the illustrated example of FIG. 1A the fluid process system 108 is a substantially horizontal metal piping system coupled to an oil well. The fluid process system 108 of FIG. 1A includes piping disposed between a fluid source such as the oil well, and an inlet 110, and piping after an outlet 116. Alternatively, the example fluid process system 108 may be any other type of distribution piping system or process control environment. The first multiphase flowmeter 100 of FIG. 1A is coupled to an upstream portion of the example fluid process system 108 at the inlet 110 via a first flange 112, or a first fluid connection 112, and a second flange 114. The first multiphase flowmeter 100 of FIG. 1A includes the second flange 114 to couple to the first flange 112 of the example fluid process system 108. Similarly, the first multiphase flowmeter 100 is coupled to a downstream portion of the example fluid process system 108 at the outlet 116 via a third flange 118 and a fourth flange 120.

In the illustrated example of FIG. 1A, the fluid process system 108 facilitates movement of the gas-liquid three-phase flow 106, or the multiphase flow 106. In FIG. 1A, the example multiphase flow 106 is a multiphase fluid 106 or a fluid 106 including more than one phase. The example multiphase flow 106 of FIG. 1A includes phases 122, 124, 126. The first example phase 122 of FIG. 1A is a gas phase corresponding to natural gas or other gas flowing from a wellhead coupled to the fluid process system 108. The second example phase 124 of FIG. 1A is an oil phase corresponding to oil flowing from the wellhead. The third example phase 126 of FIG. 1A is a water phase corresponding to water flowing from the wellhead.

Prior to the first and the second flanges 112, 114, the substantially horizontally conveyed multiphase flow 106 is non-homogenous, or unmixed, in a pipe 127 included in the fluid process system 108 due to the liquid phases 124, 126 settling towards the bottom of the pipe 127 because of gravity. To promote homogeneity of the example multiphase flow 106, the first multiphase flowmeter 100 includes a mixer 128 to mix the multiphase flow 106 upstream of a measurement section 129, or a measurement region 129, of the first example multiphase flowmeter 100. The measurement section 129 of FIG. 1A corresponds to a section of the first multiphase flowmeter 100 disposed between the mixer 128 and the third flange 118 where the multiphase flow 106 is substantially more homogenized compared to the multiphase flow 106 prior to the mixer 128. In FIG. 1A, the mixer 128 includes an inlet 131a (e.g. an inlet area 131a, a mixer inlet 131a, etc.) and an outlet 131b (e.g., an outlet area 131b, a mixer outlet 131b, etc.).

The mixer 128 of the illustrated example is a static mixer, or an artificial flow conditioner, such as a vortex effect mixer, a dual vortex effect mixer, etc. Alternatively, any other type of static mixer or mixer used to homogenize a fluid flow may be used. For example, a vortex inducing structure, a Venturi tube, an orifice plate, baffles, etc., and/or a combination thereof may be used as a flow mixer for all examples described herein in place of the mixer 128. Alternatively, the example mixer 128 may be a dynamic mixer. For example, the mixer 128 may be a mixer including one or more actuated or moving parts to facilitate mixing of the multiphase flow 106.

In the illustrated example of FIG. 1A, a differential pressure ($\Delta P$) 130 is measured across the mixer 128 using a differential pressure sensor 132 to relate the differential pressure 130 to a density (i.e., a mixture density) and a velocity (i.e., a mixture velocity) of the multiphase flow 106. The differential pressure sensor 132 includes a first sensing element connected to a high-pressure port 133a, and a second sensing element connected to a low-pressure port 133b. In FIG. 1A, the sensing element connected to the high-pressure port 133a is disposed at the inlet 131a of the mixer 128 and the second sensing element connected to the low-pressure port 133b is disposed at the outlet 131b of the mixer 128. The differential pressure sensor 132 of FIG. 1A measures a first pressure ($P_1$) of the example multiphase flow 106 at a first position disposed between the second flange 114 and an upstream area of the example mixer 128. The differential pressure sensor 132 of FIG. 1A measures a second pressure ($P_2$) of the example multiphase flow 106 at a second appropriately chosen position disposed between a downstream area of the example mixer 128 and the third flange 118 (e.g., the measurement section 129).

In the illustrated example of FIG. 1A, the first multiphase flowmeter 100 includes the first Doppler sensor 102, or the first Doppler probe 102, and the second Doppler sensor 104, or the second Doppler probe 104, to measure a velocity of the multiphase flow 106. The Doppler probes 102, 104 transmit microwaves or sound waves at microwave frequencies (e.g., a frequency in a range from 10 gigahertz (GHz) to several tens of GHz) or at ultrasonic frequencies (e.g., a frequency in a range from 20 kilohertz to several megahertz (MHz) (e.g., 1 MHz, 10 MHz, etc.)). In FIG. 1A, the Doppler probes 102, 104 measure the velocity of the multiphase flow 106 by transmitting microwave or ultrasonic signals (at an oblique angle with respect to an axial direction of the multiphase flow 106) through the multiphase flow 106. For example, the first Doppler probe 102 may transmit a microwave signal at a specified frequency (e.g., 10 GHz) or an ultrasonic signal at a specified frequency (e.g., 1 MHz) through the multiphase flow 106 to be received by the first Doppler probe 102 and/or the second Doppler probe 104. The mixture velocity of the multiphase flow 106 affects the frequency of the received microwave or ultrasonic signals. For example, the first Doppler probe 102 may transmit a signal (e.g., a microwave signal, an ultrasonic signal, etc.) through the multiphase flow 106 at a first frequency, and receive the signal at a second frequency when the signal is reflected by the moving scatters (such as the liquid droplets 124, 126, and/or the gas bubbles 122), where the difference between the first frequency and the second frequency (i.e., the Doppler frequency shift) is proportional to the velocity of the moving scatters, or proportional to a mixture velocity of the multiphase flow 106.

The Doppler sensors 102, 104 of FIG. 1A are arranged about a circumference of the metal housing 134 of the first multiphase flowmeter 100. In FIG. 1A, the Doppler sensors 102, 104 are coupled to the housing 134 via microwave-energy or ultrasonic-energy transparent windows. For example, the transparent windows may be made of engineering thermoplastics such as polyether-ether-ketone (PEEK) or ceramics. The Doppler sensors 102, 104 may be clamped and/or otherwise coupled to the surface of the metal housing 134 via the use of long-lasting ultrasound-energy coupling gels. The housing 134 of FIG. 1A is a pipe. Alternatively, the example housing 134 may be any other tube-based structure. Although two Doppler probes 102, 104 are depicted in FIG. 1A, alternatively, one Doppler probe or more than two Doppler probes may be used.

In FIG. 1A, the first Doppler sensor 102 is coupled to a first side, or a bottom or a lower portion, of the housing 134 of the first multiphase flowmeter 100 and the second Doppler sensor 104 is coupled to a second side, or a top or an upper portion, of the housing 134. In FIG. 1A, the two Doppler sensors 102, 104 are arranged as such to determine an average of a first mixture velocity at the bottom of the housing 134 and a second mixture velocity at the top of the housing 134. The difference of the first and the second mixture velocities may be used to calculate a quality measure of flow-velocity homogeneity downstream of the mixer 128. As depicted in FIG. 1A, the Doppler sensors 102, 104 are flush mounted and/or otherwise coupled to the housing 134 in a manner that enables the Doppler sensors 102, 104 to transmit and receive signals to and from undisturbed flow. Alternatively, the example Doppler sensors 102, 104 may be disposed in any other positions about a circumference of the housing 134.

In FIG. 1A, the Doppler sensors 102, 104 are disposed in the measurement section 129 of the first multiphase flowmeter 100. In FIG. 1A, the Doppler sensors 102, 104 are disposed at an axial distance of approximately two pipe inner diameters of the housing 134 downstream of the exit of the mixer 128, where the multiphase flow 106 is substantially homogenously mixed. Alternatively, one of the example Doppler sensors 102, 104 may be disposed at fewer than two pipe diameters (e.g., 1 pipe diameter, 1.5 pipe diameters, etc.) or more than two pipe diameters (e.g., 2.5 pipe diameters, 3 pipe diameters, etc.) downstream of the exit of the mixer 128. For example, by disposing the Doppler sensors 102, 104 at different axial distances, the axial flow-velocity variation, which can be used as another flow-velocity homogeneity indicator, may be measured along the downstream of the mixer 128. For example, the Doppler signal energy levels measured by the Doppler sensors 102, 104 may indicate flow mixing homogeneity at the same pipe circumference or at different pipe circumferences.

In the illustrated example of FIG. 1A, the first multiphase flowmeter 100 includes a first radio-frequency (RF) electromagnetic (EM) transmission system 136 (e.g., a microwave EM transmission system, etc.) to measure a permittivity, a conductivity, etc., of the multiphase flow 106. The first example RF EM transmission system 136 of FIG. 1A is a microwave transmission system (e.g., a drift-immune microwave transmission system). For example, the first RF EM transmission system 136 of FIG. 1A may be used to determine a mixture conductivity, a mixture permittivity, etc., which are immune to a gain drift or a thermal drift in measurement electronics within an example flowmeter manager 148 connected to the antennas 138, 140, 142, 144. The first example RF EM transmission system 136 of FIG. 1A includes a first EM transmitter 138 ($T_1$), a first EM receiver ($R_1$) 140, a second EM transmitter 142 ($T_2$), and a second EM receiver 144 ($R_2$). The EM transmitters 138, 142 and the EM receivers 140, 144 of FIG. 1A are RF/microwave-based magnetic-dipole antennas to measure cross-pipe and near cross-pipe transmission amplitude attenuations and phase shifts to derive permittivity and conductivity of the multiphase flow 106, which can be used to determine water-to-liquid ratio (WLR), water conductivity, and water salinity or water density of the multiphase flow 106.

In FIG. 1A, the EM system antennas 138, 140, 142, 144 are appropriately spaced and arranged around the circumference of the metal housing 134 with microwave-energy transparent dielectric windows to measure cross-pipe or near cross-pipe mixture permittivity ($\varepsilon_{mixture}$) and/or mixture conductivity ($\sigma_{mixture}$). For example, the EM transmitters 138, 142 may send one or more signals to the EM receivers 140, 144. Alternatively, the first multiphase flowmeter 100 of FIG. 1A may include one or more than two EM transmitters. Alternatively, the first multiphase flowmeter 100 of FIG. 1A may include one or more than two EM receivers.

In FIG. 1A, the example transmitters 138, 142 and the example receivers 140, 144 are disposed in the measurement section 129 of the first multiphase flowmeter 100. In FIG. 1A, the EM system antennas 138, 140, 142, 144 are disposed at a distance of approximately two to three pipe diameters downstream of the exit of the mixer 128, where the multiphase flow 106 is (substantially) homogenously mixed. Although the example EM system antennas 138, 140, 142, 144 are depicted in FIG. 1A as being disposed downstream of (after) the example Doppler sensors 102, 104, alternatively, the EM system antennas 138, 140, 142, 144 may be disposed upstream of (before) the Doppler sensors 102, 104. Alternatively, the EM system antennas 138, 140, 142, 144 may be disposed at the same circumference (cross section), axial distance, etc., as the Doppler sensors 102, 104.

In the illustrated example of FIG. 1A, the EM system antennas 138, 140, 142, 144 are in communication with the flowmeter manager 148. In FIG. 1A, the example flowmeter manager 148 directs the EM transmitters 138, 142 to transmit EM signals through the multiphase flow 106 in the measurement region 129 to be received by the EM receivers 140, 144. In some examples, the flowmeter manager 148 processes EM data generated by the EM system antennas 138, 140, 142, 144 of FIG. 1A. For example, one or more of the EM transmitters 138, 142 may transmit an EM wave at one or more specified frequencies into the multiphase flow 106 to be received by one or more of the EM receivers 140, 144. In response to receiving the EM wave, the one or more EM receivers 140, 144 may generate EM data (e.g., an amplitude attenuation, a phase shift, a frequency shift, etc.) with respect to the transmitted EM wave. The example EM receivers 140, 144 may communicate the generated EM data to the example flowmeter manager 148. In some examples, the flowmeter manager 148 generates the EM data in response to receiving electrical signals (e.g., analog signals such as a voltage, a current, etc., digital signals, etc.) corresponding to the EM wave from the one or more EM receivers 140, 144.

The example flowmeter manager 148 of FIG. 1A processes the EM data, or the EM cross-pipe transmission measurement data, obtained from the EM receivers 140, 144 by comparing a received signal to a transmitted signal and determining one or more electromagnetic properties of the multiphase flow 106 based on the comparison. For example, the flowmeter manager 148 may calculate an amplitude attenuation and a phase shift of an EM signal received at the first EM receiver 140 transmitted by the first EM transmitter 138. In such an example, the example flowmeter manager 148 may determine a mixture conductivity ($\sigma_{mixture}$) and/or a mixture permittivity ($\varepsilon_{mixture}$) by comparing a first amplitude and a first phase of the received EM signal by the first EM receiver 140 to a second amplitude and a second phase of the transmitted EM signal by the first EM transmitter 138. For example, the flowmeter manager 148 may calculate the attenuation by comparing the first amplitude to the second amplitude and calculate the mixture conductivity ($\sigma_{mixture}$) and/or the mixture permittivity ($\varepsilon_{mixture}$) based on the comparison. In another example, the flowmeter manager 148 may calculate the phase shift by comparing the first phase to the second phase and calculate the mixture conductivity ($\sigma_{mixture}$) and/or the mixture permittivity ($\varepsilon_{mixture}$) based on the comparison.

Turning to FIG. 1B, which depicts a cross-sectional view of the housing 134 of the first multiphase flowmeter 100 of FIG. 1A, the EM system antennas 138, 140, 142, 144 are positioned, installed, or otherwise disposed around a circumference of the housing 134. For example, the EM transmitters 138, 142 of FIG. 1B are coupled to a bottom section of the housing 134. The EM receivers 140, 144 of FIG. 1B are coupled to a top section of the housing 134 to receive one or more signals or transmissions from the EM transmitters 138, 142. For example, the first EM transmitter 138 may emit an electromagnetic signal at a frequency in a range of a few hundred MHz to a few GHz (e.g., a range of 100 MHz to 3 GHz) to one or both of the EM receivers 140, 144 of FIG. 1B. For example, the second EM transmitter 142 may emit an electromagnetic signal at the above frequency to one or both EM receivers 140, 144.

Turning back to FIG. 1A, the first multiphase flowmeter 100 includes a temperature probe 146 inserted into the housing 134 to measure a temperature of the multiphase flow 106 in a downstream section of the measurement region 129 to avoid disturbance to the example Doppler sensors 102, 104 and the example EM system antennas 138, 140, 142, 144.

In operation, the flowmeter manager 148 controls and/or otherwise monitors the first example multiphase flowmeter 100 of FIG. 1A. The flowmeter manager 148 of FIG. 1A obtains measurements from one or more of the Doppler sensors 102, 104, the differential pressure sensor 132, the EM receivers 140, 144, or the temperature probe 146. The flowmeter manager 148 of FIG. 1A controls the EM transmitters 138, 142 by exciting, or enabling, the EM transmitters 138, 142 sequentially to send an electromagnetic signal at a frequency. For example, the flowmeter manager 148 may transmit a first command to the first EM transmitter 138 to emit a first EM signal at a first time at a frequency of 300 MHz to one or both of the EM receivers 140, 144 and transmit a second command to the second EM transmitter 142 at a second time to emit a second EM signal at the frequency of 300 MHz to one or both of the EM receivers 140, 144, etc., where the second time is after the first time. The flowmeter manager 148 of FIG. 1A controls one or both of the Doppler sensors 102, 104 (e.g., controlling both Doppler sensors 102, 104 in parallel) by transmitting a microwave signal (e.g., at a frequency of 10 GHz) or an ultrasound signal (e.g., at a frequency of 1 MHz) to the one or both Doppler sensors 102, 104. In response to the one or both Doppler sensors 102, 104 receiving the microwave signal, the one or both Doppler sensors 102, 104 emit the microwave signal into the multiphase fluid 106.

In the illustrated example of FIG. 1A, the flowmeter manager 148 determines the mixture velocity and the mixture density of the multiphase flow 106 based on the differential pressure 130 ($\Delta P$) (e.g., $\Delta P = P_1 - P_2$). The differential pressure 130 of the multiphase flow 106 may be correlated to the mixture velocity ($u_{mixture}$) and the mixture density ($\rho_{mixture}$) of the multiphase flow 106 downstream of the mixer 128 by an empirical correlation determined from experimental data or modelling data described below in Equation (1):

$$\Delta P \cong \frac{1}{2} k_m \rho_{mixture} u_{mixture}^2 \qquad \text{Equation (1)}$$

In the example of Equation (1) above, the differential pressure 130 is approximately a function ($f_1$) of half of a product of (i) the mixture density and (ii) a square of the mixture velocity, and (iii) a swirl-intensity proportionality constant (e.g., $1 \leq k_m < 1.5$, $k_m = 1$ without swirl, etc.).

The flowmeter manager 148 of FIG. 1A determines a nuclear-source free measurement of total volumetric flow rate ($Q_{total}$) and mixture density ($\rho_{mixture}$) of the multiphase flow 106 using the Doppler probes 102, 104. The example flowmeter manager 148 may determine the velocity of the multiphase flow 106 based on the relationship described below in Equation (2):

$$u_{mixture} \approx u_{doppler} = \frac{c_m}{2\cos\theta} \frac{f_d - f_e}{f_e} \qquad \text{Equation (2)}$$

In Equation (2) above, the term $u_{doppler}$ represents microwave or ultrasonic velocity data, from two or more microwave or ultrasonic Doppler sensors (e.g., multiple-point microwave or ultrasonic data as measured by the Doppler sensors 102, 104 of FIG. 1A). In Equation (2) above, the angle $\theta$ is the microwave or ultrasound emitting beam angle relative to the flow axial direction; $c_m$ is the speed of the electromagnetic or ultrasonic wave in the flow mixture; and $f_e$ and $f_d$ are the microwave or ultrasound emitting frequency and the Doppler-shift (return) frequency, respectively.

In some examples, the Doppler sensors 102, 104 of FIG. 1A generate measurement data (e.g., an amplitude of reflected Doppler signal energy, a frequency shift of a received microwave signal, a frequency shift of a received ultrasound signal, etc.). For example, one or more of the Doppler sensors 102, 104 may transmit a microwave or an ultrasonic wave at a specified frequency into the multiphase flow 106 to be received by one or more of the Doppler sensors 102, 104. In response to receiving the microwave or ultrasonic wave, the one or more Doppler sensors 102, 104 may generate electromagnetic or ultrasonic measurement data corresponding to the microwave or ultrasonic wave. The example Doppler sensors 102, 104 may transmit the electromagnetic or ultrasonic measurement data to the example flowmeter manager 148. In some examples, the flowmeter manager 148 generates the electromagnetic or ultrasonic measurement data in response to receiving electrical signals (e.g., analog signals such as a voltage, a current, etc., digital signals, etc.) corresponding to the microwave or ultrasonic wave from the one or more Doppler sensors 102, 104.

In some examples, the flowmeter manager 148 uses the multiple-point microwave or ultrasonic measurement data to determine the quality of the flow mixing in terms of generating a uniform velocity or a uniform Doppler-energy profile across the vertical diameter of the housing 134. For example, the flowmeter manager 148 may use the electromagnetic or ultrasonic measurement data to evaluate a performance of the mixer 128 homogenizing the multiphase flow 106. For example, the flowmeter manager 148 may calculate a weighted average of first microwave or ultrasonic data from the first Doppler sensor 102 ($u_{doppler,(1)}$) and second microwave or ultrasonic data from the second Doppler sensor 104 ($u_{doppler,(2)}$) to correlate to the homogenous mixture velocity. For example, the first and the second microwave or ultrasonic data may include frequency shifts and/or Doppler-energies of microwave or ultrasonic signals reflected by the multiphase flow 106. For example, the first microwave or ultrasonic data may include (i) a frequency at which the first Doppler probe 102 transmits a microwave or an ultrasonic signal, (ii) a frequency and/or an energy-level at which the first Doppler probe 102 receives a reflected microwave or an ultrasonic signal, (iii) a frequency difference (a Doppler frequency shift) between a first frequency at which the first Doppler probe 102 transmits a microwave or an ultrasonic signal and a second frequency at which the first Doppler probe 102 receives the reflected microwave or ultrasonic signal and/or the second Doppler probe 104 receives the reflected microwave or ultrasonic signal, and/or (iv) an energy-level difference between the reflected microwave or ultrasonic signal received by the first Doppler probe 102 and the reflected microwave or ultrasonic signal received by the second Doppler probe 104.

In the illustrated example of FIG. 1A, the flowmeter manager 148 determines the density (e.g., the mixture density $\rho_{mixture}$) of the multiphase flow 106 based on the Equation (1) above by using the measured differential pressure ($\Delta P$) 130 and the mixture velocity ($u_{mixture}$) as described below in Equation (3):

$$\rho_{mixture} \cong \frac{2\Delta P}{k_m u_{mixture}^2} \qquad \text{Equation (3)}$$

In some examples, the flowmeter manager 148 relates and/or otherwise associates the mixture density determined by Equation (3) to one or more densities of the individual phases 122, 124, 126 of the multiphase flow 106 of FIG. 1. For example, the flowmeter manager 148 can calculate a density of the gas phase 122, or the gas density ($\rho_{gas}$), based on the relationship described below in Equation (4):

$$\rho_{gas} \approx k \frac{P_2}{T} \qquad \text{Equation (4)}$$

In the example of Equation (4), the example flowmeter manager 148 calculates the gas density by evaluating a relationship based on determining a ratio of (i) the second pressure ($P_2$) of the multiphase flow 106 in the measurement region 129 measured with the multi-variable pressure and differential pressure sensor 132 and (ii) the temperature (T) of the multiphase flow 106 in the measurement region 129 measured with the temperature probe 146. In the example of Equation (4) above, the second pressure ($P_2$) is measured in bars and the temperature (T) is measured in Kelvin, and the term k is a proportional constant based on the gas composition. Alternatively, the example flowmeter manager 148 may use other units of measure for the second pressure or the temperature.

In the illustrated example of FIG. 1A, the flowmeter manager 148 relates and/or otherwise associates the mixture density ($\rho_{mixture}$) to the gas density ($\rho_{gas}$), the oil density ($\rho_{oil}$), and the water density ($\rho_{water}$) corresponding to the phases 122, 124, 126 of the multiphase flow 106 at the measured fluid pressure ($P_2$) and the measured fluid temperature (T) of the multiphase flow 106 in the measurement region 129 from the pressure-volume-temperature (PVT) fluids model. The mixture density ($\rho_{mixture}$) can be written in the example of Equation (5) below:

$$\rho_{mixture} = \rho_{gas}\alpha_{gas} + \rho_{oil}\alpha_{oil} + \rho_{water}\alpha_{water} \qquad \text{Equation (5)}$$

Note that the sum of the fluid holdups is unity (e.g., $\alpha_{gas} + \alpha_{oil} + \alpha_{water} = 1$). In the example of Equation (5) above, the gas, oil, and water holdups ($\alpha_{gas}$, $\alpha_{oil}$, $\alpha_{water}$) represent the fraction of gas, oil, and water present in a measurement area of interest (e.g., the measurement cross section formed by the Doppler probes 102, 104, and by the EM antennas 138, 140, 142, 144, within the measurement region 129). In a homogenized multiphase flow (e.g., the multiphase flow 106) at an appropriate axial distance downstream of the mixer 128, each fluid moves at substantially the same speed. The holdup of a particular fluid is substantially the same as the flow-rate proportion relative to the total flow rate due to that fluid, also known as a cut of the particular fluid.

As demonstrated in the example of Equation (5) above, the phase densities ($\rho_{gas}$, $\rho_{oil}$, $\rho_{water}$) are implicitly dependent on pressure and temperature. For example, the water and oil densities decrease with increasing temperature, but increase with increasing pressure, as calculated using the PVT models, or alternatively, an equation-of-state (EOS) equation for the phases 122, 124, 126 of the multiphase flow 106. For example, the flowmeter manager 148 may determine the phase densities by evaluating an EOS equation, or a thermodynamic equation relating state variables which describe the state of matter for a phase under a given set of physical conditions, such as pressure, volume, and temperature.

In the illustrated example of FIG. 1A, the flowmeter manager 148 modifies the mixture density ($\rho_{mixture}$) relationship described above in the example of Equation (5) by relating the mixture density ($\rho_{mixture}$) to the water/liquid ratio (WLR) and the liquid holdup ($\alpha_{liquid}$), as described below in Equation (6a):

$$\rho_{mixture} = [WLR\rho_{water} + (1-WLR)\rho_{oil}]\alpha_{liquid} + \rho_{gas}(1-\alpha_{liquid}) \qquad \text{Equation (6a)}$$

$$\text{Or } \rho_{mixture} = \rho_{liquid}\alpha_{liquid} + \rho_{gas}(1-\alpha_{liquid}) \qquad \text{Equation (6b)}$$

$$\text{where } \rho_{liquid} = WLR\rho_{water} + (1-WLR)\rho_{oil} \qquad \text{Equation (6c)}$$

In the example of Equation (6a) or Equation (6b) above, the liquid holdup ($\alpha_{liquid} = \alpha_{oil} + \alpha_{water}$) represents the fraction of liquid (e.g., oil and water) present in a measurement area of interest (e.g., the measurement cross section formed by the Doppler probes 102, 104, and by the EM antennas 138, 140, 142 and 144, within the measurement region 129). Note that $WLR = \alpha_{water}/\alpha_{liquid}$.

In some examples, to determine in-situ flow rates, the flowmeter manager 148 determines the holdup and the velocity of each fluid. As a result, the example relationships described above in Equations (3) and (6a) can more generally be described below in Equation (7):

$$\rho_{mixture} = [WLR\rho_{water} + (1-WLR)\rho_{oil}]\alpha_{liquid} + \quad \text{Equation (7)}$$

$$\rho_{gas}(1-\alpha_{liquid}) \cong \frac{2\Delta P}{k_m u_{mixture}^2}$$

In some examples, for the flowmeter manager 148 to determine the WLR and the liquid holdup ($\alpha_{liquid}$), the flowmeter manager 148 obtains data from the first RF EM transmission system 136. For example, the flowmeter manager 148 may obtain EM microwave cross-pipe transmission measurements from the receivers 140, 144 by directing the transmitters 138, 142 to emit an EM signal at one or more specified frequencies. The example flowmeter manager 148 of FIG. 1A may determine a mixture permittivity ($\varepsilon_{mixture}$) and/or a mixture conductivity ($\sigma_{mixture}$) of the multiphase flow 106 based on obtaining and processing the EM measurements (e.g., the transmission amplitude-attenuation (AT) and phase-shift (PS) data or measurements). For example, the EM measurements may include data such as amplitude-attenuation data and phase-shift data. The example EM measurements correspond to AT and PS measurements obtained from the measurement pairs $T_2$-$R_1$, and $T_2$-$R_2$ as depicted in FIG. 1B. For example, the EM measurements may correspond to further processed differential-compensated phase shift and amplitude-attenuation measurements to determine the permittivity and/or the conductivity of the multiphase flow 106 as demonstrated by the EM transmission measurement system described in U.S. Pat. No. 8,536,883, entitled "METHOD OF MEASURING A MULTIPHASE FLOW," filed Apr. 29, 2010, which is hereby incorporated by reference herein in its entirety. For example, the flowmeter manager 148 may calculate the permittivity and/or the conductivity of the multiphase flow 106 based on processing the obtained EM AT and PS measurements at an emitting frequency f as described below in Equations (8) and (9):

$$\varepsilon_{mixture}=F_{1,inv}(AT,PS;2\pi f)=F_{1,mix}(WLR,\alpha_{liquid};\varepsilon_{water}, \varepsilon_{oil},\varepsilon_{gas}) \quad \text{Equation (8)}$$

$$\sigma_{mixture}=F_{2,inv}(AT,PS;2\pi f)=F_{2,mix}(WLR,\alpha_{liquid};\sigma_{water}) \quad \text{Equation (9)}$$

In some examples, the flowmeter manager 148 models the permittivity of a water-continuous oil-water well-mixed liquid (e.g., an aqueous solution where oil is in droplet form or oil droplets are suspended in water) as a function of WLR by using a dielectric mixing law as implicitly described below in Equation (10):

$$\varepsilon_{liquid}=\varepsilon_{water}\times g_w(WLR) \quad \text{Equation (10)}$$

In the example of Equation (10) above, the example flowmeter manager 148 calculates the liquid permittivity ($\varepsilon_{liquid}$) by multiplying the water permittivity ($\varepsilon_{water}$) and a ratio $g_w$ of WLR-based values.

In some examples, the flowmeter manager 148 of FIG. 1A can model the permittivity of a well-mixed gas-oil-water mixture (e.g., the multiphase flow 106 in the measurement region 129) as a function of liquid holdup ($\alpha_{liquid}$) as described below in Equation (11):

$$\varepsilon_{mixture}=\varepsilon_{liquid}\times h_w(\alpha_{liquid}) \quad \text{Equation (11)}$$

where $h_w$ is a multiplying factor which is a function of the liquid holdup ($\alpha_{liquid}$). In some examples, the flowmeter manager 148 combines Equations (10) and (11) above to generate a 3-phase permittivity-mixing model (e.g., a model implied by Equation (8) above) as described below in Equation (12):

$$\varepsilon_{mixture}=\varepsilon_{water}\times g_w(WLR)\times h_w(\alpha_{liquid}) \quad \text{Equation (12)}$$

In some examples, the flowmeter manager 148 models the conductivity of a water-continuous oil-water well-mixed liquid as a function of WLR as described below in Equation (13):

$$\sigma_{liquid}=\sigma_{water}\times g_w(WLR) \quad \text{Equation (13)}$$

In the example of Equation (13) above, the example flowmeter manager 148 calculates the liquid conductivity ($\sigma_{liquid}$) by multiplying the water conductivity ($\sigma_{water}$) and a ratio $g_w$ of WLR-based values.

In some examples, the flowmeter manager 148 of FIG. 1A can model the conductivity of a well-mixed gas-oil-water mixture (e.g., the multiphase flow 106 in the measurement region 129) as a function of liquid holdup ($\alpha_{liquid}$) as described below in Equation (14):

$$\sigma_{mixture}=\sigma_{liquid}\times h_w(\alpha_{liquid}) \quad \text{Equation (14)}$$

In some examples, the flowmeter manager 148 combines Equations (13) and (14) above to generate a 3-phase conductivity-mixing model (e.g., a model implied by Equation (9) above) as described below in Equation (15):

$$\sigma_{mixture}=\sigma_{water}\times g_w(WLR)\times h_w(\alpha_{liquid}) \quad \text{Equation (15)}$$

In some examples, the flowmeter manager 148 can model the liquid mixture permittivity of an oil-continuous oil-water mixture (e.g., a solution where water is in droplet form or water droplets are suspended in oil, where $\sigma_{mixture}\approx 0$ due to $\sigma_{oil}\approx 0$, etc.) as a function of the WLR based on an appropriate dielectric mixing model as implicitly described below in Equation (16):

$$\varepsilon_{liquid}=\varepsilon_{oil}\times g_o(WLR) \quad \text{Equation (16)}$$

In some examples, the flowmeter manager 148 can model a well-mixed gas-oil hydrocarbon (HC) mixture permittivity as implicitly described below in Equation (17):

$$\varepsilon_{HC}=\varepsilon_{HC}(\varepsilon_{oil},\varepsilon_{gas},\alpha_{liquid}) \quad \text{Equation (17)}$$

As a result, the example flowmeter manager 148 can generate the well-mixed oil-continuous 3-phase mixture permittivity corresponding to the multiphase flow 106 of FIG. 1A as described below in Equations (18) and (19):

$$\varepsilon_{mixture}=\varepsilon_{HC}\times g_o(WLR) \quad \text{Equation (18)}$$

$$\varepsilon_{mixture}=\varepsilon_{HC}(\varepsilon_{oil},\varepsilon_{gas},\alpha_{liquid})\times g_o(WLR) \quad \text{Equation (19)}$$

The example of Equation (19) above corresponds to the example of Equation (8) above when oil is the continuous phase.

For water-continuous flows, the example flowmeter manager 148 of FIG. 1A can determine the mixture WLR and the liquid holdup by either (i) solving Equations (6a) and (12), or (ii) solving Equations (6a) and (15). By solving Equations (6a) and (12), the example flowmeter manager 148 can determine the mixed-flow WLR and the liquid holdup. Equation (12) can be rearranged as Equation (20) below to derive the mixed-flow WLR:

$$WLR \leftarrow g_w(WLR) = \left(\frac{\varepsilon_{mixture}}{\varepsilon_{water}}\right)\frac{1}{h_w(\alpha_{liquid})} \quad \text{Equation (20)}$$

Similarly, by solving Equations (6a) and (15), the example flowmeter manager 148 can determine the mixed-flow WLR and the liquid holdup. Equation (15) can be rearranged as Equation (21) below:

$$WLR \leftarrow g_w(WLR) = \left(\frac{\sigma_{mixture}}{\sigma_{water}}\right)\frac{1}{h_w(\alpha_{liquid})} \quad \text{Equation (21)}$$

In some examples, the flowmeter manager 148 determines a brine-water conductivity ($\sigma_{water}$) and a brine-water permittivity ($\varepsilon_{water}$), or a salinity or a brine density determination, by calculating a ratio of the measured (drift-free) mixture conductivity ($\sigma_{mixture}$) and the measured mixture permittivity ($\varepsilon_{mixture}$), given the fluid temperature measured by the temperature probe 146. From Equations (12) and (13), it can be derived that, for water-continuous flows, the conductivity/permittivity ratio of a mixed flow is substantially equal to that of the water flow, i.e., $$\frac{\sigma_{mixture}}{\varepsilon_{mixture}} = \frac{\sigma_{water}}{\varepsilon_{water}},$$

independent of variations in the WLR and/or liquid holdup. This forms the method of determining multiphase-flow water conductivity and water permittivity, as described in U.S. Pat. No. 6,831,470, entitled "METHODS AND APPARATUS FOR ESTIMATING ON-LINE WATER CONDUCTIVITY OF MULTIPHASE MIXTURES," filed May 30, 2002, which is hereby incorporated by reference herein in its entirety. In some examples, as implied above in Equations (8) and (9), or Equations (20) and (21), the flowmeter manager 148 can make (substantially) salinity-independent WLR and liquid-holdup ($\alpha_{liquid}$) determinations. Similarly, for oil-continuous flows, the example flowmeter manager 148 of FIG. 1A can determine the mixed-flow WLR and the liquid holdup ($\alpha_{liquid}$) by solving the examples of Equations (6a) and (19) above. Equation (19) can be rearranged by the example flowmeter manager 148 as Equation (22) below to derive the mixed-flow WLR:

$$WLR \leftarrow g_0(WLR) = \frac{\varepsilon_{mixture}}{\varepsilon_{HC}(\varepsilon_{oil}, \varepsilon_{gas}, \alpha_{liquid})} \quad \text{Equation (22)}$$

In response to the example flowmeter manager 148 determining parameters of the multiphase flow 106 such as the mixture WLR and the liquid holdup ($\alpha_{liquid}$), and identifying parameters such as the area of the pipe 134 ($A_{pipe}$), the flowmeter manager 148 can determine the total volumetric flow rate ($Q_{total}$), (the gas volumetric flow rate ($Q_{gas}$), the liquid volumetric flow rate ($Q_{liquid}$), the water volumetric flow rate ($Q_{water}$), and/or the oil volumetric flow rate ($Q_{oil}$) based on Equations (23a)-(23e) below:

$$Q_{total} = u_{mixture} \times A_{pipe} \quad \text{Equation (23a)}$$

$$Q_{gas} = Q_{total} \times (1 - \alpha_{liquid}) \quad \text{Equation (23b)}$$

$$Q_{liquid} = Q_{total} \times \alpha_{liquid} \quad \text{Equation (23c)}$$

$$Q_{water} = Q_{liquid} \times WLR \quad \text{Equation (23d)}$$

$$Q_{oil} = Q_{liquid} \times (1 - WLR) \quad \text{Equation (23e)}$$

FIG. 2A depicts a second example multiphase flowmeter 200 including microwave cross-pipe transmission antennas 138, 140, 142, 144, 202, 204 for measuring horizontal gas-liquid three-phase flows (e.g., the multiphase flow 106 of FIGS. 1A and 2A). The second multiphase flowmeter 200 of FIG. 2A includes the example mixer 128, the example differential pressure sensor 132, the first and second example EM transmitters 138, 142, the first and second example EM receivers 140, 144, the example temperature sensor 146, and the example flowmeter manager 148 of FIG. 1A. In connection with the illustrated example of FIG. 2A, the structure, function, and/or operation of each of the example mixer 128, the example differential pressure sensor 132, the first and second example EM transmitters 138, 142, the first and second example EM receivers 140, 144, the example temperature sensor 146, and the example flowmeter manager 148 is/are the same as the corresponding structure, function, and/or operation of the example mixer 128, the example differential pressure sensor 132, the first and second example EM transmitters 138, 142, the first and second example EM receivers 140, 144, the example temperature sensor 146, and the example flowmeter manager 148 of FIG. 1A described above. Thus, in the interest of brevity, the structure, function, and/or operation of these components, structures, and/or operation are not repeated herein.

In the illustrated example of FIG. 2A, the second multiphase flowmeter 200 includes a second RF EM transmission system 206 to measure an amplitude attenuation, a phase-shift, etc., and/or a combination thereof to determine a permittivity, a conductivity, etc., of the multiphase flow 106. The second RF EM transmission system 206 of FIG. 2A is a microwave transmission system (e.g., a drift-immune microwave transmission system). The second RF EM transmission system 206 of FIG. 2A includes the first EM transmitter 138 ($T_1$), the first EM receiver ($R_1$) 140, the second EM transmitter 142 ($T_2$), the second EM receiver 144 ($R_2$), a third EM transmitter 202 ($T_1'$), and a third EM receiver 204 ($R_2'$). The third example EM transmitter 202 and the third example EM receiver 204 of FIG. 2A are RF/microwave-based magnetic-dipole antennas.

In the illustrated example of FIG. 2A, the flowmeter manager 148 obtains first data including first cross-diameter attenuation data measured by the antenna pair $T_1'$-$R_2'$ 202, 204 to cross-correlate with second data including second cross-diameter attenuation data measured by the antenna pair $T_1$-$R_2$ 138, 144. As depicted in FIG. 2A, the antenna pair $T_1'$-$R_2'$ is disposed at a center-line distance h 208, or an axial spacing h 208, upstream of the antenna pairs $T_1$-$R_2$ 138, 144 and $T_2$-$R_1$ 140, 142 to measure mixture velocity ($u_{mixture}$) based on determining a cross-correlation transit-time ($\tau$) as described below in Equation (24a):

$$u_{mixture} = \frac{h}{\tau} \quad \text{Equation (24a)}$$

As used herein, the term "cross-correlation" and variants thereof refer to a measure of similarity of two series, or sets of data, as a function of the displacement of one series relative to another in time.

As depicted in FIG. 2A, cross-correlation between the signals measured by axially-spaced EM transmitter-receiver antenna-pairs may be used to determine mixture velocity. In some examples, other antenna-pairs can be used for cross-correlation mixture velocity determination, such as a non-cross-diameter pair $T_1$-$R_1$ 138, 140 and a similarly arranged non-cross diameter pair $T_1'$-$R_1'$ 202, 204 separated by a known axial distance (h) 208. As described below in connection with Equations (24b) and (24c), the measured signals (S) may be voltage, current, amplitude attenuation (AT), phase-shift (PS), permittivity, or conductivity. The axial spacing h between the transmitter-receiver antenna-pairs ($T_1$-$R_2$ and $T_1'$-$R_2'$) are suitably chosen and known. The rolling short-duration $\Delta T$ (e.g., 1 second) flow-velocity $u(\Delta T)$ from the transmitter-receiver pairs may be obtained by determining the transit-time $\tau(\Delta T)$, which corresponds to the peak values of the cross-correlation function $R_{ud}(\tau)$ between the instantaneous (e.g., kHz data sampling rate) signals $S_u(t)$ and $S_d(t)$ measured by the transmitter-receiver pairs $T_1$-$R_2$ and $T_1'$-$R_2'$.

$$u(\Delta T) = \frac{h}{\tau(\Delta T)} \quad \text{Equation (24b)}$$

$$\tau(\Delta T) \xleftarrow{maximum} R_{ud}(\tau) = \frac{1}{\Delta T} \int_0^{\Delta T} S_u(t) S_d(t-\tau) dt \quad \text{Equation (25)}$$

In FIG. 2A, the first EM transmitter 138 and the first EM receiver 140 are disposed at a first position, or a first axial position or a first axial location, on the pipe 134. In FIG. 2A, the second EM transmitter 142 and the second EM receiver 144 are disposed at the first position on the pipe 134. In FIG. 2A, the third EM transmitter 202 and the third EM receiver 204 are disposed at a second position, or a second axial distance, on the pipe 134.

Turning to FIG. 2B, which depicts a cross-sectional view of the housing 134 of the second multiphase flowmeter 200 of FIG. 2A, the EM system antennas 138, 140, 142, 144, 202, 204 are positioned, installed, or otherwise disposed around two different cross sections, or two different circumferences of the housing 134. For example, the EM transmitters 138, 142, 202 of FIG. 2B are coupled to a bottom section of the housing 134. The EM receivers 140, 144, 204 of FIG. 2B are coupled to a top section of the housing 134 to receive one or more signals or transmissions from the EM transmitters 138, 142, 202. For example, the first EM transmitter 202 may emit an electromagnetic signal at a frequency in a range of a few hundred MHz to a few GHz (e.g., a range of 100 MHz to 3 GHz) to one or more of the EM receivers 140, 144, 204 of FIG. 2B.

Turning back to FIG. 2A, the example transmitters 138, 142, 202 and the example receivers 140, 144, 204 are appropriately spaced and arranged around two different cross sections, or two different circumferences, of the housing 134. The example EM antennas 138, 140, 142, 144, 202, 204 are disposed in the measurement section 129 of the second example multiphase flowmeter 200. In FIG. 2A, the first and second EM transmitters 138, 142, and the first and second EM receivers 140, 144 are disposed at a distance of two pipe diameters downstream of the exit of the mixer 128. Alternatively, the example EM system antennas 138, 140, 142, 144 may be disposed at fewer than two pipe diameters (e.g., 1.5 pipe diameters) or more than two pipe diameters (e.g., 3 pipe diameters) downstream of the exit of the mixer 128.

In FIG. 2A, the third EM transmitter 202 and the third EM receiver 204 are disposed at a distance of 2.5 pipe diameters downstream of the mixer 128. Alternatively, the example EM system antennas 138, 140, 142, 144 may be disposed at a distance less than 2.5 pipe diameters or more than 2.5 pipe diameters downstream of the mixer 128. Although the example EM system antennas 138, 140, 142, 144 are depicted in FIG. 2A as being disposed downstream of (after) the example $T_1'$-$R_2'$ pair 202, 204, alternatively, the first and second transmitters 138, 142, and the first and second receivers 140, 144 may be disposed upstream of (before) the $T_1'$-$R_2'$ pair 202, 204.

Figure 3:
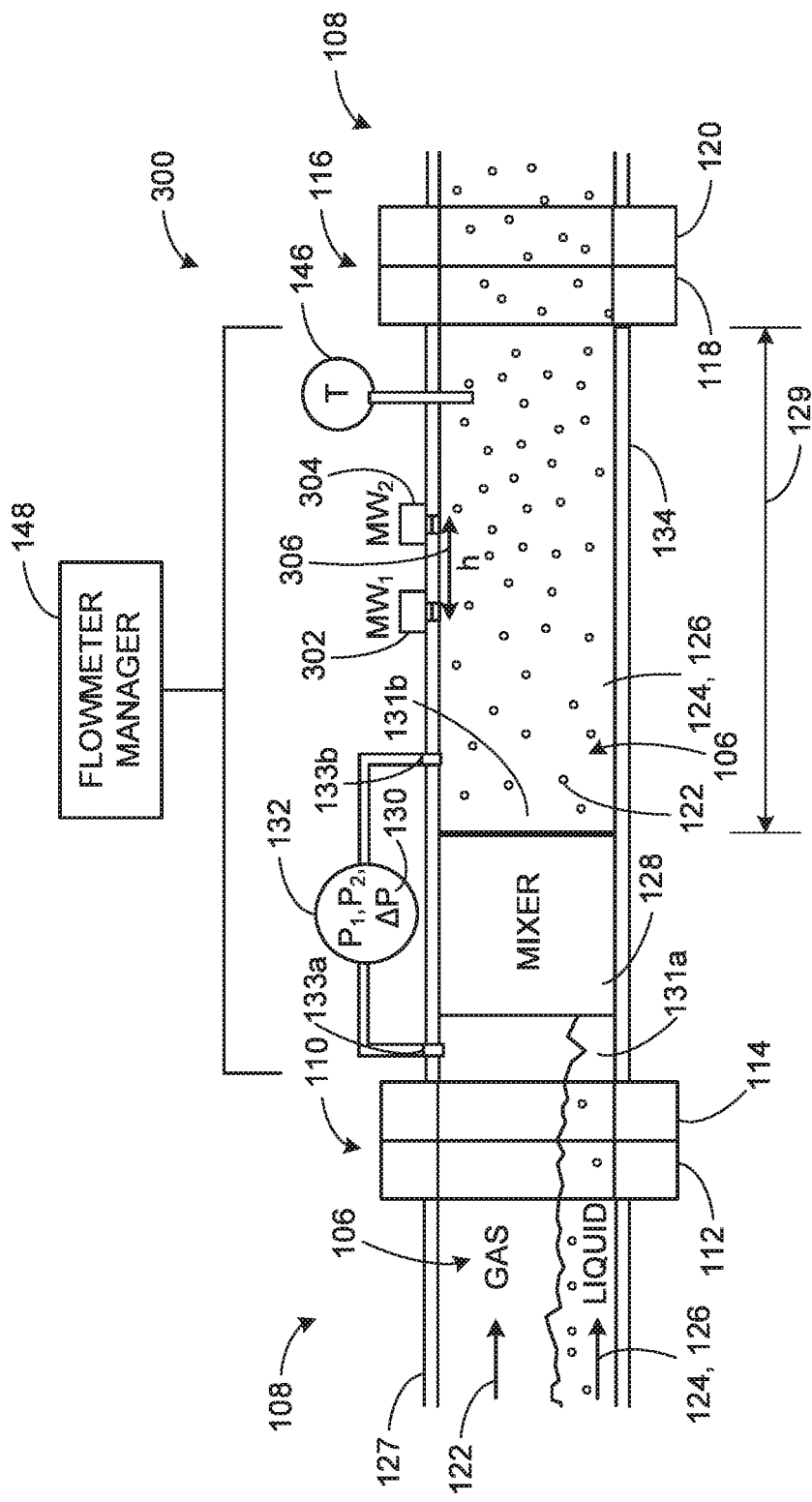
FIG. 3 depicts a third example multiphase flowmeter including microwave probes for measuring horizontal gas-liquid three-phase flows.

FIG. 3 depicts a third example multiphase flowmeter 300 including microwave probes 302, 304 for measuring horizontal gas-liquid three-phase flows (e.g., the multiphase flow 106 of FIGS. 1A, 2A, and 3). The third multiphase flowmeter 300 of FIG. 3 includes the example mixer 128, the example differential pressure sensor 132, the example temperature sensor 146, and the example flowmeter manager 148 of FIGS. 1A and 2A. In connection with the illustrated example of FIG. 3, the structure, function, and/or operation of each of the example mixer 128, the example differential pressure sensor 132, the example temperature sensor 146, and the example flowmeter manager 148 is/are the same as the corresponding structure, function, and/or operation of the example mixer 128, the example differential pressure sensor 132, the example temperature sensor 146, and the example flowmeter manager 148 of FIGS. 1A and 2A described above. Thus, in the interest of brevity, the structure, function, and/or operation of these components, structures, and/or operation are not repeated herein.

In the illustrated example of FIG. 3, the pair of microwave probes ($MW_1$ and $MW_2$) 302, 304 are microwave reflection open-coaxial probes. For example, each of the microwave probes 302, 304 functions as both a transmitter and a receiver. For example, the first microwave probe ($MW_1$) 302 may operate by transmitting EM energy into the multiphase flow 106 (e.g., the flowmeter manager 148 directs $MW_1$ 302 to transmit the EM energy) and receiving the reflected EM energy (e.g., the flowmeter manager 148 directs $MW_1$ to receive the reflected EM energy) when the transmitted EM energy is reflected by the multiphase flow 106 located near the front-aperture of the probe $MW_1$ 302. In FIG. 3, the depth of investigation or the depth of the measurement region of an open-coaxial probe is approximately several millimeters into the multiphase flow 106.

In the illustrated example of FIG. 3, the example flowmeter manager 148 calculates a first permittivity or conductivity by calculating a first reflection coefficient as described below in connection with the example of Equation (35), which is a ratio between (i) a first signal measured by the flowmeter manager 148 where the first signal is the EM energy transmitted by $MW_1$ 302 and (ii) a second signal measured by the flowmeter manager 148 where the second signal is the reflected EM energy received by $MW_1$ 302.

Similarly, in the illustrated example of FIG. 3, the flowmeter manager 148 calculates a second permittivity or conductivity by calculating a second reflection coefficient, which is a ratio between (i) a first signal measured by the flowmeter manager 148 where the first signal is the EM energy transmitted by $MW_2$ 304 and (ii) a second signal measured by the flowmeter manager 148 where the second signal is the reflected EM energy received by $MW_2$ 304. The example flowmeter manager 148 calculates a cross-correlation transit-time ($\tau$) based on a comparison of the first reflection coefficient (or reflected signal) and the second reflection coefficient (or reflected signal).

The example microwave probes 302, 304 of FIG. 3 are flush mounted downstream of the exit of the mixer 128 at an axial distance approximately two inner-diameter of the pipe 134, and at an inter-probe axial spacing h 306, or an inter-probe axial distance h 306, to measure the mixture velocity ($u_{mixture}$) of the multiphase flow 106. For example, the flowmeter manager 148 may measure the mixture velocity by determining cross-correlation transit-time data ($\tau$) of first data (e.g., reflected signals) measured by the first microwave probe 302 and second data (e.g., reflected signals) measured by the second microwave probe 304. In the illustrated example of FIG. 3, the flowmeter manager 148 obtains microwave data (e.g., at least one reflection coefficient which is representative of fluid mixture impedance as described below in connection with the examples of Equations (36) and (37)) from the microwave probes 302, 304 to calculate mixture permittivity, mixture conductivity (see Equation (38) below), and brine conductivity or salinity;

brine conductivity or salinity is derived based on the calculated mixture permittivity and mixture conductivity. The example flowmeter manager 148 of FIG. 3 can determine the velocity of the multiphase flow 106 by evaluating Equations (24b) and (25) above using the cross-correlation transit-time ($\tau$) calculated from the microwave data (e.g., reflected signals) measured by the axially-spaced microwave probes 302, 304.

In the illustrated example of FIG. 3, the flowmeter manager 148 determines the differential pressure 130 by obtaining pressure measurements as measured across the mixer 128 from the differential pressure sensor 132. In FIG. 3, the flowmeter manager 148 determines a temperature (T) of the multiphase flow 106 in the measurement region 129. In the illustrated example of FIG. 3, the flowmeter manager 148 determines one or more of the mixture WLR, the liquid holdup ($\alpha_{liquid}$), etc., by evaluating one or more of the relationships described in the examples of Equations (1)-(22) above (e.g., the flowmeter manager 148 may determine a parameter of the multiphase flow 106 by using one or more of the Equations (1)-(22) above). In the illustrated example of FIG. 3, the flowmeter manager 148 determines the total phase volumetric flow rate ($Q_{total}$) and/or one or more of the individual volumetric flow rates ($Q_{gas}$, $Q_{liquid}$, $Q_{oil}$, $Q_{water}$) by evaluating one or more of the relationships described in the examples of Equations (23a)-(23e) above (e.g., the flowmeter manager 148 may solve one or more of the Equations (23a)-(23e) above).

Figure 4:
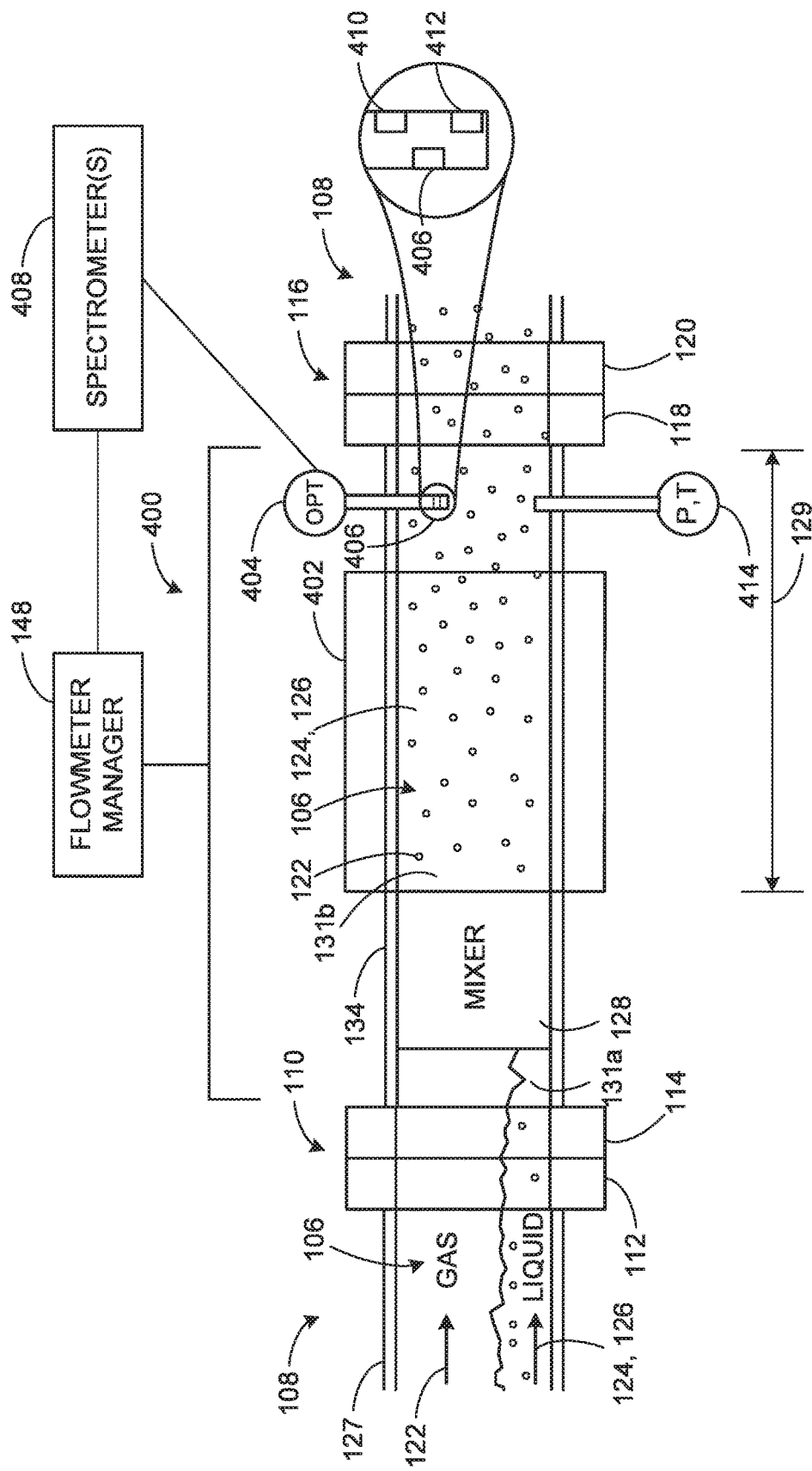
FIG. 4 depicts a fourth example multiphase flowmeter including an example Coriolis flowmeter and an example near-infrared probe for measuring horizontal gas-liquid three-phase flows.

FIG. 4 depicts a fourth example multiphase flowmeter 400 including an example Coriolis flowmeter 402 and an example optical sensor 404 for measuring horizontal gas-liquid three-phase flows (e.g., the multiphase flow 106 of FIGS. 1A, 2A, and 3). In the illustrated example of FIG. 4, the fourth multiphase flowmeter 400 includes the Coriolis flowmeter 402 disposed downstream of the mixer 128 to determine a total mass flow rate ($q_{total}$) and a mixture density ($\rho_{mixture}$) of the multiphase flow 106. The Coriolis flowmeter 402 of FIG. 4 may be a full-bore Coriolis flowmeter. Although a Coriolis flowmeter is depicted in FIG. 4, any other type of flowmeter that can measure a total mass flow rate and/or a mixture density may be used.

In the illustrated example of FIG. 4, the fourth multiphase flowmeter 400 includes the optical sensor 404 to measure a WLR of the multiphase flow 106. The optical sensor 404 of FIG. 4 is an optical immersion probe based on multiple-wavelength band near-infrared (NIR) and/or ultraviolet (UV) sensing principles, such as the immersion probe described in U.S. Pat. No. 9,234,420, entitled "IMMERSION PROBE USING ULTRAVIOLET AND INFRARED RADIATION FOR MULTI-PHASE FLOW ANALYSIS," filed Dec. 17, 2010, which is hereby incorporated by reference herein in its entirety. For example, the optical sensor 404 may include one or more light sources providing continuous light emission over a broadband spectrum of ultraviolet (UV) and NIR light and/or the visible spectrum range (e.g., visible light).

The optical sensor 404 of FIG. 4 measures an amount of water and oil in a mixed liquid entrained with gas bubbles, or the water-cut or oil-cut, in the multiphase flow 106 by transmitting two or more types of radiation across a flow gap 406 to determine absorptions of two or more substances of the multiphase flow 106 flowing across the flow gap 406. In some examples, the optical sensor 404 of FIG. 4 is referred to as an optical water-cut probe or a water-cut sensor. For example, the types of radiation may include broadband ultraviolet (UV) radiation, near-infrared radiation, etc., and/or a combination thereof to gather absorption data at and/or around at least one of the water peaks and/or around one or more oil or oil-condensate peaks. For example, the broadband UV radiation, the near-infrared radiation, etc., is attenuated through absorption and/or scattering by the multiphase flow 106 in the flow gap 406.

In the illustrated example of FIG. 4, the flowmeter manager 148 calculates the water-cut of the multiphase flow 106 over a wide range of gas volume fractions by using the absorption data from the optical sensor 404. For example, the flowmeter manager 148 may determine the water and oil volume fractions across the flow gap 406 based on one or more spectrometers 408 communicatively coupled to the optical sensor 404 analyzing the attenuated radiation. The spectrometer(s) 408 of FIG. 4 may include one or more UV spectrometer(s), NIR spectrometer(s), visible light spectrometer(s), etc., and/or a combination thereof. In FIG. 4, the flowmeter manager 148 is communicatively coupled to the one or more spectrometers 408, which is/are communicatively coupled to the optical sensor 404. Alternatively, the example flowmeter manager 148 may obtain data (e.g., attenuation data due to absorption and scattering over a wide optical spectral range) from the optical sensor 404, transmit the data to the spectrometer(s) 408, receive processed data from the spectrometer(s) 408, and determine at least a WLR of the multiphase flow 106 based on the processed data from the spectrometer(s) 408.

The optical sensor 404 of FIG. 4 include two pressure ports 410, 412. Alternatively, the example optical sensor 404 may include one or more than two pressure ports. The pressure ports 410, 412 included in the optical sensor 404 to monitor pressure of the multiphase flow 106. In the illustrated example of FIG. 4, the flowmeter manager 148 obtains the pressure measurements from the optical sensor 404 to determine the impact pressures and flow rates of the phases 122, 124, 126 of the multiphase flow 106.

In FIG. 4, the optical sensor 404 is removably coupled to the pipe 134. For example, the optical sensor 404 may be retrievable from the pipe 134. The flow gap 406 of the optical sensor 404 of FIG. 4 may be adjustable. For example, the flowmeter manager 148 may generate a recommendation to increase or decrease a size of the flow gap 406 to alter an amount or thickness of fluid measured in the flow gap 406. For example, in response to retrieving the optical sensor 404 from the pipe 134, the flowmeter manager 148 may generate a recommendation to adjust the flow gap 406 to a more appropriate separation to improve and/or otherwise optimize optical-attenuation measurement range, corresponding to the optical absorption and scattering properties of the oil and water fluids either individually or mixed (such as oil and water optical densities per millimeter path length, at the selected optical operating wavelength bands).

In the illustrated example of FIG. 4, the fourth example multiphase flowmeter 400 includes a multivariable sensor 414, or a multivariable transmitter 414, to measure a pressure (P) and a temperature (T) of the multiphase flow 106 in the measurement region 129. Alternatively, the example multivariable sensor 414 of FIG. 4 may be replaced with a separate pressure transducer coupled to a pressure transmitter and a separate temperature probe coupled to a temperature transmitter.

In the illustrated example of FIG. 4, the flowmeter manager 148 determines the liquid density ($\rho_{liquid}$) by determining the WLR based on evaluating the absorption data (e.g., the light attenuation measurements) obtained from the optical sensor 404 (e.g., obtaining multi-wavelength attenuation measurements from the spectrometer(s) 408 communicatively coupled to the optical sensor 404). The example flowmeter manager 148 may determine the liquid density ($\rho_{liquid}$) based on the oil density ($\rho_{oil}$) and the water density ($\rho_{water}$) at the measured fluid pressure (P) and temperature (T) by using the fluids PVT model as described in Equation (6c) above. In response to determining the liquid density ($\rho_{liquid}$), the example flowmeter manager 148 may determine, according to Equation (6b) above, the liquid holdup ($\alpha_{liquid}$) based on the gas density ($\rho_{gas}$) at the measured fluid pressure (P) and the measured fluid temperature (T) as described below in Equation (26):

$$\alpha_{liquid} = \frac{\rho_{mixture} - \rho_{gas}}{\rho_{liquid} - \rho_{gas}} \quad \text{Equation (26)}$$

Alternatively, the liquid holdup ($\alpha_{liquid}$) may be estimated by calculating an inefficiency factor of the example Coriolis flowmeter 402 of FIG. 4 as described in U.S. Pat. No. 9,778,091, entitled "SYSTEMS AND METHODS FOR ANALYZING FLUID FROM A SEPARATOR," filed Sep. 29, 2014, which is hereby incorporated by reference herein in its entirety.

In the illustrated example of FIG. 4, in response to determining the mixture density ($\rho_{mixture}$) and the total mass flow rate ($q_{total}$) based on measurements by the Coriolis flowmeter 402 of FIG. 4, the example flowmeter manager 148 can calculate the total volumetric flow rate ($Q_{total}$) as described below in Equation (27):

$$Q_{total} = \frac{q_{total}}{\rho_{mixture}} \quad \text{Equation (27)}$$

In response to determining the liquid holdup ($\alpha_{liquid}$) as described in the example of Equation (26) above and the WLR measured by the optical sensor 404 of FIG. 4, the example flowmeter manager 148 can determine the gas, liquid, oil, and water volumetric flow rates ($Q_{gas}$, $Q_{liquid}$, $Q_{oil}$, $Q_{water}$) by using the above examples of Equations (23b)-(23e).

Figure 5:
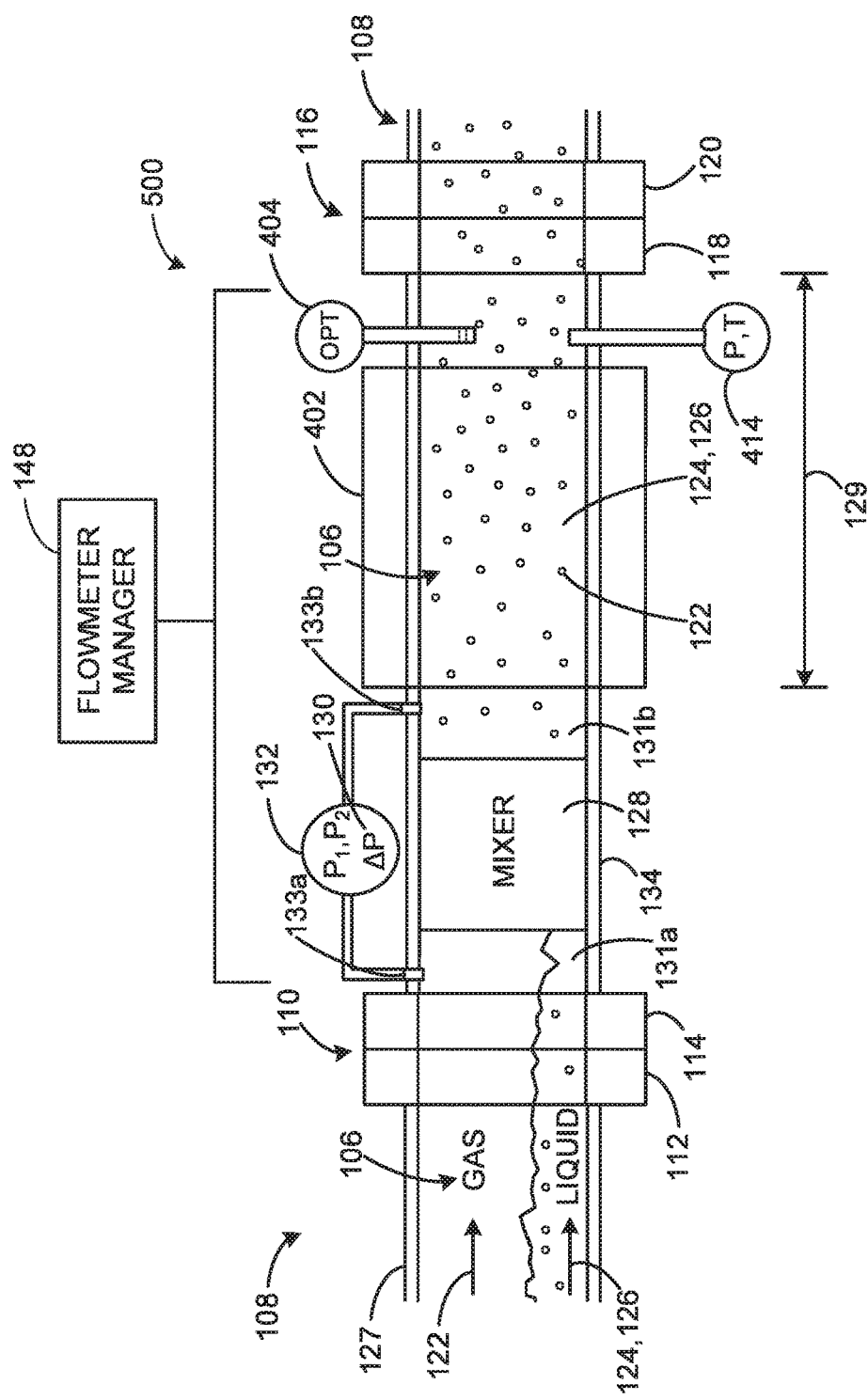
FIG. 5 depicts a fifth example multiphase flowmeter including the example Coriolis flowmeter of FIG. 4, the example near-infrared probe of FIG. 4, and a differential pressure sensor for measuring horizontal gas-liquid three-phase flows.

FIG. 5 depicts a fifth example multiphase flowmeter 500 including the example Coriolis flowmeter 402 of FIG. 4, the example optical water-cut sensor 404 of FIG. 4, and the differential pressure sensor 132 of FIGS. 1A-3 for measuring horizontal gas-liquid three-phase flows (e.g., the multiphase flow 106). The fifth example multiphase flowmeter 500 includes the example differential pressure sensor 132 to measure the differential pressure 130 across the mixer 128, which is used to homogenize the multiphase flow 106. The differential pressure 130 measured across the mixer 128 may be used to complement and/or extend the measurement range of the mixture density and/or the mixture velocity (or the total volumetric flow rate) made by the Coriolis flowmeter 402, over a wide range of gas volume fractions of the multiphase flow 106. The fifth example multiphase flowmeter 500 includes the example multivariable sensor 414 to measure a pressure and a temperature of the multiphase flow 106.

In connection with the illustrated example of FIG. 5, the structure, function, and/or operation of each of the example mixer 128, the example flowmeter manager 148, the example Coriolis flowmeter 402, the example optical sensor 404, and the example multivariable sensor 414 is/are the same as the corresponding structure, function, and/or operation of the example mixer 128, the example flowmeter manager 148, the example Coriolis flowmeter 402, the example optical sensor 404, and the example multivariable sensor 414 of FIG. 4 described above. Similarly, in connection with the illustrated example of FIG. 5, the structure, function, and/or operation of the example differential pressure sensor 132 is/are the same as the corresponding structure, function, and/or operation of the example differential pressure sensor 132 of FIG. 1A-3 described above. Thus, in the interest of brevity, the structure, function, and/or operation of these components, structures, and/or operation are not repeated herein.

Figure 6:
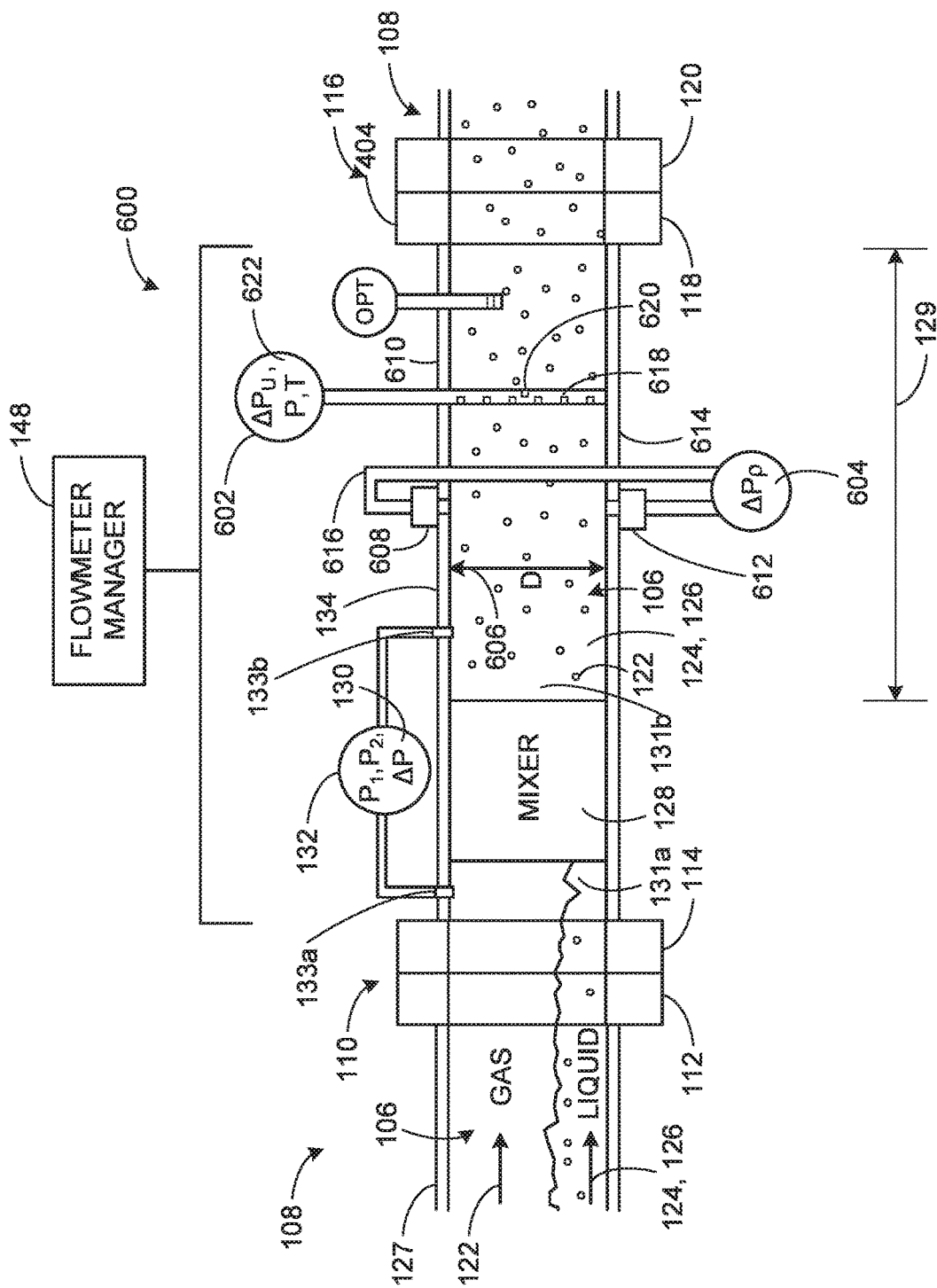
FIG. 6 depicts a sixth example multiphase flowmeter including a pitot tube for measuring horizontal gas-liquid three-phase flows.

FIG. 6 depicts a sixth example multiphase flowmeter 600 including a pitot tube 602 for measuring horizontal gas-liquid three-phase flows (e.g., the multiphase flow 106). The sixth example multiphase flowmeter 600 of FIG. 6 includes the mixer 128 of FIGS. 1A, 2A, and 3-5 to homogenize the incoming multiphase flow 106. The sixth example multiphase flowmeter 600 of FIG. 6 includes the differential pressure sensor 132 of FIGS. 1A, 2A, 3 and 5 to measure the differential pressure 130 across the mixer 128 that spans an axial distance of the housing 134, induced due to homogenizing the multiphase flow 106. Alternatively, the sixth example multiphase flowmeter 600 may not include the example differential pressure sensor 132. The sixth example multiphase flowmeter 600 of FIG. 6 includes the optical sensor 404 of FIGS. 4-5 to measure the WLR of the multiphase flow 106.

In the illustrated example of FIG. 6, the sixth multiphase flowmeter 600 includes a second differential pressure sensor 616 to measure a second differential pressure ($\Delta P_\rho$) 604 across a vertical pipe diameter (D) 606 of the housing 134. In FIG. 6, the second differential pressure sensor 616 is disposed in the measurement region 129 and includes a first (low-pressure) sensing element 608, or a first pressure sensing (remote seal) diaphragm 608, disposed on a top surface 610 of the housing 134 and a second (high-pressure) sensing element 612, or a second pressure sensing (remote seal) diaphragm 612, disposed on a bottom surface 614 of the housing 134, where the top surface 610 is opposite the bottom surface 614 with respect to the vertical pipe diameter 606. The second differential pressure sensor 616 measures a first pressure at a top portion of the housing 134 using the first sensing element 608 and measures a second pressure at a bottom portion of the housing 134 using the second sensing element 612. The pressure sensing (remote seals) diaphragms 608, 612 are used to prevent pressure sensing lines from contamination by multiphase fluids (e.g., the pressure sensing lines after the diaphragms may be fully filled with known fluids, such as silicone oil).

In FIG. 6, the second differential pressure sensor 616 is a differential pressure sensor with a low measurement range (e.g., a range of −60 to 60 mbar). The second differential pressure sensor 616 of FIG. 6 is a stable differential pressure sensor, or a sensor including remote seals appropriately designed to minimize undesirable hydrostatic head. Alternatively, any other suitable type of differential pressure sensor may be used to measure the second differential pressure ($\Delta P_\rho$) 604.

In the illustrated example of FIG. 6, the flowmeter manager 148 obtains the second differential pressure ($\Delta P_\rho$) 604 and determines the mixture density ($\rho_{mixture}$) based on processing the obtained second differential pressure 604 as described below in Equation (28):

$$\rho_{mixture} = \frac{\Delta P_\rho}{gD} \quad \text{Equation (28)}$$

In the example of Equation (28) above, the term g refers to an acceleration value due to gravity (e.g., g=9.81 m/s²) and the term D refers to the vertical pipe diameter 606 of the housing 134.

In the illustrated example of FIG. 6, the sixth multiphase flowmeter 600 includes the pitot tube 602 to provide a measure of a velocity of the multiphase flow 106. In FIG. 6, the example pitot tube 602 is a velocity profile averaging pitot tube to measure a dynamic impact pressure ($\Delta P_u$), which may be used by the example flowmeter manager 148 to determine the mixture velocity, or the homogeneous velocity, of the multiphase flow 106. The pitot tube 602 of FIG. 6 includes six appropriately positioned pressure-sensing openings 618 facing upstream of the multiphase flow 106. Alternatively, the example pitot tube 602 of FIG. 6 may include fewer than six or more than six upstream-facing pressure-sensing openings 618.

In FIG. 6, the pressure-sensing openings 618 are used to provide an average measure of local flow velocities corresponding to the positions of the pressure-sensing openings 618 in the flow stream of the multiphase flow 106. For example, the multiphase flow 106 may encounter and/or otherwise enter the upstream facing pressure-sensing openings 618 of FIG. 6 and come to rest (stagnate) as there is no outlet in the pitot tube 602 to continue moving. The resulting pressure of the multiphase flow 106 stagnating in one of the pressure-sensing openings 618 is the stagnation pressure, or the total pressure, of the multiphase flow 106. The pitot tube 602 of FIG. 6 includes a downstream-facing pressure-sensing opening 620 to measure a static pressure (P) of the multiphase flow 106. Additionally or alternatively, the pitot tube 602 of FIG. 6 may include more than one downstream-facing pressure-sensing opening 620 to measure the static pressure of the multiphase flow 106.

In FIG. 6, the example flowmeter manager 148 calculates the stagnation pressure as described below in Equation (29):

$$P_{stag} = \Delta P_u + P \quad \text{Equation (29)}$$

The dynamic pressure ($\Delta P_u$) term of the example of Equation (29) may be re-written in terms corresponding to the mixture velocity ($u_{mixture}$) and the mixture density ($\rho_{mixture}$) as described below in Equation (30):

$$P_{stag} = \left(\frac{\rho_{mixture} u_{mixture}^2}{2}\right) + P \quad \text{Equation (30)}$$

In FIG. 6, the flowmeter manager 148 determines the mixture velocity ($u_{mixture}$) by evaluating the example of Equation (30) above using the mixture velocity relationship as described below in Equation (31):

$$u_{mixture} = \sqrt{\frac{2(P_{stag} - P)}{\rho_{mixture}}} \quad \text{Equation (31)}$$

In response to the example flowmeter manager 148 determining the mixture density ($\rho_{mixture}$) by using the example of Equation (28) above, the flowmeter manager 148 can determine the mixture velocity ($u_{mixture}$) by using the example of Equation (31) above.

In FIG. 6, in response to determining the WLR based on measurements obtained from the optical sensor 404, the example flowmeter manager 148 determines the liquid density ($\rho_{liquid}$) by using the example of Equation (6c) above. In response to determining the liquid density ($\rho_{liquid}$), the example flowmeter manager 148 may determine the liquid holdup ($\alpha_{liquid}$) by using the example of Equation (26) above. The example flowmeter manager 148 may determine the required input gas density ($\rho_{gas}$), the oil density ($\rho_{oil}$), and the water density ($\rho_{water}$) from the measured fluid pressure (P) and the measured fluid temperature (T) from the fluids PVT model. The pitot tube 602 includes a multi-variable transmitter 622 to measure the dynamic pressure $\Delta P_u$, the flow static pressure P, and the temperature T of the mixed multiphase flow 106.

Figures 7A, 7B:
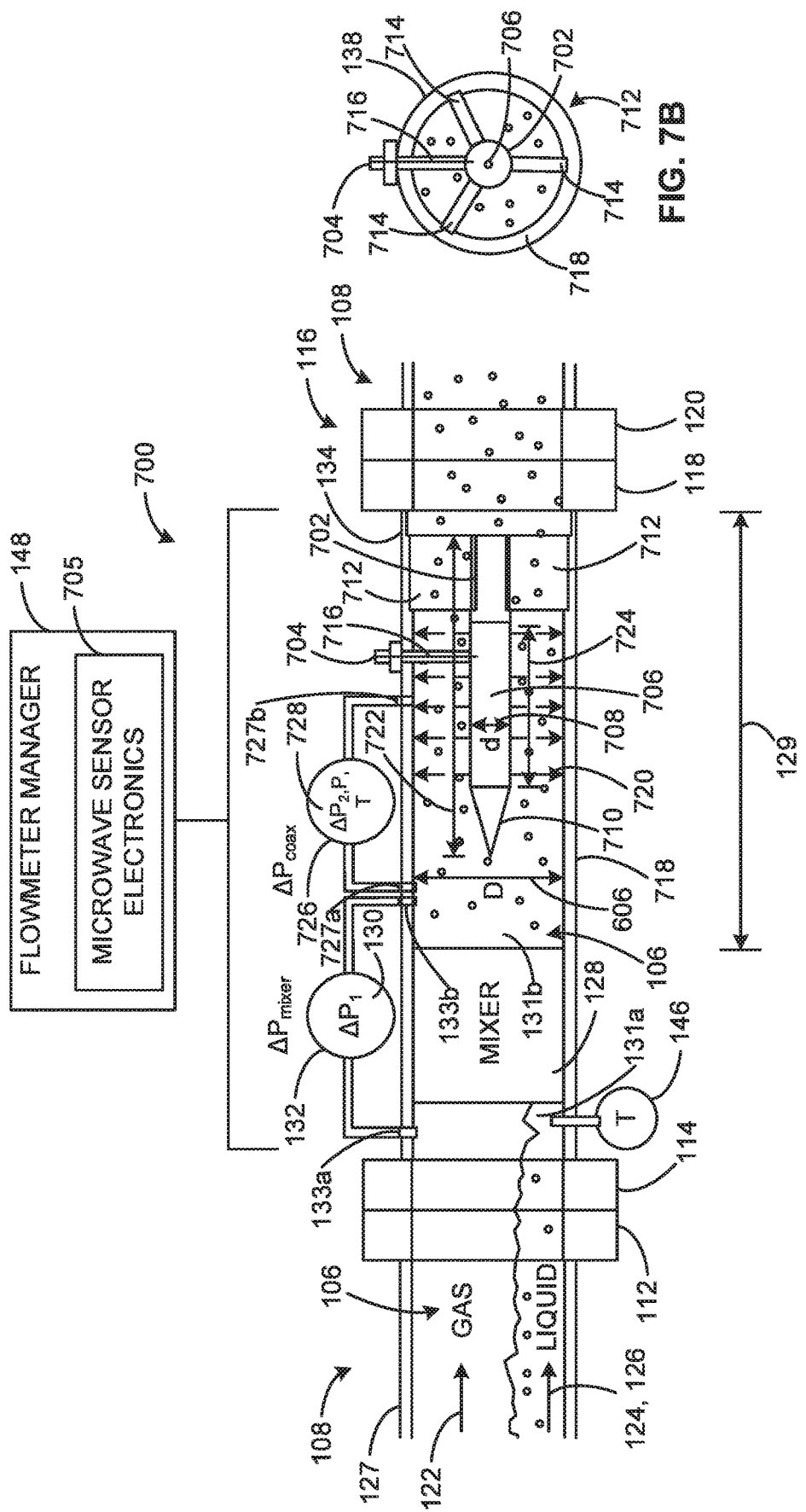
FIG. 7A depicts a seventh example multiphase flowmeter including an inline coaxial sensor for measuring horizontal gas-liquid three-phase flows.
FIG. 7B depicts a cross-sectional view of the seventh multiphase flowmeter of FIG. 7A.

FIG. 7A depicts a seventh example multiphase flowmeter 700 including an inline coaxial sensor 702 for measuring horizontal gas-liquid three-phase flows (e.g., the multiphase flow 106). In FIG. 7A, the seventh multiphase flowmeter 700 includes the differential pressure sensor 132 of FIGS. 1A, 2A, 3, 5, and 6 to measure the first differential pressure ($\Delta P_1$) 130, or the differential pressure 130 across the mixer 128 ($\Delta P_{mixer}$). The seventh example multiphase flowmeter 700 includes the example mixer 128 to homogenize the incoming multiphase flow 106. The example flowmeter manager 148 of the illustrated example obtains and correlates the first differential pressure 130 to the mixture velocity ($u_{mixture}$) and the mixture density ($\rho_{mixture}$) downstream of the mixer 128 based on an empirical correlation determined from experimental or modelling data as described below in Equation (32), which is the same as Equation (1) above:

$$\Delta P_{mixer} \cong \frac{1}{2} k_m \rho_{mixture} u_{mixture}^2 \quad \text{Equation (32)}$$

In the illustrated example of FIG. 7A, the seventh multiphase flowmeter 700 includes the inline coaxial sensor 702 to measure the mixture permittivity ($\varepsilon_{mixture}$) and/or the mixture conductivity ($\sigma_{mixture}$) of the multiphase flow 106 downstream of the mixer 128 in the measurement section 129. The example inline coaxial sensor 702 is a radio frequency (RF) inline coaxial sensor, or a microwave (MW) inline coaxial sensor. The inline coaxial sensor 702 of FIG. 7A measures the mixture permittivity and/or the mixture conductivity by measuring a reflection coefficient ($\Gamma$) using a MW coaxial pressure-retaining feedthrough 704 and a coaxial cable (not shown) connected to MW sensor electronics 705 included in the flowmeter manager 148. In some examples, the MW sensor electronics 705 included in the flowmeter manager 148 include one or more MW signal transmitter and receiver circuits, or transceivers circuits. The example inline coaxial sensor 702 measures the reflection coefficient at one or more RF/MW frequencies.

In the illustrated example of FIG. 7A, the inline coaxial sensor 702 includes an inner portion 706, or a center-conductor portion 706, having an outer-diameter d 708. The example center-conduction portion 706 includes a first end and a second end. The first end includes a pointed structure 710, facing upstream (e.g., facing the incoming flow of the multiphase flow 106) of the seventh example multiphase flowmeter 700. The pointed structure 710 of FIG. 7A is a conical-shaped surface (e.g., a cone structure) made of a dielectric material such as polytetrafluoroethylene (PTFE), thermoplastics polyether-ether-ketone (PEEK), a ceramic material such as alumina oxide, etc., or any type of strong insulating material preferably with a relatively low dielectric constant. Alternatively, the example pointed structure 710 may be any other type of structure to interface with the multiphase flow 106. The apex of the pointed structure 710 faces upstream to reduce flow drag and perturbation of the multiphase flow 106. The second end of the example center-conduction portion 706 includes a support 712 as further illustrated in FIG. 7B. The example support structure 712 is a dielectric centralizer or a centralizer support structure with a drag-reduction shape design made of a dielectric material as described above. In FIG. 7A, the dielectric material of the example pointed structure 710 is the same as the dielectric material of the example support structure 712. In other examples, the dielectric material of the example pointed structure 710 is different from the dielectric material of the example support structure 712.

FIG. 7B depicts a cross-sectional view of the seventh example multiphase flowmeter 700 of FIG. 7A. In FIG. 7B, the support structure 712 includes three coaxial sensor supports 714 spaced apart equally. Although three example coaxial sensor supports 714 are depicted in FIG. 7B, alternatively, less than three or more than three supports may be used. Although the three example coaxial sensor supports 714 are depicted in FIG. 7B as spaced equally, alternatively, any other spacing may be used. In FIG. 7B, the coaxial feedthrough 704 (e.g., the MW sensor electronics coaxial feedthrough 704) is electrically coupled to the sensor center conductor 706 via a cable 716. In FIGS. 7A and 7B, the dielectric material of the example pointed structure 710 is the same as the dielectric material of the three coaxial sensor supports 714. In other examples, the dielectric material of the example pointed structure 710 is different from the dielectric material of the three coaxial sensor supports 714.

In FIG. 7B, the cable 716 is a 50-ohm characteristic impedance coaxial feed cable including one or more coaxial inter-connections. Alternatively, the example coaxial cable 716 may have other typical characteristic impedance matching that of the inline coaxial sensor 702 according to Equation (33) below. The example coaxial feed cable 716 may be semi-rigid and protected against corrosion by an appropriately-chosen liquid-tight steel tubing. Alternatively, the example coaxial feed cable 716 may include individual feedthrough connections. For example, the coaxial feed cable 716 may be a sensor connection, or a MW sensor connection, electrically coupling the MW sensor electronics 705 via the coaxial feedthrough 704 and the sensor center conductor 706. The outer conductor of the example coaxial feed cable 716 and that of the example feedthrough 704 are electrically interconnected and are also electrically interconnected with the outer conductor 718 of the inline coaxial sensor formed by the metal housing 134 in the measurement section 129.

Turning back to FIG. 7A, the example inline coaxial sensor 702 includes an outer portion 718, or an outer conductor portion 718, formed by the measurement section 129 of the housing 134 with the inner-diameter D 606 of FIG. 6. The inline coaxial sensor 702 of FIG. 7A is designed to have a characteristic impedance ($Z_o$) of 50 ohms when the inline coaxial sensor 702 is full of, for example, dry air/gas (with dielectric constant $\varepsilon_r=1$). Alternatively, other typical characteristic impedance values (such as 75 ohms) may be used. Based on the coaxial-line characteristic-impedance relationship described below in Equation (33), a diameter ratio (d/D) of the example inline coaxial sensor 702 may be calculated by the example flowmeter manager 148 using Equation (34) below:

$$Z_o = \frac{60}{\sqrt{\varepsilon_r}} \ln\left(\frac{D}{d}\right) \quad \text{Equation (33)}$$

$$\frac{d}{D} = \exp\left(-\frac{Z_o\sqrt{\varepsilon_r}}{60}\right) = \exp\left(-\frac{5}{6}\sqrt{\varepsilon_r}\right) \quad \text{Equation (34)}$$

For example, the flowmeter manager 148 may calculate the diameter ratio of the inline coaxial sensor 702 to be 0.43 when $\varepsilon_r=1$.

In the illustrated example of FIG. 7A, the seventh multiphase flowmeter 700 includes the coaxial feedthrough 704 to couple with the MW sensor electronics 705 to measure and/or otherwise obtain a measurement, via the coaxial feed cable 716, a complex reflection coefficient ($\Gamma^*$) based on a ratio of a reflected (complex) signal ($W^*_{reflected}$) and an incident (complex) signal ($V^*_{incident}$) as described below in Equation (35):

$$\Gamma^* = \frac{V^*_{reflected}}{V^*_{incident}} \quad \text{Equation (35)}$$

In FIG. 7A, the example flowmeter manager 148 may direct the MW sensor electronics 705 to emit an excitation frequency (e.g., f=0.25 GHz, 0.5 GHz, 1.0 GHz, etc.) via the pressure-retaining coaxial feedthrough 704 mounted on and through the pipe wall of the housing 134. The example MW sensor electronics 705 excite the inline coaxial sensor (formed by the center conductor 706 and the outer conductor 718) via the coaxial feedthrough 704 and the cable 716. A radially-outward electromagnetic field distribution (as depicted by arrows 720 in FIG. 7A) is formed between the center conductor 706 and the outer conductor 718. In FIG. 7A, the EM field distribution changes with a variation in the mixed multiphase-flow electrical impedance, which is a function of the gas fraction and water cut of the multiphase flow 106. The changes in amplitude and phase in the reflected signal are detected by the MW sensor electronics 705 (with the received EM signal returned to the MW sensor electronics 705 via the same coaxial feedthrough 704, in an opposite direction to the emitted EM signal). In some examples, an axial length 724 of the center-conductor portion 706 is selected appropriately according to, for example, one wavelength length in the gas phase 122.

In the example of Equation (35) above, the complex reflection coefficient ($\Gamma^*$) represents a measure of a mismatch between a bulk impedance ($Z(\varepsilon^*)$) of the multiphase flow 106 inside the axial length 724, or a coaxial sensor measurement section 724, or an area in which the multiphase flow 106 can be measured by the inline coaxial sensor 702, and the characteristic impedance ($Z_o$) of the inline coaxial sensor 702 as described below in Equation (36):

$$\Gamma^* = \frac{Z(\varepsilon^*) - Z_o}{Z(\varepsilon^*) + Z_o} \quad \text{Equation (36)}$$

The detected electrical impedance ($Z(\varepsilon^*)$) of the multiphase flow 106 may then be related to the measured reflection coefficient ($\Gamma^*$) as described below in Equation (37):

$$Z(\varepsilon^*) = \frac{1 + \Gamma^*}{1 - \Gamma^*} \quad \text{Equation (37)}$$

As a result, a desired mixture permittivity ($\varepsilon_{mixture}$) and mixture conductivity ($\sigma_{mixture}$) may be determined by the example flowmeter manager 148 based on a bilinear model function as described below in Equations (38) and (39):

$$\varepsilon^*_{mixture} = \varepsilon_{mixture} - \frac{j\sigma_{mixture}}{(2\pi f \varepsilon_o)} = (A\Gamma^*_n + \varepsilon^*_{ref})/(1 - B\Gamma^*_n) \quad \text{Equation (38)}$$

$$\Gamma^*_n = (\Gamma^*_{ref} - \Gamma^*)/(\Gamma^*_{ref} + \Gamma^*) \quad \text{Equation (39)}$$

In the example of Equation (38) above, the term f represents a MW frequency, or a frequency at which the MW sensor electronics 705 emits a signal (via the coaxial feedthrough 704, coaxial cable 716, and inline coaxial sensor 712) into the multiphase flow 106. In the example of Equation (38) above, the term $\varepsilon_o$ represents the absolute permittivity of free space with a value of 8.854 picofarads/meter (pF/m). In the Example of Equation (39) above, the term $\Gamma^*_n$ represents the normalized reflection coefficient. In the examples of Equations (38) and (39), bilinear-model complex-number coefficients A and B may be determined by using dry-air, water, and brine calibration fluids with known $\varepsilon^*$ (e.g., $\varepsilon_{ref}^* = 1$ for dry air) to fill the coaxial sensor measurement section 722. In practice, the use of the three calibration fluids described above removes the need of determining the electrical impedance ($Z(\varepsilon^*)$) of the multiphase flow 106. In other words, in the process of determining the desired mixture permittivity ($\varepsilon_{mixture}$) and mixture conductivity ($\sigma_{mixture}$) mixture) by using the measured reflection coefficient from Equations (38) and (39), the operation described in connection with Equation (37) can be omitted.

In the illustrated example of FIG. 7A, the differential pressure sensor 132 is a first differential pressure sensor 132. The seventh multiphase flowmeter 700 of FIG. 7A further includes a second differential pressure sensor 726 to measure a second differential pressure ($\Delta P_2$) 728, or a coaxial sensor measurement section differential pressure ($\Delta P_{coax}$) 728. The second differential pressure sensor 726 includes a first sensing element coupled to a high-pressure port 727a, and a second sensing element coupled to a low-pressure port 727b. The second differential pressure sensor 726 of FIG. 7A measures a first pressure at a first location, or a first area or section, using the first sensing element at the high-pressure port 727a upstream of the coaxial sensor front section 710 and downstream of the mixer 128. The second differential pressure sensor 726 of FIG. 7A measures a second pressure at a second location, or a second area or section, using the second sensing element at the low-pressure port 727b within the mid-portion of the coaxial sensor measurement section 724.

The second differential pressure ($\Delta P_{coax}$)728 of FIG. 7A represents a difference in pressure between a non-coaxial sensor measurement region and the coaxial sensor measurement section 724 as described below in Equation (40):

$$\Delta P_{coax} \approx \frac{\beta^{-4} - 1}{2C_d^2} \rho_{mixture} u_{mixture}^2 \quad \text{Equation (40)}$$

In the example of Equation (40) above, the term $C_d$ represents a Venturi-like discharge coefficient. For example, the term $C_d$ is implicitly dependent on the Reynolds number of the flow mixture that is in turn dependent on mixture density ($\sigma_{mixture}$), mixture velocity ($u_{mixture}$), liquid mixture viscosity, and the flow path dimension (D-d). The term $\beta$ in the example of Equation (40) above represents the beta ratio as described below in Equation (41):

$$\beta = \sqrt{\frac{A_{coax-section}}{A_{pipe}}} = \sqrt{\frac{D^2 - d^2}{D^2}} = \sqrt{1 - \left(\frac{d}{D}\right)^2} \quad \text{Equation (41)}$$

For example, the beta ratio ($\beta$) may have a value of approximately 0.9 when the diameter ratio (d/D) is approximately 0.43 as described below in Equation (42):

$$\beta = \sqrt{1 - \left(\frac{d}{D}\right)^2} \approx 0.9 \text{ when } \frac{d}{D} \approx 0.43 \quad \text{Equation (42)}$$

In the example of Equation (42) above, the example flowmeter manager 148 can calculate a value of the beta ratio ($\beta$) to be approximately 0.9 when the diameter ratio is approximately 0.43 as calculated above in connection with the example of Equation (34) when $\varepsilon_r = 1$.

In the illustrated example of FIG. 7A, the example flowmeter manager 148 determines the mixture density ($\rho_{mixture}$) and the mixture velocity ($u_{mixture}$) of the multiphase flow 106 downstream of the mixer 128 but upstream of the inline coaxial sensor 702 by obtaining and/or processing two independent $\Delta P$ measurement data $\Delta P_{mixer}$ and $\Delta P_{coax}$. For example, the flowmeter manager 148 may determine the $\Delta P_{mixer}$ by using the example of Equation (32) above and may determine the $\Delta P_{coax}$ by using the example of Equation (40) above. Solutions of the mixture density ($\rho_{mixture}$) and the mixture velocity ($u_{mixture}$) may be described below in the implicit relationships depicted in the examples of Equations (43) and (44) below:

$$\rho_{mixture} = f_1(\Delta P_{mixer}, \Delta P_{coax}) \quad \text{Equation (43)}$$

$$u_{mixture} = f_2(\Delta P_{mixer}, \Delta P_{coax}) \quad \text{Equation (44)}$$

In response to determining the mixture velocity ($u_{mixture}$), the example flowmeter manager 148 can determine the total volumetric flow rate ($Q_{total}$) of the multiphase flow 106 by using Equation (23a) above.

In the illustrated example of FIG. 7A, the flowmeter manager 148 determines the gas, liquid, oil, and water volumetric flow rates by determining the WLR and the liquid holdup ($\alpha_{liquid}$). The mixture density ($\rho_{mixture}$) of Equation (43) above is related to and/or otherwise associated with the WLR and the liquid holdup as described in the example of Equation (6a) above. In the example of Equation (6a) above, the example flowmeter manager 148 can calculate the mixture density by determining the gas density ($\rho_{gas}$), the oil density ($\rho_{oil}$), and the water density ($\sigma_{water}$) at the measured fluid pressure ($P_2$) and the measured temperature (T) from the fluids PVT model. In FIG. 7A, the flowmeter manager 148 obtains (i) the measured fluid pressure from the second differential pressure sensor 726 and (ii) the measured fluid temperature from the temperature probe 146. Although the example temperature probe 146 in FIG. 7A is disposed prior to the mixer 128, alternatively, the temperature probe 146 may be disposed after the mixer 128.

In FIG. 7A, the flowmeter manager 148 correlates (i) one or both of the mixture permittivity ($\varepsilon_{mixture}$) and the mixture conductivity ($\sigma_{mixture}$) as measured by the inline coaxial sensor 702 and the corresponding MW sensor electronics 705 as described above in the example of Equation (38) with (ii) the WLR and the liquid holdup ($\alpha_{liquid}$) as described below in Equations (45) and (46):

$$\varepsilon_{mixture} = f_3(\text{WLR}, \alpha_{liquid}; \varepsilon_{water}, \varepsilon_{oil}, \varepsilon_{gas}) \quad \text{Equation (45)}$$

$$\sigma_{mixture} = f_4(\text{WLR}, \alpha_{liquid}; \sigma_{water}) \quad \text{Equation (46)}$$

In some examples, the flowmeter manager 148 determines effective permittivity and effective conductivity of homogenous oil-water-gas mixtures (e.g., the multiphase flow 106) by using the examples of Equations (8), (11), and (14) above. In some examples, for water-continuous flows, the example flowmeter manager 148 determines the WLR and the liquid holdup by solving the examples of Equations (6a) and (12) above, or the examples of Equations (6a) and (15) above. In some examples, flowmeter manager 148 determines the brine-water conductivity ($\sigma_{water}$), the salinity determination, and the brine-water permittivity ($\varepsilon_{water}$) based on calculating a ratio of the measured mixture permittivity ($\varepsilon_{mixture}$) and the measured mixture conductivity ($\sigma_{mixture}$). In response to such determinations, the example flowmeter manager 148 calculates the WLR and the liquid holdup ($\alpha_{liquid}$) (e.g., a substantially salinity-independent WLR and liquid holdup) by using the examples of Equations (45) and (46) above. In some examples, for oil-continuous flows, the example flowmeter manager 148 calculates the WLR and the liquid holdup by using the examples of Equations (19) and (6a) above. From the total volumetric flow rate ($Q_{total}$) of the example of Equation (23a) above, the determined WLR and the determined liquid holdup, the example flowmeter manager 148 can calculate the volumetric flow rates of gas, liquid, oil, and water by using the examples of Equations (23b)-(23e) above.

Figures 8A, 8B:
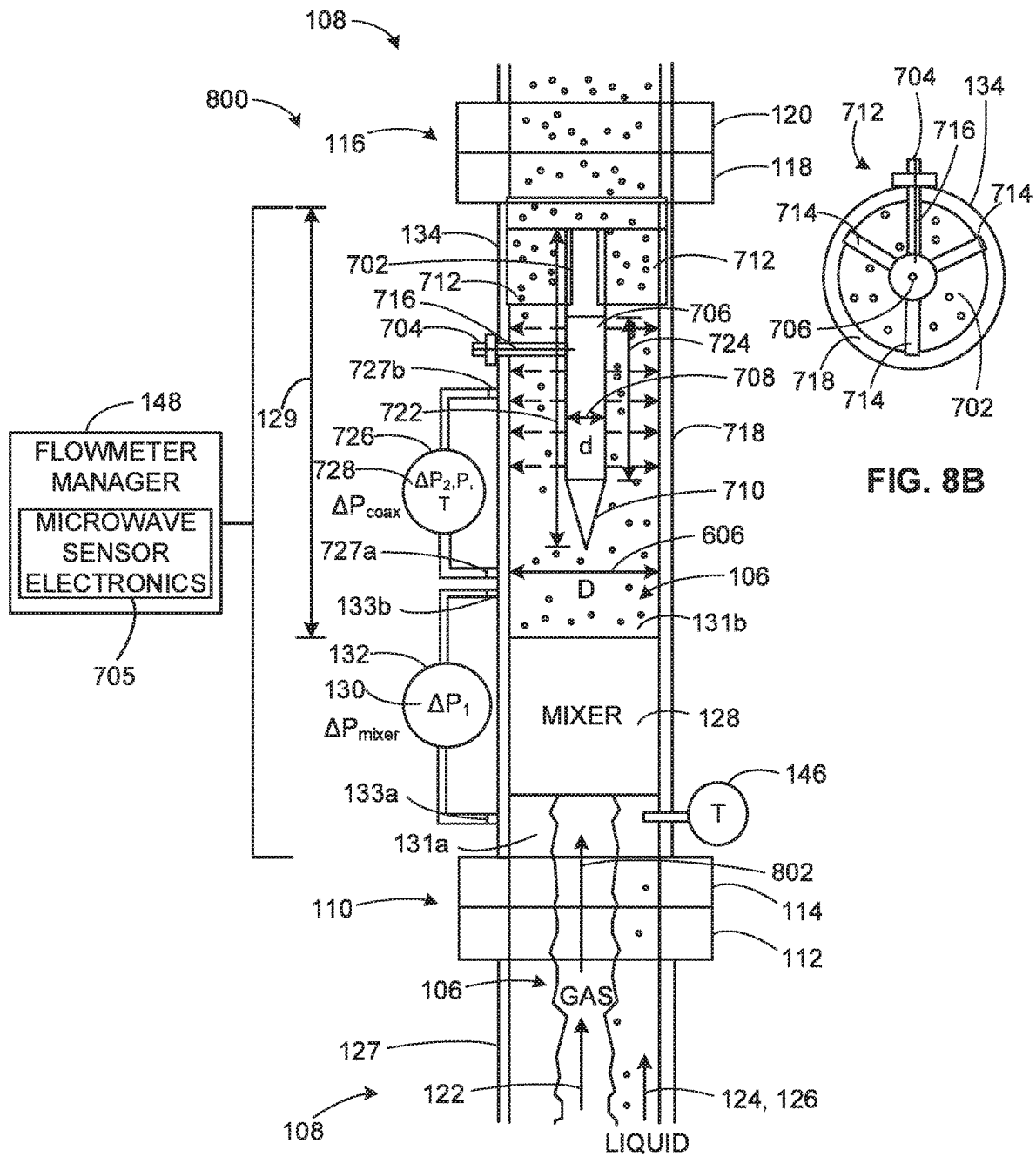
FIG. 8A depicts an eighth example multiphase flowmeter including the inline coaxial sensor of FIG. 7A for measuring vertical gas-liquid three-phase flows.
FIG. 8B depicts a cross-sectional view of the eighth multiphase flowmeter of FIG. 8A.

FIG. 8A depicts an eighth example multiphase flowmeter 800 including the inline coaxial sensor 702 of FIG. 7A for measuring substantially vertical gas-liquid three-phase flows (e.g., the multiphase flow 106) flowing in a direction indicated by arrow 802 (e.g., flowing from a bottom portion of the eighth example multiphase flowmeter 800 towards a top portion of the eighth multiphase flowmeter 800). The eighth example multiphase flowmeter 800 of FIG. 8A is a wellhead vertically-installed insertion flowmeter. The eighth example multiphase flowmeter 800 of FIG. 8A includes the example mixer 128, the first example differential pressure sensor 132, the example temperature sensor 146, the example flowmeter manager 148, the example inline coaxial sensor 702, the example coaxial feedthrough 704, the example MW sensor electronics 705, and the second example differential pressure sensor 726 of FIG. 7A. In connection with the illustrated example of FIG. 8A, the structure, function, and/or operation of each of the example mixer 128, the first example differential pressure sensor 132, the example temperature sensor 146, the example flowmeter manager 148, the example inline coaxial sensor 702, the example coaxial feedthrough 704, the example MW sensor electronics 705, and the second example differential pressure sensor 726 is/are the same as the corresponding structure, function, and/or operation of the example mixer 128, the first example differential pressure sensor 132, the example temperature sensor 146, the example flowmeter manager 148, the example inline coaxial sensor 702, the example coaxial feedthrough 704, the example MW sensor electronics 705, and the second example differential pressure sensor 726 of FIG. 7A described above in connection with FIGS. 1A-7B. Thus, in the interest of brevity, the structure, function, and/or operation of these components, structures, and/or operation are not repeated herein.

FIG. 8B depicts a cross-sectional view of the eighth example multiphase flowmeter 800 of FIG. 8A. The eighth example multiphase flowmeter 800 includes the support structure 712 of FIG. 7A including the three coaxial sensor supports 714 spaced apart equally. Although three example coaxial sensor supports 714 are depicted in FIG. 8B, alternatively, less than three or more than three supports may be used. Although the three example coaxial sensor supports 714 are depicted in FIG. 8B as equally spaced, alternatively, any other spacing may be used. In FIG. 8B, the MW sensor electronics 705 of FIG. 7A are electrically coupled to the sensor center conductor 706 via the coaxial feedthrough 704 and the coaxial cable 716 of FIG. 7A.

Figures 9A, 9B:
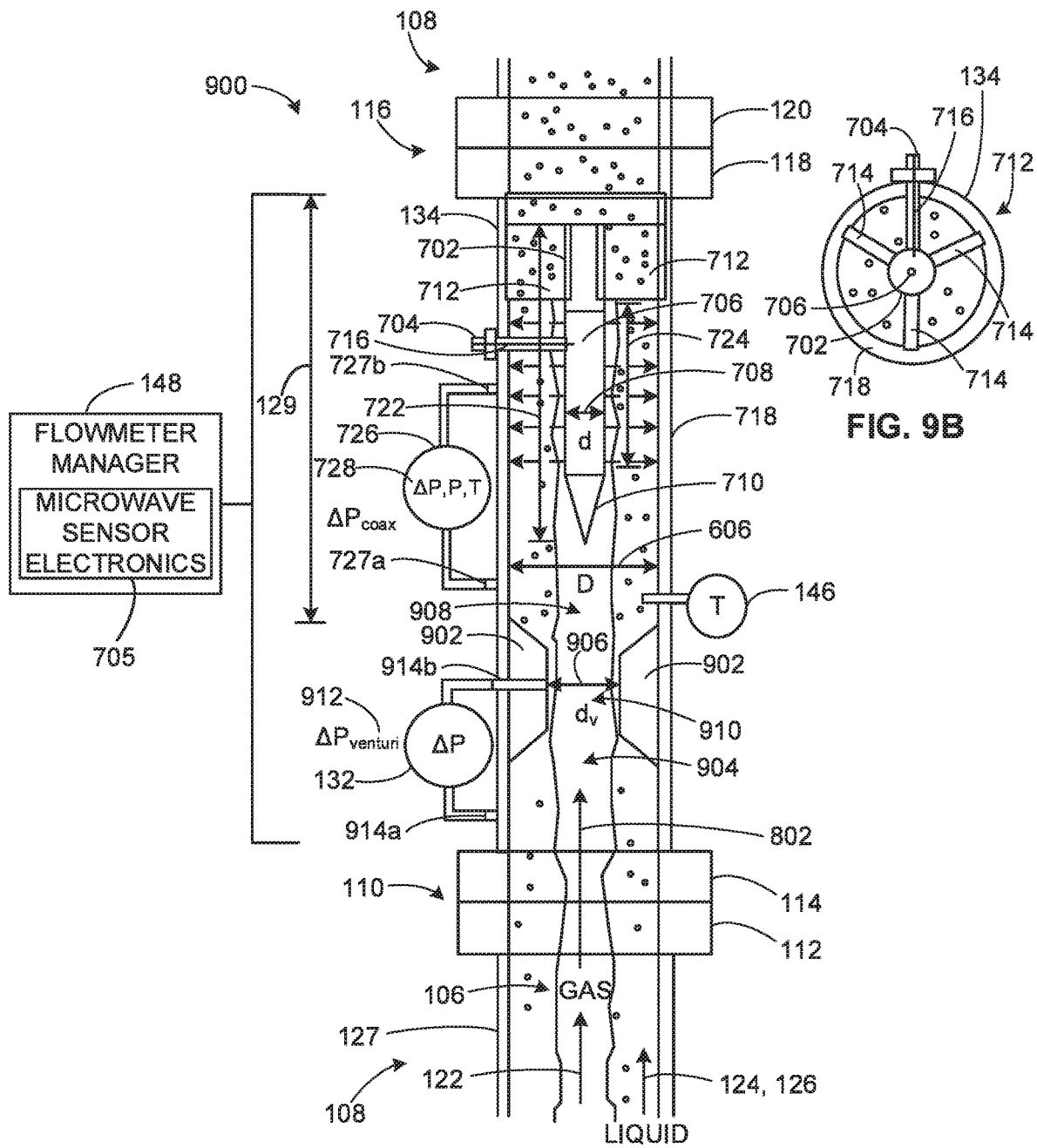
FIG. 9A depicts a ninth example multiphase flowmeter including a Venturi tube structure and the inline coaxial sensor of FIGS. 7A-8A for measuring vertical gas-liquid three-phase flows.
FIG. 9B depicts a cross-sectional view of the ninth example multiphase flowmeter of FIG. 9A.

FIG. 9A depicts a ninth example multiphase flowmeter 900 including a Venturi tube structure 902 and the inline coaxial sensor 702 of FIGS. 7A-8B for measuring vertical gas-liquid three-phase flows (e.g., the multiphase flow 106) flowing in a direction indicated by the arrow 802 (e.g., flowing from a bottom portion towards a top portion of the ninth example multiphase flowmeter 900). The ninth example multiphase flowmeter 900 of FIG. 9A is a wellhead vertically-installed insertion flowmeter.

The ninth example multiphase flowmeter 900 of FIG. 9A includes the first example differential pressure sensor 132, the example temperature sensor 146, the example flowmeter manager 148, the example inline coaxial sensor 702, the example coaxial feedthrough 704, the example MW sensor electronics 705, and the second example differential pressure sensor 726 of FIG. 7A. In connection with the illustrated example of FIG. 9A, the structure, function, and/or operation of each of the first example differential pressure sensor 132, the example temperature sensor 146, the example flowmeter manager 148, the example inline coaxial sensor 702, the example coaxial feedthrough 704, the example MW sensor electronics 705, and the second example differential pressure sensor 726 is/are the same as the corresponding structure, function, and/or operation of the first example differential pressure sensor 132, the example temperature sensor 146, the example flowmeter manager 148, the example inline coaxial sensor 702, the example coaxial feedthrough 704, the example MW sensor electronics 705, and the second example differential pressure sensor 726 of FIG. 7A described above. Thus, in the interest of brevity, the structure, function, and/or operation of these components, structures, and/or operation are not repeated herein.

The Venturi tube structure 902 of FIG. 9A is a Venturi mixer. Alternatively, the example Venturi tube structure 902 may be a vortex-inducing structure or a vortex mixer. The example Venturi tube structure 902 includes an inlet 904 with the diameter (D) 606 of FIG. 6. The Venturi tube 902 narrows from the diameter (D) 606 at the inlet 904 to a second diameter ($d_v$) 906, or a Venturi throat diameter ($d_v$) 906, at an internal vertical midpoint of the Venturi tube structure 902, or a constricted throat area 910. The Venturi tube structure 902 expands from the second diameter ($d_v$) 906 at the midpoint to the diameter (D) 606 at an outlet 908 of the Venturi tube structure 902. The Venturi tube structure 902 of FIG. 9A induces the Venturi effect, which is the reduction in fluid pressure that results when a fluid flows through a constricted section (or choke, or throat) of a pipe. As depicted in FIG. 9A, the Venturi tube structure 902 induces the Venturi effect when the multiphase flow 106 enters the inlet 904 at the diameter (D) 606 and flows through the constricted throat area 910 of the pipe 134.

In the illustrated example of FIG. 9A, the ninth example multiphase flowmeter 900 includes the Venturi tube structure 902 to provide flow mixing of the multiphase flow 106 and to generate a Venturi differential pressure measurement $\Delta P_{venturi}$ 912 measured by the first differential pressure sensor 132 to substitute for the example of Equation (32) as described below in Equation (47):

$$\Delta P_{venturi} \approx \frac{1-\beta^4}{2C_d^2} \rho_{mixture} u_{mixture}^2 \quad \text{Equation (47)}$$

In the example of Equation (47) above, the term $C_d$ represents the Venturi discharge coefficient. For example, the term $C_d$ is implicitly dependent on the Reynolds number of the flow mixture that is in turn dependent on mixture density ($\rho_{mixture}$), mixture velocity ($u_{mixture}$), liquid mixture viscosity, and the flow path dimension ($d_v$). The term β in the example of Equation (47) above represents the venture beta ratio $\beta = d_v/D$.

In FIG. 9A, the first differential pressure sensor 132 includes a first sensing element connected to a high-pressure port 914a and a second sensing element connected to a low-pressure port 914b. The first differential pressure sensor 132 measures the Venturi differential pressure 912 based on measuring a first pressure using the first sensing element connected to the high-pressure port 914a at a first location prior to the Venturi structure 902 and measuring a second pressure using the second sensing element connected to the low-pressure port 914b at a second location corresponding to the constricted or throat area 910. A similar differential pressure relationship as described above in the examples of Equations (40) and (41) may be used for the ninth example multiphase flowmeter 900 with $\beta = d_v/D$. In some examples when there is sufficiently independent response for $\Delta P_{venturi}$ 912 and $\Delta P_{coax}$ 728, the examples of Equations (43) and (44) above may be rewritten as described below in Equations (48) and (49):

$$\rho_{mixture} = f_1(\Delta P_{venturi}, \Delta P_{coax}) \quad \text{Equation (48)}$$

$$u_{mixture} = f_2(\Delta P_{venturi}, \Delta P_{coax}) \quad \text{Equation (49)}$$

In some examples, an interpretation with a Venturi gas-liquid velocity slip-model is needed to calculate the liquid volume fraction from the determined liquid holdup ($\alpha_{liquid}$) to calculate the liquid and gas flow rates of the multiphase flow 106.

FIG. 9B depicts a cross-sectional view of the ninth example multiphase flowmeter of FIG. 9A. The ninth example multiphase flowmeter 900 includes the support structure 712 of FIG. 7A including the three coaxial sensor supports 714 spaced apart equally. Although three example coaxial sensor supports 714 are depicted in FIG. 9B, alternatively, less than three or more than three supports may be used. Although the three example coaxial sensor supports 714 are depicted in FIG. 9B as equally spaced, alternatively, any other spacing may be used. In FIG. 9B, the MW sensor electronics 705 are coupled to the inline coaxial sensor 702 with center conductor 706 (and outer conductor 718) via the coaxial feedthrough 704 and the coaxial cable 716 of FIG. 7A.

Figure 10:
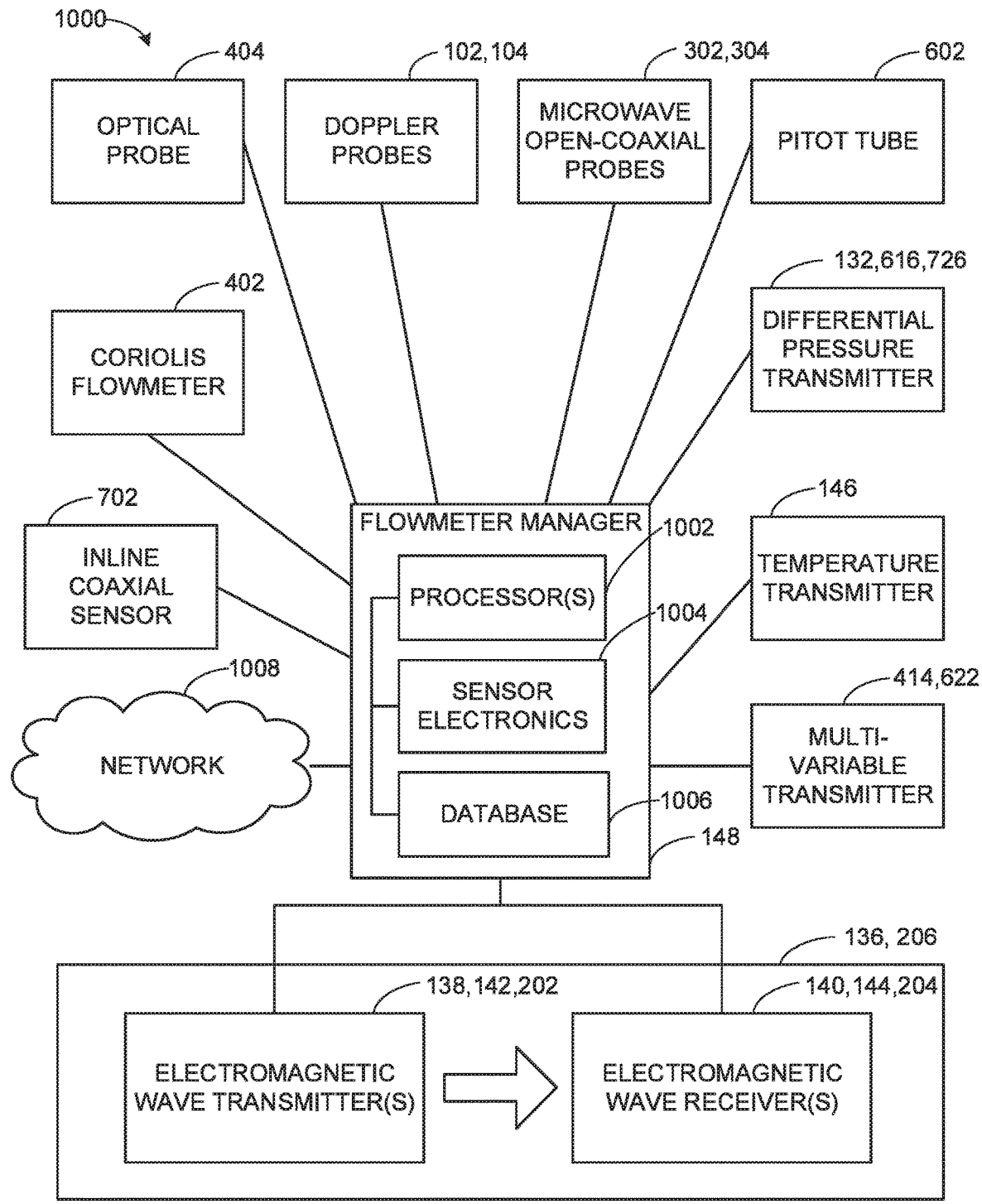
FIG. 10 is a block diagram of an example multiphase flow measurement system including an example flowmeter manager to control and obtain data from example measurement devices measuring the multiphase flowmeters of FIGS. 1A-9A.

FIG. 10 is a block diagram of an example multiphase flow measurement system 1000 including the example flowmeter manager 148 of FIGS. 1A, 2A, 3-7A, 8A and 9A to control and obtain data from example measurement devices monitoring the multiphase flowmeters 100, 200, 300, 400, 500, 600, 700, 800, 900 of FIGS. 1A-9A. In FIG. 10, the flowmeter manager 148 obtains data (e.g., sensor data, monitoring information, analog and/or digital data, etc.) from one or more of the Doppler probes 102, 104, the first RF EM transmission system 136, the second RF EM transmission system 206, the temperature transmitter 146, the differential pressure transmitters 132, 616, 726, the microwave open-coaxial probes 302, 304, the Coriolis flowmeter 402, the optical probe 404, the multivariable transmitters 414, 622, the pitot tube 602, or the inline coaxial sensor 702. The example multiphase flow measurement system 1000 of FIG. 10 may include one or more elements, processes, and/or devices in addition to, or instead of, those illustrated in FIG. 10, and/or may include more than one of any or all of the illustrated elements, processes, and devices. A single multivariable transmitter such as the multi-variable transmitter 414 of FIG. 4 or the multi-variable transmitter 622 of FIG. 6 may make (absolute or gauge) pressure, differential pressure, and temperature measurements (e.g., 3-variable measurements) at substantially the same time. Therefore, to make a multiphase flowmeter more compact and of lower cost, a single multivariable transmitter may be used to make pressure (P), differential pressure (ΔP) and temperature (T) measurements to replace a separate differential pressure transmitter (e.g., the differential pressure transmitters 132, 616, 726) and a separate temperature transmitter (e.g., the temperature transmitter 146).

The example multiphase flow measurement system 1000 includes the example flowmeter manager 148 to measure a characteristic, or a property, of a homogenized gas-liquid flow at a suitable location downstream of a mixer, or a mixing-inducing structure, such as a vortex inducing structure, an orifice plate, a Venturi structure, etc. The example multiphase flow measurement system 1000 of FIG. 10 can determine one or more measurements, or properties, of the multiphase flow 106 of FIGS. 1A-9A (e.g., pressure, temperature, WLR, liquid holdup, mixture velocity, mixture density, mixture permittivity, mixture conductivity, etc.) by using one or more of the examples of Equations (1)-(49) as described above.

The example multiphase flow measurement system 1000 of FIG. 10 includes the Doppler probes 102, 104 of FIG. 1A to measure the mixture velocity ($u_{mixture}$) and the variation in the mixture velocity of the multiphase flow 106 of FIG. 1A for measurement data quality control and/or data redundancy to maintain reliability and availability of the multiphase flow measurement system 1000. The example flowmeter manager 148 includes one or more processors 1002 and/or sensor electronics 1004 to provide signal excitation at one or more frequencies to one or more of the Doppler probes 102, 104. Additionally or alternatively, the example flowmeter manager 148 includes the one or more processors and/or the sensor electronics to receive and process sensor data from one or more of the Doppler probes 102, 104.

In FIG. 10, the flowmeter manager 148 includes the processor(s) 1002 to control and/or otherwise facilitate operation of the sensor electronics 1004. In some examples, the processor(s) 1002 store information (e.g., control commands, configuration setpoints, obtained and/or processed fluid flow ultrasonic data, EM data, optical absorption data, oil/gas/water fluids property PVT data etc.) in the database 1006 and/or retrieves information from the database 1006.

In FIG. 10, the flowmeter manager 148 includes the sensor electronics 1004 to control a device and/or receive data from the device communicatively coupled to the flowmeter manager 148. For example, the sensor electronics 1004 may implement the MW sensor electronics 705 of FIGS. 7A-9A. In some examples, the sensor electronics 1004 controls a device by directing the device to excite a signal at a specified frequency. For example, the sensor electronics 1004 may instruct one or more of the EM wave transmitters 138, 142, 202, one or more of the Doppler probes 102, 104, one or more of the microwave open-coaxial probes 302, 304, the inline coaxial sensor 702, etc., to emit, or transmit, a signal at a specified frequency, simultaneously or sequentially. In some examples, the sensor electronics 1004 receives data from a device. For example, the sensor electronics 1004 may instruct one or more of the EM wave receivers 140, 144, 204, one or more of the Doppler probes 102, 104, one or more of the microwave open-coaxial probes 302, 304, the inline coaxial sensor 702, etc., to transmit data to the sensor electronics 1004. In another example, the sensor electronics 1004 may receive and/or otherwise obtain (e.g., periodically receive, periodically obtain, etc.) data from a device (e.g., one or more of the differential pressure transmitter 132, 616, 726, the temperature transmitter 146, the Coriolis flowmeter 402, the optical probe 404, the pitot tube 602, etc.) without instruction the device to transmit the data.

The sensor electronics 1004 of FIG. 10 include one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate array(s) (FPGA(s)), and/or field programmable logic device(s) (FPLD(s)) to control a device and/or receive data from the device. In some examples, the sensor electronics 1004 stores information (e.g., transmitted commands to devices, obtained measurement data, fluids property PVT data etc.) in the database 1006 and/or retrieves information from the database 1006.

In the illustrated example of FIG. 10, the flowmeter manager 148 includes the processor(s) 1002 to generate and/or prepare reports. In some examples, the processor(s) 1002 generate a report including one or more characterizations, determinations, and/or calculations corresponding to the multiphase flow 106 of FIGS. 1A-9A. In some examples, the processor(s) 1002 generate a report including measurement data. For example, the processor(s) 1002 may generate a report including measurement data of oil, water, and gas daily production flow rates of each oil/gas well, derived from one or more of the example multiphase flowmeters 100, 200, 300, 400, 500, 600, 700, 800, 900 of FIGS. 1A-9A, with each multiphase flowmeter including the needed flow-velocity and phase-fraction measurement components: one or more of the Doppler probes 102, 104, the first RF EM transmission system 136, the second RF EM transmission system 206, the temperature transmitter 146, the differential pressure transmitters 132, 616, 726, the microwave open-coaxial probes 302, 304, the Coriolis flowmeter 402, the optical probe 404, the multivariable transmitters 414, 622, the pitot tube 602, or the inline coaxial sensor 702 of FIG. 10.

In some examples, the processor(s) 1002 generate a report including calculated values corresponding to the multiphase flow 106. For example, the processor(s) 1002 may generate a report including a determined value for one or more of the volumetric flow rates, the liquid holdup, mixture velocity, the mixture density, the WLR, the pressure and temperature, the phase densities, etc. For example, changes in the measured water-cut, water flow rate, and/or in brine salinity may provide information on (i) production well treatment or abandonment if water cut too high; (ii) the water-injection (water sweep) efficiency. In such an example, the report may include a recommendation to change a choke setting of the production well to reduce water cut. In another example, the report may include a recommendation to change a pattern of water-injection wells (or to drill more water-injection wells) to improve oil-reservoir water sweep. In such examples, the processor(s) 1002 may transmit a command to an external process control system to change the choke setting, change the pattern of water-injection wells, etc.

In some examples, the processor(s) 1002 generates a report and transmits the report to another computing device via the network 1008. For example, the network 1008 may be a cloud-based network, which can perform cloud-based data storage, analytics, big data analysis, deep machine learning, etc., to enable multi-well, multi-field reservoir-scale modeling, digital oilfield high-efficiency operations and automation, oil-gas production management and/or optimization based on information obtained and/or processed by the example flowmeter manager 148. The example flowmeter manager 148 may be an Internet of Things (IoT) device enabled to facilitate capturing, communicating, analyzing, and acting on data generated by networked objects and machines. A plurality of multiphase measurement systems 1000 of FIG. 10, equipped with flow, pressure, and temperature sensors and corresponding network-connectivity, are one of the key drivers in adaptation of IoT.

In some examples, the processor(s) 1002 generate an alert such as displaying an alert on a user interface, propagating an alert message throughout a process control network (e.g., transmitting an alert to another computing device via the network 1008), generating an alert log and/or an alert report, etc. For example, the processor(s) 1002 may generate an alert corresponding to a characterization of the multiphase flow 106 including a water flow rate, a gas flow rate, an oil flow rate, WLR (water cut), brine salinity, a pressure, a temperature, etc., based on whether the one or more processors 1002 determines that a determined value and/or corresponding measurement data satisfies one or more thresholds. In some examples, the processor(s) 1002 store information (e.g., a report, an alert, etc.) in the database 1006 and/or retrieve information from the database 1006. The database 1006 may be cloud-based to enable synchronous retrieving and updating.

In the illustrated example of FIG. 10, the flowmeter manager 148 includes the database 1006 to record data (e.g., reservoir data, field data, well data, fluids PVT data, sensor data, excitation frequency setpoints, calculated values (e.g., oil/gas/water flow rates, water cut, liquid holdup, water salinity, mixture permittivity, mixture velocity, phase densities, etc.), etc. The example database 1006 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example database 1006 may additionally or alternatively be implemented by one or more double data rate (DDR) memories, such as DDR, DDR2, DDR3, mobile DDR (mDDR), etc. The example database 1006 may additionally or alternatively be implemented by one or more mass storage devices such as hard disk drive(s), compact disk drive(s) digital versatile disk drive(s), cloud storage system, etc. While in the illustrated example the database 1006 is illustrated as a single database, the database 1006 may be implemented by any number and/or type(s) of databases. Furthermore, the data stored in the database 1006 may be in any data format such as, for example, binary data, comma delimited data, tab delimited data, structured query language (SQL) structures, etc.

In the illustrated example of FIG. 10, the example multiphase flow measurement system 1000 includes the first RF EM transmission system 136 of FIGS. 1A and 1B including the first and the second EM wave transmitters 138, 142 to send one or more signals (e.g., RF/EM waves) at one or more frequencies to the first and the second EM wave receivers 140, 144. Additionally or alternatively, the example multiphase flow measurement system 1000 may include the second RF EM transmission system 206 of FIGS. 2A and 2B including the first through the third EM wave transmitters 138, 142, 202 to send one or more signals at one or more frequencies to the first through the third EM wave receivers 140, 144, 204.

The example flowmeter manager 148 includes the processor(s) 1002 and/or the sensor electronics 1004 to provide signal excitation at one or more frequencies to one or more of the EM wave transmitters 138, 142, 202. For example, the processor(s) 1002 may select a frequency of interest and may direct the sensor electronics 1004 to excite one or more of the EM wave transmitters 138, 142, 202 at the selected frequency of interest. Additionally or alternatively, the example flowmeter manager 148 includes the one or more processors and/or the sensor electronics to receive sensor data from the one or more EM wave receivers 140, 144, 204.

In the illustrated example of FIG. 10, the multiphase flow measurement system 1000 uses the flowmeter manager 148 to determine the mixture permittivity ($\varepsilon_{mixture}$) and the mixture conductivity ($\sigma_{mixture}$) by processing one or more of the amplitude-attenuation measurements and/or the phase-shift measurements conducted by the first RF EM transmission system 136 or the second RF EM transmission system 206. By determining the mixture permittivity and the mixture conductivity, the example flowmeter manager 148 can determine the WLR, the liquid holdup ($\alpha_{liquid}$), and/or the water conductivity/salinity of the multiphase flow 106. The example flowmeter manager 148 can determine such parameters of the multiphase flow 106 because the WLR, the liquid holdup, and/or the water conductivity/salinity affect the transmitted EM wave amplitude-attenuation and the phase-shift measurements conducted by the RF EM transmission systems 136, 206, which are used to calculate the mixture permittivity and conductivity.

In the illustrated example of FIG. 10, the multiphase flow measurement system 1000 includes the microwave open-coaxial probes 302, 304 to calculate mixture permittivity, mixture conductivity, and brine conductivity/salinity. Additionally or alternatively, the example multiphase flow measurement system 1000 includes the temperature transmitter 146 to measure a temperature of the multiphase flow 106. Additionally or alternatively, the example multiphase flow measurement system 1000 includes the Coriolis flowmeter 402 to measure a total mass flow rate ($q_{total}$) and a mixture density ($\rho_{mixture}$) of the multiphase flow 106. Additionally or alternatively, the example multiphase flow measurement system 1000 includes one or more of the multivariable transmitters 414, 622 to measure a pressure and a temperature of the multiphase flow 106. Additionally or alternatively, the example multiphase flow measurement system 1000 includes the pitot tube 602 to measure a dynamic impact pressure ($\Delta P_u$), a static pressure, and a temperature of the multiphase flow 106 (e.g., by the use of one or more of the multivariable transmitters 414, 622).

In the illustrated example of FIG. 10, the multiphase flow measurement system 1000 includes at least one of the differential pressure transmitters 132, 616, 726, to determine a differential pressure with respect to the multiphase flow 106. The example processor(s) 1002 may combine the differential pressure measurements (e.g., the differential pressure measurements made across the mixer 128, the Venturi structure 902, etc.) to determine the mixture velocity ($u_{mixture}$) and the mixture density ($\rho_{mixture}$) with the mixture permittivity ($\varepsilon_{mixture}$) or the mixture conductivity ($\rho_{mixture}$) measured by one of the electromagnetic sensing methods (e.g., the inline coaxial sensor 702, the EM transmission system 136, the microwave open-coaxial probes 302, 304, etc.) to determine the WLR and the liquid fraction (e.g., from the differential pressure-derived mixture density), the flow rates of gas, oil, and water at the pressure and temperature conditions measured by one or more of the temperature transmitter 146, one or more of the differential pressure transmitters 132, 616, 726, the multivariable transmitters 414, 622, etc.

In the illustrated example of FIG. 10, the multiphase flow measurement system 1000 includes the removably coupled optical probe 404 to measure a WLR of the multiphase flow 106. In FIG. 10, the flowmeter manager 148 can determine an optimal dimension or a size of the flow gap 406 of the optical probe 404 of FIG. 4. The example flowmeter manager 148 may determine the optimal dimension according to the optical attenuation (absorption/scattering) properties of the oil and water, and/or a mixture of the oil and water. For example, the flowmeter manager 148 may transmit a command or a recommendation to select the optical sensor 404 with increased or decreased a size of the flow gap 406 to alter an amount of fluid measured in the flow gap 406 that would not induce an excessive attenuation.

In the illustrated example of FIG. 10, the multiphase flow measurement system 1000 includes the inline coaxial sensor 702 and the corresponding sensor electronics 1004, which may implement the MW sensor electronics 705 of FIGS. 7A-9A. The example flowmeter manager 148 obtains data from the inline coaxial sensor 702 to determine the mixture permittivity and/or the mixture conductivity based on the inline coaxial sensor 702 measuring a reflection coefficient (F) using the sensor electronics 1004. The example inline coaxial sensor 702 measures the reflection coefficient at one or more RF/MW spot frequencies specified by the flowmeter manager 148.

In the illustrated example of FIG. 10, the multiphase flow measurement system 1000 is communicatively coupled to the network 1008 via the flowmeter manager 148. The example network 1008 of the illustrated example of FIG. 10 is the Internet. However, the example network 1008 may be implemented using any suitable wired and/or wireless network(s) including, for example, one or more data buses, one or more Local Area Networks (LANs), one or more wireless LANs, one or more cellular networks, one or more private networks, one or more public networks, or the cloud-based network resources from a centralized third-party provider using Wide Area Networking (WAN) or Internet, etc.

In some examples, the network 1008 enables the flowmeter manager 148 and/or, more generally, one or more of the multiphase flow measurement systems 1000 to communicate with an external computing device (e.g., a database, a server, etc.) to store the information obtained, calculated, and/or otherwise determined by the flowmeter manager 148. In such examples, the network 1008 enables the flowmeter manager 148 and/or, more generally, one or more of the multiphase flow measurement systems 1000 to retrieve and/or otherwise obtain the stored information for processing. In some examples, the network 1008 enables the flowmeter manager 148 and/or, more generally, one or more of the multiphase flow measurement systems 1000 to provide mapping of the oil-gas production history and to manage production of an oilfield consisting of one or more wells, or to recommend a change in operation of an external oilfield device, such as changing the setting of a choke valve or any other type of fluid flow control assembly based on a value of a direct or a calculated measurement (such as well head pressure, salinity, water cut, gas volume fraction)

corresponding to the multiphase flow 106. In some examples, the flowmeter manager 148 instructs and/or otherwise causes a change in operation of the external oilfield device in response to determining a measurement corresponding to the multiphase flow 106. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time events.

While an example manner of implementing the flowmeter manager 148 of FIGS. 1A, 2A, 3-7A, 8A and 9A is illustrated in FIG. 10, one or more of the elements, processes, and/or devices illustrated in FIG. 10 may be combined, divided, re-arranged, omitted, eliminated, and/or implemented in any other way. Further, the example processor(s) 1002, the example sensor electronics 1004, the database 1006, and/or, more generally, the example flowmeter manager 148 of FIGS. 1A, 2A, 3-7A, 8A and 9A may be implemented by hardware, software, firmware, and/or any combination of hardware, software, and/or firmware. Thus, for example, any of the example processor(s) 1002, the example sensor electronics 1004, the database 1006, and/or, more generally, the example flowmeter manager 148 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate array(s) (FPGA(s)), and/or field programmable logic device(s) (FPLD(s)). When reading any of the apparatus or system claims of this patent to cover a purely software and/or firmware implementation, at least one of the example processor(s) 1002, the example sensor electronics 1004, and/or the example database 1006 is/are hereby expressly defined to include a non-transitory computer readable storage device or storage disk such as a memory, a digital versatile disk (DVD), a compact disk (CD), a Blu-ray disk, etc., including the software and/or firmware. Further still, the example flowmeter manager 148 of FIGS. 1A, 2A, 3-7A, 8A and 9A may include one or more elements, processes, and/or devices in addition to, or instead of, those illustrated in FIG. 10, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 11:
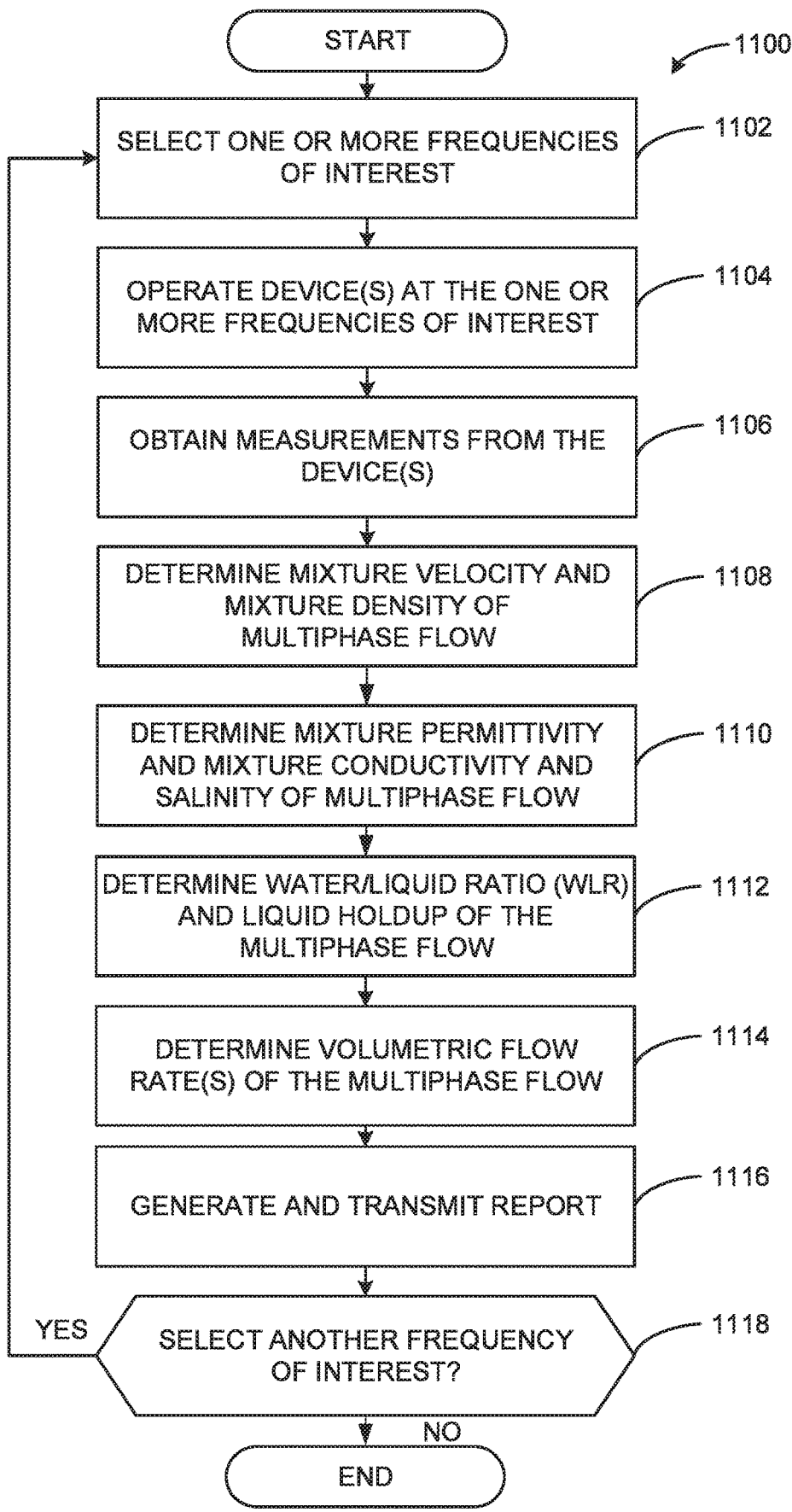
FIGS. 11-12 are flowcharts representative of machine readable instructions that may be executed to implement the flowmeter manager of FIGS. 1A, 2A, 3-7A, 8A and 9A.
Figure 12:
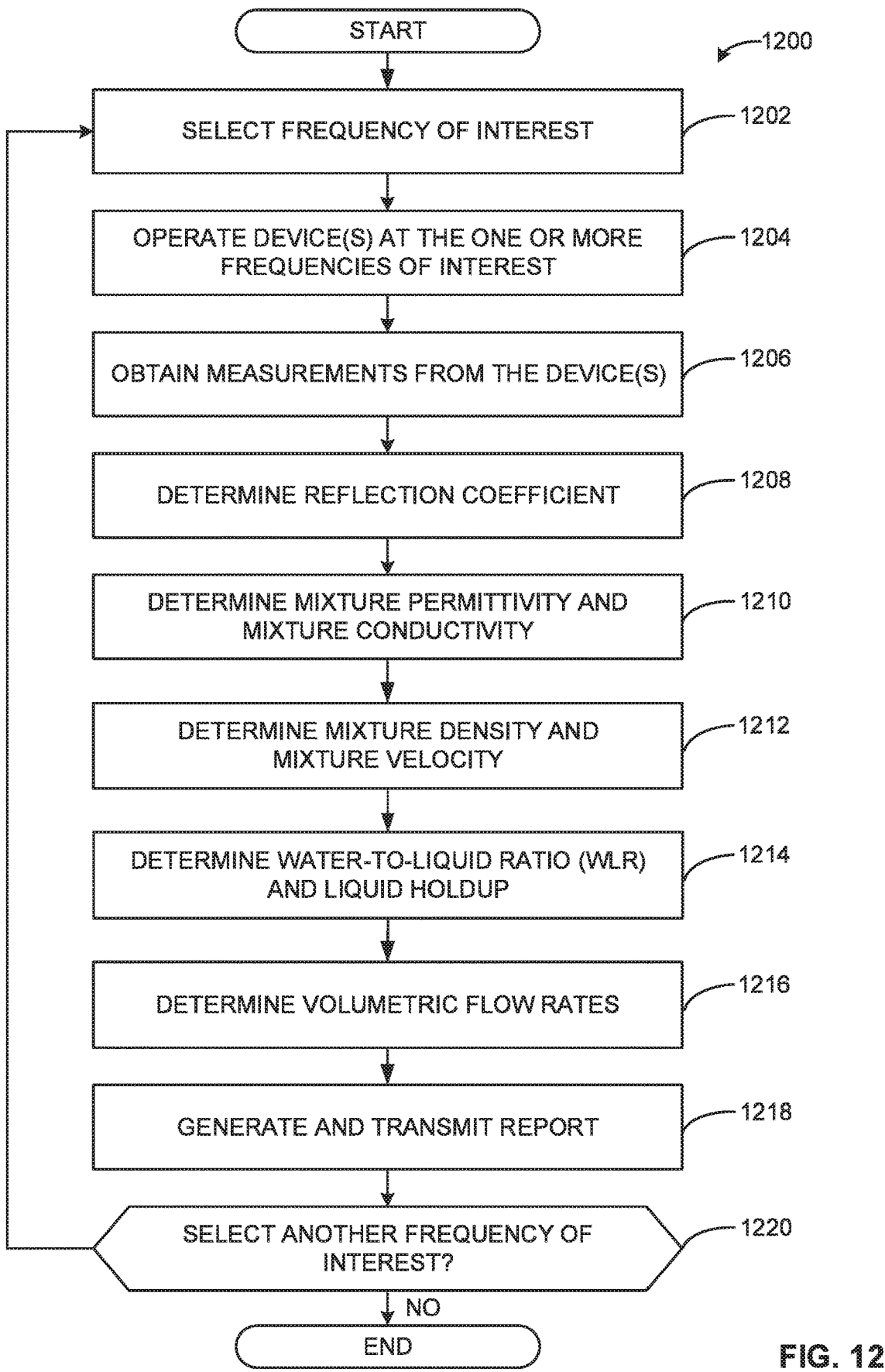

Flowcharts representative of example hardware logic or machine readable instructions for implementing the example flowmeter manager 148 of FIGS. 1A, 2A, 3-7A, 8A and 9A are shown in FIGS. 11-12. The machine readable instructions may be a program or portion of a program for execution by a processor such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 11-12, many other methods of implementing the example flowmeter manager 148 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 11-12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

FIG. 11 is a flowchart representative of an example method 1100 that may be performed by the example flowmeter manager 148 of FIGS. 1A, 2A, 3-7A, 8A and 9A to determine one or more properties such as the mixture velocity, the mixture density, or the volumetric flow rates of the multiphase flow 106 of FIGS. 1A-9A using the differential pressure ($\Delta P$) measured across a mixer by a differential pressure transmitter 132 of FIG. 1A, the Doppler probes 102, 104 of FIG. 1A and an EM transmission system such as the first EM transmission system 136 of FIG. 1A-1B. The example method 1100 begins at block 1102 at which the example flowmeter manager 148 selects one or more frequencies of interest. For example, the processor(s) 1002 of FIG. 10 may be communicatively coupled to the first multiphase flowmeter 100 of FIG. 1A. In such an example, the processor(s) 1002 may select a first microwave or ultrasonic frequency to excite one or more of the Doppler probes 102, 104 of FIG. 1A and/or select a first EM wave frequency to excite one or more of the EM transmitters 138, 142 of FIG. 1A.

At block 1104, the example flowmeter manager 148 operates the device(s) at the one or more frequencies of interest. For example, the processor(s) 1002 may direct the sensor electronics 1004 to excite one or more of the Doppler probes 102, 104 at the first microwave or ultrasonic frequency and/or excite one or more of the EM transmitters 138, 142 at the first EM wave frequency.

At block 1106, the example flowmeter manager 148 obtains measurements from the device(s). For example, the sensor electronics 1004 may obtain measurements from one or more of the Doppler probes 102, 104, one or more of the EM receivers 140, 144, or the differential pressure sensor 132 monitoring the first multiphase flowmeter 100 of FIG. 1A.

At block 1108, the example flowmeter manager 148 determines a mixture velocity and a mixture density of a multiphase flow. For example, the processor(s) 1002 may calculate the mixture velocity ($u_{mixture}$) of the multiphase flow 106 based on the microwave or ultrasonic Doppler frequency-shift data ($u_{doppler}$) as described above in connection with the example of Equation (2) above. For example, the processor(s) 1002 may determine the mixture density ($\rho_{mixture}$) from the measured differential pressure $\Delta P$ (at block 1106) and the Doppler-probe measured mixture velocity $u_{mixture}$, with the examples of Equations (1)-(3) above.

At block 1110, the example flowmeter manager 148 determines a mixture permittivity ($\varepsilon_{mixture}$) and/or a mixture conductivity ($\sigma_{mixture}$) of the multiphase flow. For example, the processor(s) 1002 may calculate the mixture permittivity ($\varepsilon_{mixture}$) and/or the mixture conductivity ($\sigma_{mixture}$) of multiphase flow 106 based on the EM cross-pipe transmission amplitude-attenuation (AT) and phase-shift (PS) measured from the EM receivers 140, 144, by using one or more of the examples of the (implicit) mathematical-physical model Equations (8)-(9). The related example oil-water-gas dielectric mixing models are illustrated by the examples of Equations (12), (15) and (19) above.

At block 1112, the example flowmeter manager 148 determines the water/liquid ratio (WLR) and the liquid holdup of the mixed multiphase flow. For example, the processor(s) 1002 may calculate the WLR and the liquid holdup ($\alpha_{liquid}$) corresponding to the multiphase flow 106 based on the EM cross-pipe transmission measurement system determined mixture permittivity ($\varepsilon_{mixture}$) and/or the mixture conductivity ($\sigma_{mixture}$) determined at block 1110, and the mixture density ($\rho_{mixture}$) determined at block 1108. For example, the processor(s) 1002 may calculate the WLR and the liquid holdup by using one or more of the examples of Equations (5)-(7) and (20)-(22) above. The ratio of the mixture conductivity ($\sigma_{mixture}$) to mixture permittivity ($\varepsilon_{mixture}$) can yield determination of the water conductivity $\sigma_{water}$ (and salinity), leading to salinity-independent WLR and liquid holdup determination.

At block 1114, the example flowmeter manager 148 determines volumetric flow rate(s) of the multiphase flow. For example, the processor(s) 1002 may use the mixture velocity ($u_{mixture}$) determined at block 1108, and the WLR and liquid holdup ($\alpha_{liquid}$) determined at block 1112, to calculate the total volumetric flow rate ($Q_{total}$), the gas volumetric flow rate ($Q_{gas}$), the liquid volumetric flow rate ($Q_{liquid}$), the water volumetric flow rate ($Q_{water}$), and/or the oil volumetric flow rate ($Q_{oil}$) by using one or more of the examples of Equations (23a)-(23e) as described above.

At block 1116, the example flowmeter manager 148 generates and transmits a report. For example, the processor(s) 1002 may generate a report and transmit the report to another computing device such as a server via the network 1008 of FIG. 10. For example, the processor(s) 1002 may generate a report including one or more values corresponding to the multiphase flow 106 such as the oil volumetric flow rate, the gas volumetric flow rate, the water volumetric flow rate, the WLR, the liquid holdup, the salinity, the pressure, the temperature etc., and/or a combination thereof.

At block 1118, the example flowmeter manager 148 determines whether to select another frequency of interest. For example, the processor(s) 1002 may direct the sensor electronics 1004 to excite the first and the second EM transmitters 138, 142 to transmit EM waves at a second frequency of interest. If, at block 1118, the example flowmeter manager 148 determines to select another frequency of interest, control returns to block 1102 to select another frequency of interest, otherwise the example method 1100 of FIG. 11 concludes. Alternatively, the execution sequence of block 1116 and block 1118 may be reversed (e.g., selecting another frequency of interest may be executed before generating and transmitting the report).

FIG. 12 is a flowchart representative of an example method 1200 that may be performed by the example flowmeter manager 148 of FIGS. 1A, 2A, 3-7A, 8A and 9A to determine one or more properties such as the mixture velocity, the mixture density, or the volumetric flow rates of the multiphase flow 106 of FIGS. 1A-9A using microwave sensor electronics. The example method 1200 begins at block 1202 at which the example flowmeter manager 148 selects a frequency of interest. For example, the processor(s) 1002 of FIG. 10 may be communicatively coupled to the seventh multiphase flowmeter 700 of FIG. 7A monitoring the multiphase flow 106. In such an example, the processor(s) 1002 may select a first RF/MW frequency to excite inline coaxial sensor 702 connected to the MW sensor electronics 705 of FIGS. 7A-9A or to the sensor electronics 1004 of FIG. 7A.

At block 1204, the example flowmeter manager 148 operates the device(s) at the frequency of interest. For example, the processor(s) 1002 may direct the sensor electronics 1004 to excite the MW sensor electronics 705 to transmit an electromagnetic wave at the first RF/MW frequency.

At block 1206, the example flowmeter manager 148 obtains measurements from the device(s). For example, the sensor electronics 1004 may obtain measurements from the inline coaxial sensor 702, the first differential pressure sensor 132, the second differential pressure sensor 726, and/or the temperature probe 146 monitoring the multiphase flow 106 flowing through the seventh multiphase flowmeter 700 of FIG. 7A.

At block 1208, the example flowmeter manager 148 determines a reflection coefficient. For example, the processor(s) 1002 may determine the measured complex reflection coefficient ($\Gamma^*$) corresponding to the multiphase flow 106 by using the example of Equation (35) as described above based on data measured by the inline coaxial sensor 702 coupled to the MW sensor electronics 705 of FIG. 7A (e.g., the sensor electronics 1004 of FIG. 10) via the coaxial feedthrough 704 of FIG. 7A.

At block 1210, the example flowmeter manager 148 determines a mixture permittivity and a mixture conductivity. For example the processor(s) 1002 may determine the mixture permittivity and the mixture conductivity of the multiphase flow 106 by using the examples of Equations (38)-(39) above, using the measured complex reflection coefficient ($\Gamma^*$) determined at block 1208.

At block 1212, the example flowmeter manager 148 determines a mixture density and a mixture velocity. For example, the processor(s) 1002 may determine the mixture density and the mixture velocity of the multiphase flow 106 by using the examples of Equations (43)-(44) as described above. Alternatively, the mixture velocity may be determined by a method based on data obtained from the Doppler probes 102, 104 of FIG. 1A. The processor(s) 1002 may determine the mixture density from the measured differential pressure ΔP (at block 1206) and the Doppler-probe measured mixture velocity, with the examples of Equations (1)-(3) above.

At block 1214, the example flowmeter manager 148 determines the water-to-liquid ratio (WLR) and the liquid holdup of the mixed multiphase flow. For example, the processor(s) 1002 may calculate the WLR and the liquid holdup ($\alpha_{liquid}$) corresponding to the multiphase flow 106 based on the inline coaxial sensor determined mixture permittivity ($\varepsilon_{mixture}$) and/or the mixture conductivity ($\sigma_{mixture}$) determined at block 1210, and the mixture density ($\rho_{mixture}$) determined at block 1212. For example, the processor(s) 1002 may calculate the WLR and the liquid holdup by using one or more of the examples of Equations (6a) and (45)-(46) above. The ratio of the mixture conductivity ($\sigma_{mixture}$) to mixture permittivity ($\varepsilon_{mixture}$) can yield determination of the water conductivity $\sigma_{water}$ (and salinity), the water permittivity $\varepsilon_{water}$, leading to salinity-independent WLR and liquid holdup determination.

At block 1216, the example flowmeter manager 148 determines volumetric flow rates. For example, the processor(s) 1002 may use the mixture velocity ($u_{mixture}$) determined at block 1212, and the WLR and liquid holdup ($\alpha_{liquid}$) determined at block 1214, to determine the total volumetric flow rate ($Q_{total}$), the gas volumetric flow rate ($Q_{gas}$), the liquid volumetric flow rate ($Q_{liquid}$), the water volumetric flow rate ($Q_{water}$), and/or the oil volumetric flow rate ($Q_{oil}$) by using one or more of the examples of Equations (23a)-(23e) as described above.

At block 1218, the example flowmeter manager 148 generates and transmits a report. For example, the processor(s) 1002 may generate a report and transmit the report to another computing device such as a server via the network 1008 of FIG. 10. For example, the processor(s) 1002 may generate a report including one or more values corresponding to the multiphase flow 106 such as the oil volumetric flow rate, the gas volumetric flow rate, the water volumetric flow rate, the WLR, the liquid holdup, salinity, pressure, temperature etc., and/or a combination thereof.

At block 1220, the example flowmeter manager 148 determines whether to select another frequency of interest. For example, the processor(s) 1002 may direct the sensor electronics 1004 to excite the inline coaxial sensor 702 to transmit and receive EM waves at a second RF/EM frequency of interest. If, at block 1220, the example flowmeter manager 148 determines to select another frequency of interest, control returns to block 1202 to select another frequency of interest, otherwise the example method 1200 of FIG. 12 concludes. Alternatively, the execution sequence of block 1220 and block 1218 may be reversed (e.g., selecting another frequency of interest may be executed before generating and transmitting the report).

Figure 13:
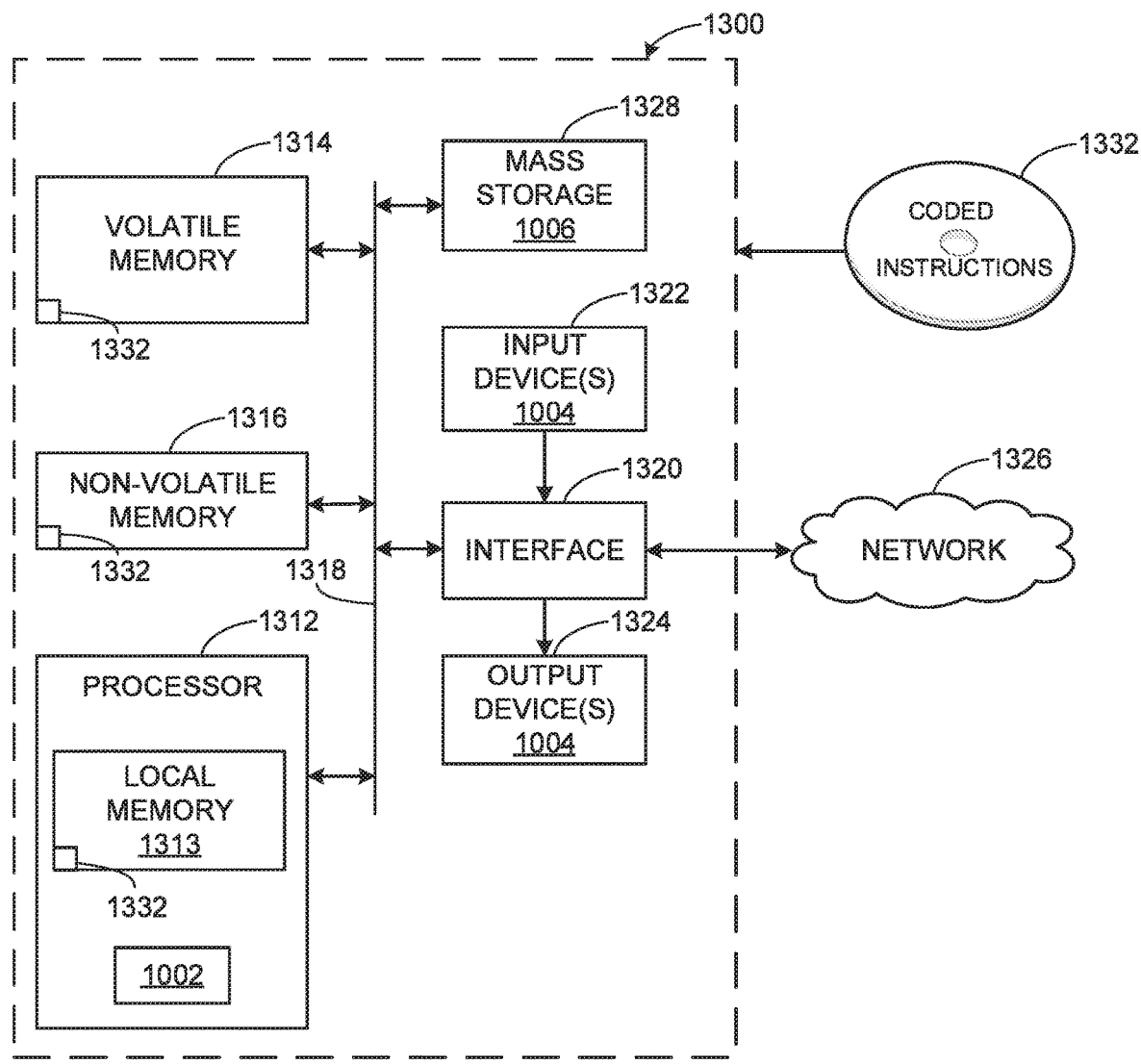
FIG. 13 is a block diagram of an example processing platform structured to execute the instructions of FIGS. 11-12 to implement the flowmeter manager of FIGS. 1A, 2A, 3-7A, 8A and 9A.

FIG. 13 is a block diagram of an example processor platform 1300 structured to execute the instructions of FIGS. 11-12 to implement the flowmeter manager 148 of FIGS. 1A-10. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. The processor 1312 implements the processor(s) 1002 of FIG. 10.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, an isopoint device, sensor electronics, and/or a voice recognition system. The input device(s) 1322 implement the example sensor electronics 1004 of FIG. 10.

One or more output devices 1324 are also connected to the interface circuit 1320 of the illustrated example. The output devices 1024 can be implemented, for example, by sensor electronics, display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1320 of the illustrated example, thus, typically includes a graphics driver card, a graphics driver chip, and/or a graphics driver processor. The output device(s) 1324 implement the example sensor electronics 1004 of FIG. 10.

The interface circuit 1320 of the illustrated example also includes a communication device such as a transmitter, a receiver, a transceiver, a sensor transmitter, a sensor receiver, a sensor transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, a RS-485 multidrop multi-master serial bus, a controller area network (CAN) bus, a PROFIBUS network, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives. The mass storage devices 1328 implements the example database 1006 of FIG. 10.

The machine executable instructions 1332 of FIGS. 11-12 may be stored in the mass storage device 1328, in the volatile memory 1314, in the non-volatile memory 1316, and/or on a removable non-transitory computer readable storage medium such as a CD or DVD.

Alternatively, the example mass storage 1328 and/or, more generally, the example processing platform 1300, may be cloud-based. Cloud computing and big data analytics may be performed for real-time data gathered by a plurality of example multiphase flow measurement systems 1000 installed and/or otherwise operating on a plurality of wellheads over a plurality of oilfields. The cloud computing enables ubiquitous access to shared pools of configurable system resources and higher-level services that can be rapidly provisioned with over the Internet.

From the foregoing, it will be appreciated that example systems, methods, apparatus, and articles of manufacture have been disclosed that measure a characteristic of a multiphase fluid flow. Example nuclear-free multiphase flowmeter apparatus disclosed herein include a static mixer to homogenize either an incoming horizontal or vertical multiphase flow. An example flowmeter manager apparatus disclosed herein can determine a gas-liquid mixed-flow density of the incoming multiphase flow by measuring a differential pressure and a mixture velocity; the mixture density is related to the liquid holdup and the WLR of the mixed-flow; the mixture velocity may be determined by microwave or ultrasonic Doppler probes, or by cross-correlation transit-time determination of the signals from two axially-spaced (i) EM transmission antenna pairs, or (ii) microwave open-coaxial probes disclosed herein. The example flowmeter manager apparatus can measure mixed-flow permittivity and conductivity by using microwave transmission/reflection sensors. The example flowmeter manager apparatus can determine mixed-flow liquid holdup and WLR based on determining the mixed-flow density and mixed-flow permittivity/conductivity. The example flowmeter manager apparatus can determine mixed-flow WLR based on determining the mixed-flow optical absorption using an optical sensor. The example flowmeter manager apparatus can determine volumetric flow rates of gas, liquid, water, and oil based on the determined mixed-flow velocity, liquid holdup, and WLR.

In some example multiphase flowmeter apparatus, the flowmeter manager apparatus can determine the gas-liquid mixed-flow density using an example multiphase flowmeter by measuring a differential pressure across a pipe vertical diameter. Mixed-flow density and mass flow rate can be measured by a Coriolis flowmeter over a specific range of liquid holdup. A dynamic pressure, a static pressure, and a temperature of gas-liquid mixed-flow may be measured with an insertion averaging pitot tube downstream of a static mixer. The example flowmeter manager apparatus can calculate the mixed-flow velocity (and hence the total volumetric flow rate) by determining the mixture density and the dynamic impact pressure. In such example multiphase flowmeter apparatus, the flowmeter manager apparatus can determine the WLR of the mixed flow based on measurements obtained from a water-cut sensor, such as that based on optical absorption measurement. Gas, liquid, water, and oil volumetric flow rates can be derived from the total volumetric flow rate, gas/liquid holdup, and the WLR.

In some example multiphase flowmeter apparatus, the flowmeter manager apparatus can determine mixed-flow permittivity and conductivity of the mixed gas-liquid flow using an inline RF/microwave coaxial sensor sufficiently downstream of a static mixer. The microwave reflection coefficient measured by the inline coaxial sensor may be used to determine the mixture permittivity and conductivity (that are also related to the liquid holdup and the WLR). The example flowmeter manager apparatus can determine the desired liquid holdup and WLR independent of brine salinity. The example flowmeter manager apparatus can determine mixed-flow WLR based on determining the mixed-flow optical absorption using an optical sensor. The example flowmeter manager apparatus can determine volumetric flow rates based on the mixture velocity, liquid holdup, and the WLR.

Example 1 includes a system, comprising a flowmeter including a mixer to homogenize a fluid received at an inlet of the flowmeter, a differential pressure sensor to measure a differential pressure of the fluid across an inlet and an outlet of the mixer, and a doppler probe to transmit a microwave or an ultrasonic wave into the fluid to generate doppler frequency shift data, and a flowmeter manager to calculate a velocity of the fluid based on the doppler frequency shift data, and calculate a density of the fluid based on the differential pressure and the velocity.

Example 2 includes the system of example 1, wherein the fluid is a three-phase flow including a gas phase, an oil phase, and a water phase.

Example 3 includes the system of example 1, wherein the differential pressure sensor includes a first sensing element and a second sensing element, the first sensing element disposed at the inlet of the mixer, the second sensing element disposed at the outlet of the mixer.

Example 4 includes the system of example 1, wherein the differential pressure is based on a first pressure at a first location disposed at the inlet of the mixer and a second pressure at a second location disposed at the outlet of the mixer.

Example 5 includes the system of example 1, wherein the doppler probe is a first doppler probe, further including a second doppler probe, the first doppler probe and the second doppler probe to transmit the microwave or ultrasonic wave into the fluid and receive a reflected microwave or a reflected ultrasonic wave by the fluid.

Example 6 includes the system of example 5, wherein the first doppler probe is coupled to a first side of the flowmeter and the second doppler probe is coupled to a second side of the flowmeter, the first side opposite the second side, the first doppler probe and the second doppler probe disposed at an axial position downstream of the mixer where the fluid is substantially homogenized.

Example 7 includes the system of example 1, further including an electromagnetic transmitter to transmit an electromagnetic wave into the fluid, and an electromagnetic receiver to receive the electromagnetic wave, the electromagnetic receiver to generate amplitude-attenuation data and phase-shift data based on the received electromagnetic wave.

Example 8 includes the system of example 7, wherein the electromagnetic transmitter and the electromagnetic receiver are disposed at an axial position downstream of the mixer where the fluid is substantially homogenized.

Example 9 includes the system of example 8, wherein the electromagnetic transmitter is a first electromagnetic transmitter, the electromagnetic receiver is a first electromagnetic receiver, the axial position is a first axial position, further including a second electromagnetic transmitter to transmit the electromagnetic wave into the fluid, a second electromagnetic receiver to receive the electromagnetic wave, the second electromagnetic transmitter and the second electromagnetic receiver disposed at a second axial position, the second axial position different from the first axial position, and the flowmeter manager to calculate the velocity of the fluid based on determining a cross-correlation transit-time of the electromagnetic wave received at the first axial position and at the second axial position, and calculate the density of the fluid based on the differential pressure and the velocity.

Example 10 includes the system of example 7, wherein the flowmeter manager further calculates a permittivity of the fluid based on the amplitude-attenuation data and the phase-shift data, and a conductivity of the fluid based on the amplitude-attenuation data and the phase-shift data.

Example 11 includes the system of example 10, wherein the differential pressure sensor includes a sensing element to measure a pressure of the fluid, further including a temperature probe to measure a temperature of the fluid.

Example 12 includes the system of example 11, wherein the temperature probe is disposed downstream of the doppler probe and proximate an outlet of the flowmeter, the sensing element is disposed at the outlet of the mixer.

Example 13 includes the system of example 11, wherein the flowmeter manager calculates at least one of a water conductivity, a water permittivity, a water density, or a water salinity based on the permittivity, the conductivity, the temperature, and the pressure.

Example 14 includes the system of example 10, wherein the flowmeter manager calculates a liquid holdup of the fluid based on the density and at least one of the permittivity or the conductivity, and a water-to-liquid ratio based on the density and at least one of the permittivity or the conductivity.

Example 15 includes the system of example 7, wherein the electromagnetic transmitter is a first electromagnetic transmitter, the electromagnetic receiver is a first electromagnetic receiver, further including a second electromagnetic transmitter to transmit the electromagnetic wave into the fluid, a second electromagnetic receiver to receive the electromagnetic wave, and the flowmeter manager to determine first amplitude-attenuation and first phase-shift measurements from the first electromagnetic transmitter and the first electromagnetic receiver, determine second amplitude-attenuation and second phase-shift measurements from the first electromagnetic transmitter and the second electromagnetic receiver, determine third amplitude-attenuation and third phase-shift measurements from the second electromagnetic transmitter and the first electromagnetic receiver, determine fourth amplitude-attenuation and fourth phase-shift measurements from the second electromagnetic transmitter and the second electromagnetic receiver, and calculate a mixture permittivity and a mixture conductivity based on the first through the fourth amplitude-attenuation and phase-shift measurements.

Example 16 includes the system of example 1, wherein the flowmeter manager is coupled to a cloud-based network to perform at least one of big data analytics, cloud-based data storage, or deep machine learning to enable multi-well, multi-field oil-gas production management.

Example 17 includes the system of example 1, wherein the cloud-based network performs cloud computing and big data analytics for real-time data obtained from a plurality of flowmeter managers coupled to the cloud-based network.

Example 18 includes the system of example 1, wherein the flowmeter manager is an internet of things (IoT) device enabled to facilitate at least one of capturing, communicating, analyzing, or acting on data generated by objects and machines coupled to the cloud-based network.

Example 19 includes a system, comprising a flowmeter including a mixer to homogenize a fluid received at an inlet of the flowmeter, a differential pressure sensor to measure a differential pressure of the fluid across an inlet and an outlet of the mixer, a first microwave probe to transmit a first microwave into the fluid at a first axial position and receive a first reflected microwave, and a second microwave probe to transmit a second microwave into the fluid at a second axial position and receive a second reflected microwave, and a flowmeter manager to calculate a velocity of the fluid based on determining a cross-correlation transit-time based on the first reflected microwave and the second reflected microwave, and calculate a density of the fluid based on the differential pressure and the velocity.

Example 20 includes the system of example 19, wherein the first microwave probe is coupled to the flowmeter at the first axial position downstream of the mixer and the second microwave probe is coupled to the flowmeter at the second axial position downstream of the mixer, the first axial position different from the second axial position.

Example 21 includes the system of example 19, wherein the fluid is a three-phase flow including a gas phase, an oil phase, and a water phase.

Example 22 includes the system of example 19, wherein the differential pressure sensor includes a first pressure transducer and a second pressure transducer, the first pressure transducer disposed at the inlet of the mixer, the second pressure transducer disposed at the outlet of the mixer.

Example 23 includes the system of example 19, wherein the differential pressure sensor is based on a first pressure at a first location disposed at the inlet of the mixer and a second pressure at a second location disposed at the outlet of the mixer.

Example 24 includes the system of example 19, wherein the first axial position and the second axial position are disposed downstream of the mixer where the fluid is substantially homogenized.

Example 25 includes the system of example 19, wherein the flowmeter manager calculates a first reflection coefficient of the fluid based on a first ratio of a first signal corresponding to the first reflected microwave and the first microwave at the first axial position, and a second reflection coefficient of the fluid based on a second ratio of a second signal corresponding to the second reflected microwave and the second microwave at the second axial position.

Example 26 includes the system of example 25, wherein the flowmeter manager calculates a permittivity of the fluid and a conductivity of the fluid based on at least one of the first reflection coefficient or the second reflection coefficient, a liquid holdup of the fluid based on the density and at least one of the permittivity or the conductivity, and a water-to-liquid ratio based on the density and at least one of the permittivity or the conductivity.

Example 27 includes the system of example 26, wherein the differential pressure sensor includes a sensing element to measure a pressure of the fluid, further including a temperature probe to measure a temperature of the fluid.

Example 28 includes the system of example 27, wherein the temperature probe is disposed downstream of the first microwave probe and the second microwave probe and proximate an outlet of the flowmeter, the sensing element is disposed at the outlet of the mixer.

Example 29 includes the system of example 27, wherein the flowmeter manager calculates at least one of a water conductivity, a water permittivity, a water density, or a water salinity based on the permittivity, the conductivity, the temperature, and the pressure.

Example 30 includes the system of example 19, wherein the flowmeter manager is coupled to a cloud-based network to perform at least one of big data analytics, cloud-based data storage, or deep machine learning to enable multi-well, multi-field oil-gas production management.

Example 31 includes the system of example 19, wherein the cloud-based network performs cloud computing and big data analytics for real-time data obtained from a plurality of flowmeter managers coupled to the cloud-based network.

Example 32 includes the system of example 19, wherein the flowmeter manager is an internet of things (IoT) device enabled to facilitate at least one of capturing, communicating, analyzing, or acting on data generated by objects and machines coupled to the cloud-based network.

Example 33 includes a system, comprising a flowmeter including a mixer to homogenize a fluid received at an inlet of the flowmeter, a differential pressure sensor to measure a differential pressure across a vertical diameter of the flowmeter, and a pitot tube to measure a first pressure and a second pressure of the fluid, the first pressure different from the second pressure, and a flowmeter manager to calculate a density of the fluid based on the differential pressure measured across the vertical diameter, and calculate a velocity of the fluid based on the first pressure, the second pressure, and the density.

Example 34 includes the system of example 33, wherein the fluid is a three-phase flow including a gas phase, an oil phase, and a water phase.

Example 35 includes the system of example 33, wherein the differential pressure sensor includes a first sensing element and a second sensing element, the first sensing element disposed on a top surface of the flowmeter, the second sensing element disposed on a bottom surface of the flowmeter, the top surface opposite the bottom surface with respect to the vertical diameter.

Example 36 includes the system of example 33, wherein the differential pressure sensor is disposed at a first axial position and the pitot tube is disposed at a second axial position downstream of the first axial position, the first axial position different from the second axial position, the first axial position and the second axial position downstream of the mixer where the fluid is substantially homogenized.

Example 37 includes the system of example 33, wherein the differential pressure sensor is a first differential pressure sensor and the differential pressure is a first differential pressure, further including a second differential pressure sensor to measure a second differential pressure across an inlet and an outlet of the mixer.

Example 38 includes the system of example 37, wherein the second differential pressure sensor includes a first sensing element and a second sensing element, the first sensing element disposed at the inlet of the mixer, the second sensing element disposed at the outlet of the mixer.

Example 39 includes the system of example 33, wherein the pitot tube includes a plurality of pressure ports facing upstream of the fluid to measure the first pressure.

Example 40 includes the system of example 33, wherein the pitot tube includes a pressure port facing downstream of the fluid to measure the second pressure.

Example 41 includes the system of example 33, further including a temperature probe disposed downstream of the pitot tube and proximate an outlet of the flowmeter, the temperature probe to measure a temperature of the fluid.

Example 42 includes the system of example 33, further including an optical probe to measure light absorbed by the fluid, the light including at least one of ultraviolet light, visible light, or near-infrared light, and the flowmeter manager to determine a water-to-liquid ratio based on an absorption of the light by the fluid.

Example 43 includes the system of example 33, wherein the flowmeter manager is coupled to a cloud-based network to perform at least one of big data analytics, cloud-based data storage, or deep machine learning to enable multi-well, multi-field oil-gas production management.

Example 44 includes the system of example 33, wherein the cloud-based network performs cloud computing and big data analytics for real-time data obtained from a plurality of flowmeter managers coupled to the cloud-based network.

Example 45 includes the system of example 33, wherein the flowmeter manager is an internet of things (IoT) device enabled to facilitate at least one of capturing, communicating, analyzing, or acting on data generated by objects and machines coupled to the cloud-based network.

Example 46 includes a system, comprising a flowmeter including a mixer to homogenize a fluid received at an inlet of the flowmeter, a first differential pressure sensor to measure a first differential pressure across an inlet and an outlet of the mixer, a second differential pressure sensor to measure a second differential pressure associated with a measurement area, and a coaxial sensor disposed in the measurement area to transmit a microwave into the fluid and to receive a reflected microwave, and a flowmeter manager to calculate a velocity and a density of the fluid based on the first differential pressure and the second differential pressure, determine a reflection coefficient based on a ratio of a first signal associated with the transmitted microwave and a second signal associated with the reflected microwave, determine a mixture permittivity and a mixture conductivity based on the reflection coefficient, and determine a flow rate of the fluid based on the velocity, a water-to-liquid ratio, and a liquid holdup, the water-to-liquid ratio and the liquid holdup based on the density and at least one of the mixture permittivity or the mixture conductivity.

Example 47 includes the system of example 46, wherein the differential pressure sensor includes a sensing element to measure a pressure of the fluid, the sensing element is disposed downstream of the mixer, further including a temperature probe to measure a temperature of the fluid, the temperature probe is disposed downstream of the mixer and proximate an inlet of the mixer.

Example 48 includes the system of example 47, wherein the flowmeter manager calculates at least one of a water conductivity, a water permittivity, a water salinity, and a water density based on the mixture permittivity, the mixture conductivity, the temperature, and the pressure.

Example 49 includes the system of example 48, wherein the flowmeter manager calculates a water salinity or a water density based on the water conductivity and the temperature.

Example 50 includes the system of example 46, wherein the fluid is a three-phase flow including a gas phase, an oil phase, and a water phase.

Example 51 includes the system of example 46, wherein the first differential pressure sensor includes a first sensing element and a second sensing element, the first sensing element disposed at the inlet of the mixer, the second sensing element disposed at the outlet of the mixer.

Example 52 includes the system of example 46, wherein the first differential pressure sensor is disposed at a first axial position and the second differential pressure sensor is disposed at a second axial position, the first axial position different from the second axial position, the second axial position downstream of the mixer where the fluid is substantially homogenized.

Example 53 includes the system of example 46, wherein the second differential pressure sensor includes a first sensing element and a second sensing element, the first sensing element disposed at prior to the measurement area, the second sensing element disposed in the measurement area.

Example 54 includes the system of example 46, wherein the mixer is at least one of a venturi mixer, a vortex mixer, or an orifice plate.

Example 55 includes the system of example 46, wherein the coaxial sensor includes a center-conductor portion including a first end and a second end, the first end including a pointed structure made of a first dielectric material, the first end facing upstream of the fluid, the second end including a centralizer support structure made of a second dielectric material.

Example 56 includes the system of example 55, wherein the first dielectric material and the second dielectric material are different.

Example 57 includes the system of example 55, wherein the first dielectric material and the second dielectric material are the same.

Example 58 includes the system of example 46, wherein the flowmeter manager is coupled to a cloud-based network to perform at least one of big data analytics, cloud-based data storage, or deep machine learning to enable multi-well, multi-field oil-gas production management.

Example 59 includes the system of example 46, wherein the cloud-based network performs cloud computing and big data analytics for real-time data obtained from a plurality of flowmeter managers coupled to the cloud-based network.

Example 60 includes the system of example 46, wherein the flowmeter manager is an internet of things (loT) device enabled to facilitate at least one of capturing, communicating, analyzing, or acting on data generated by objects and machines coupled to the cloud-based network.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

In the specification and appended claims: the terms "connect," "connection," "connected," "in connection with," and "connecting" are used to mean "in direct connection with" or "in connection with via one or more elements;" and the term "set" is used to mean "one element" or "more than one element." Further, the terms "couple," "coupling," "coupled," "coupled together," and "coupled with" are used to mean "directly coupled together" or "coupled together via one or more elements." As used herein, the terms "up" and "down," "upper" and "lower," "upwardly" and "downwardly," "upstream" and "downstream;" "above" and "below;" and other like terms indicating relative positions above or below a given point or element are used in this description to more clearly describe some embodiments of the disclosure.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. A system, comprising:
    a flowmeter including:
        a mixer configured to homogenize a fluid received at an inlet of the flowmeter;
        a temperature probe configured to measure a temperature of the fluid;
        a differential pressure sensor configured to measure a differential pressure of the fluid across an inlet and an outlet of the mixer, wherein the differential pressure sensor comprises a sensing element configured to measure a pressure of the fluid; and
        a Doppler probe configured to transmit a microwave or an ultrasonic wave into the fluid to generate Doppler frequency shift data;
    an electromagnetic transmitter configured to transmit an electromagnetic wave into the fluid;
    an electromagnetic receiver configured to receive the electromagnetic wave, the electromagnetic receiver configured to generate amplitude-attenuation data and phase-shift data based on the received electromagnetic wave; and
    a flowmeter manager configured to:
        calculate a velocity of the fluid based on the Doppler frequency shift data;
        calculate a density of the fluid based on the differential pressure and the velocity;
        calculate a permittivity of the fluid based on the amplitude-attenuation data;
        calculate a conductivity of the fluid based on the amplitude-attenuation data and the phase-shift data; and
        calculate at least one of a water conductivity, a water permittivity, a water density, or a water salinity based on the permittivity of the fluid, the conductivity of the fluid, the temperature of the fluid, and the pressure of the fluid.

2. The system of claim 1, wherein the differential pressure sensor includes a first sensing element and a second sensing element, the first sensing element disposed at the inlet of the mixer, the second sensing element disposed at the outlet of the mixer.

3. The system of claim 1, wherein the Doppler probe is a first Doppler probe, further including a second Doppler probe, the first Doppler probe and the second Doppler probe configured to transmit the microwave or ultrasonic wave into the fluid and receive a reflected microwave or a reflected ultrasonic wave by the fluid.

4. The system of claim 3, wherein the first Doppler probe is coupled to a first side of the flowmeter and the second Doppler probe is coupled to a second side of the flowmeter, the first side opposite the second side, the first Doppler probe and the second Doppler probe disposed at an axial position downstream of the mixer where the fluid is substantially homogenized.

5. The system of claim 1, wherein the electromagnetic transmitter and the electromagnetic receiver are disposed at an axial position downstream of the mixer where the fluid is substantially homogenized.

6. The system of claim 5, wherein the electromagnetic transmitter is a first electromagnetic transmitter, the electromagnetic receiver is a first electromagnetic receiver, the axial position is a first axial position, further including:
   a second electromagnetic transmitter configured to transmit the electromagnetic wave into the fluid;
   a second electromagnetic receiver configured to receive the electromagnetic wave, the second electromagnetic transmitter and the second electromagnetic receiver disposed at a second axial position, the second axial position different from the first axial position; and
   the flowmeter manager configured to:
   calculate the velocity of the fluid based on determining a cross-correlation transit-time of the electromagnetic wave received at the first axial position and at the second axial position; and
   calculate the density of the fluid based on the differential pressure and the velocity.

7. The system of claim 1, wherein the flowmeter manager calculates:
   a liquid holdup of the fluid based on the density and at least one of the permittivity or the conductivity; and
   a water-to-liquid ratio based on the density and at least one of the permittivity or the conductivity.

8. The system of claim 1, wherein the electromagnetic transmitter is a first electromagnetic transmitter, the electromagnetic receiver is a first electromagnetic receiver, further including:
   a second electromagnetic transmitter configured to transmit the electromagnetic wave into the fluid;
   a second electromagnetic receiver configured to receive the electromagnetic wave; and
   the flowmeter manager configured to:
   determine first amplitude-attenuation and first phase-shift measurements from the first electromagnetic transmitter and the first electromagnetic receiver;
   determine second amplitude-attenuation and second phase-shift measurements from the first electromagnetic transmitter and the second electromagnetic receiver;
   determine third amplitude-attenuation and third phase-shift measurements from the second electromagnetic transmitter and the first electromagnetic receiver;
   determine fourth amplitude-attenuation and fourth phase-shift measurements from the second electromagnetic transmitter and the second electromagnetic receiver; and
   calculate a mixture permittivity and a mixture conductivity based on the first through the fourth amplitude-attenuation and phase-shift measurements.

9. A system, comprising:
   a flowmeter including:
   a mixer configured to homogenize a fluid received at an inlet of the flowmeter;
   a temperature probe configured to measure a temperature of the fluid;
   a differential pressure sensor configured to measure a differential pressure of the fluid across an inlet and an outlet of the mixer, wherein the differential pressure sensor comprises a sensing element configured to measure a pressure of the fluid;
   a first microwave probe configured to transmit a first microwave into the fluid at a first axial position and receive a first reflected microwave;
   a second microwave probe configured to transmit a second microwave into the fluid at a second axial position and receive a second reflected microwave; and
   a Doppler probe configured to transmit a microwave or an ultrasonic wave into the fluid to generate Doppler frequency shift data; and
   an electromagnetic transmitter configured to transmit an electromagnetic wave into the fluid;
   an electromagnetic receiver configured to receive the electromagnetic wave, the electromagnetic receiver configured to generate amplitude-attenuation data and phase-shift data based on the received electromagnetic wave; and
   a flowmeter manager configured to:
   calculate a velocity of the fluid based on determining a cross-correlation transit-time based at least in part on the first reflected microwave and the second reflected microwave; and
   calculate a density of the fluid based on the differential pressure and the velocity;
   calculate a permittivity of the fluid based on the amplitude-attenuation data;
   calculate a conductivity of the fluid based on the amplitude-attenuation data and the phase-shift data; and
   calculate at least one of a water conductivity, a water permittivity, a water density, or a water salinity based on the permittivity of the fluid, the conductivity of the fluid, the temperature of the fluid, and the pressure of the fluid.

10. The system of claim 9, wherein the first microwave probe is coupled to the flowmeter at the first axial position downstream of the mixer and the second microwave probe is coupled to the flowmeter at the second axial position downstream of the mixer, the first axial position different from the second axial position.

11. The system of claim 9, wherein the differential pressure sensor includes a first pressure transducer and a second pressure transducer, the first pressure transducer disposed at the inlet of the mixer, the second pressure transducer disposed at the outlet of the mixer.

12. The system of claim 9, wherein the first axial position and the second axial position are disposed downstream of the mixer where the fluid is substantially homogenized.

13. The system of claim 9, wherein the flowmeter manager calculates:
   a first reflection coefficient of the fluid based on a first ratio of a first signal corresponding to the first reflected microwave and the first microwave at the first axial position; and
   a second reflection coefficient of the fluid based on a second ratio of a second signal corresponding to the second reflected microwave and the second microwave at the second axial position.

14. The system of claim 13, wherein the flowmeter manager is configured to calculate a permittivity of the fluid and a conductivity of the fluid based on at least one of the first reflection coefficient or the second reflection coefficient.

15. A system, comprising:
a flowmeter including:
- a mixer configured to homogenize a fluid received at an inlet of the flowmeter;
- a differential pressure sensor configured to measure a differential pressure of the fluid across an inlet and an outlet of the mixer; and
- a Doppler probe configured to transmit a microwave or an ultrasonic wave into the fluid to generate Doppler frequency shift data;

an electromagnetic transmitter configured to transmit an electromagnetic wave into the fluid;

an electromagnetic receiver configured to receive the electromagnetic wave, the electromagnetic receiver configured to generate amplitude-attenuation data and phase-shift data based on the received electromagnetic wave; and a flowmeter manager configured to:
- calculate a velocity of the fluid based on the Doppler frequency shift data;
- calculate a density of the fluid based on the differential pressure and the velocity;
- calculate a permittivity of the fluid based on the amplitude-attenuation data;
- calculate a conductivity of the fluid based on the amplitude-attenuation data and the phase-shift data;
- calculate a liquid holdup of the fluid based on the density and at least one of the permittivity or the conductivity; and
- calculate a water-to-liquid ratio based on the density and at least one of the permittivity or the conductivity.

16. The system of claim 15, wherein the flowmeter manager is configured to calculate at least one of a water conductivity, a water permittivity, a water density, or a water salinity based on the permittivity of the fluid, the conductivity of the fluid, a temperature of the fluid, and a pressure of the fluid.

17. The system of claim 16, wherein the differential pressure sensor includes a sensing element configured to measure the pressure of the fluid.

18. The system of claim 16, comprising a temperature probe configured to measure the temperature of the fluid.

19. The system of claim 15, wherein the electromagnetic transmitter and the electromagnetic receiver are disposed at an axial position downstream of the mixer.

* * * * *